United States Patent

Niikura et al.

[11] Patent Number: 5,911,008
[45] Date of Patent: Jun. 8, 1999

[54] SCHEME FOR DETECTING SHOT BOUNDARIES IN COMPRESSED VIDEO DATA USING INTER-FRAME/INTER-FIELD PREDICTION CODING AND INTRA-FRAME/INTRA-FIELD CODING

[75] Inventors: Yasuhiro Niikura, Kanagawa; Yukinobu Taniguchi, Kanagawa-ken; Akihito Akutsu, Kanagawa-ken; Yoshinobu Tonomura, Kanagawa-ken; Takashi Satoh, Kanagawa-ken; Atsushi Shimizu, Kanagawa-ken; Hiroshi Hamada, Kanagawa-ken, all of Japan

[73] Assignee: Nippon Telegraph and Telephone Corporation, Japan

[21] Appl. No.: 08/841,200

[22] Filed: Apr. 29, 1997

[30] Foreign Application Priority Data

| Apr. 30, 1996 | [JP] | Japan | P8-108858 |
|---|---|---|---|
| May 30, 1996 | [JP] | Japan | P8-135626 |
| May 31, 1996 | [JP] | Japan | P8-137331 |
| May 31, 1996 | [JP] | Japan | P8-138612 |
| May 31, 1996 | [JP] | Japan | P8-138613 |

[51] Int. Cl.$^6$ ................................ G06K 9/36
[52] U.S. Cl. ........................................ 382/236
[58] Field of Search .............................. 382/232, 236, 382/238, 240, 248, 250; 358/432, 433; 348/384, 394, 395, 400–404, 407–416, 420, 421, 425, 430, 431, 231, 390

[56] References Cited

U.S. PATENT DOCUMENTS

| 4,692,801 | 9/1987 | Ninomiya et al. | 358/414 |
|---|---|---|---|
| 5,144,427 | 9/1992 | Kitaura et al. | 358/420 |

(List continued on next page.)

FOREIGN PATENT DOCUMENTS

| 4-20786 | 7/1992 | Japan. |
|---|---|---|
| 4-345383 | 12/1992 | Japan. |

(List continued on next page.)

OTHER PUBLICATIONS

Article from *IEEE*, 1995, entitled, "A Unified Approach to Temporal Segmentation of Motion JPEG and MPEG Compressed Video," by Yeo and Liu, pp. 81 through 88.
Article from ACM Multimedia dated Jun. 1993, entitled "Image Processing on Compressed Data For Large Video Databases," by Arman, et al., pp. 267 through 272.
Article from SPIE vol. 2182 Image and Video Processing II, Jun. 1994, entitled, "Video Parsing Using Compressed Data", Zhang et al., pp. 142 through 149.
Article from Multimedia Systems, Springer–Verlag 1993, entitled "Automatic Partitioning of Full–Motion Video", Zhang, et al., pp. 1 through 19.
Article from Multimedia Tools and Applicaitons, 1–89–111 (1995), "Video Parsing and Browsing Using Compressed Data", Hongjiang et al., pp. 90 to 111.

*Primary Examiner*—Jose L. Couso
*Attorney, Agent, or Firm*—Banner & Witcoff, Ltd.

[57] ABSTRACT

A scheme for detecting shot boundaries in the compressed video data at high speed and high accuracy. In this shot boundary detection scheme, a Predictive-picture (P picture) change is calculated from a P picture sequence in the input video data which is compressed by an inter-frame/inter-field forward direction prediction coding scheme, according to coded data contained in the P picture sequence, while an Intra-picture (I picture) change is calculated from an I picture sequence in the input video data which is compressed by an intra-frame/intra-field coding scheme, according to coded data contained in the I picture sequence. Then, a shot boundary is detected by evaluating both the P picture change and the I picture change.

41 Claims, 42 Drawing Sheets

U.S. PATENT DOCUMENTS

| | | | |
|---|---|---|---|
| 5,267,334 | 11/1993 | Normille et al. | 382/236 |
| 5,493,345 | 2/1996 | Ishikawa et al. | 348/700 |
| 5,635,982 | 6/1997 | Zhang et al. | 348/231 |
| 5,644,660 | 7/1997 | Bruder | 382/232 |
| 5,661,523 | 8/1997 | Yamane | 348/390 |
| 5,767,922 | 6/1998 | Zabih et al. | 348/700 |

FOREIGN PATENT DOCUMENTS

| | | |
|---|---|---|
| 5-037853 | 2/1993 | Japan . |
| 5-30463 | 2/1993 | Japan . |
| 5-37893 | 2/1993 | Japan . |
| 5-284369 | 10/1993 | Japan . |
| 6-22304 | 1/1994 | Japan . |
| 6-54315 | 2/1994 | Japan . |
| 6-133305 | 5/1994 | Japan . |
| 6-319108 | 11/1994 | Japan . |
| 7-59108 | 3/1995 | Japan . |
| 05-236153 | 9/1995 | Japan . |
| 7-284017 | 10/1995 | Japan . |

FIG.5A
PRIOR ART
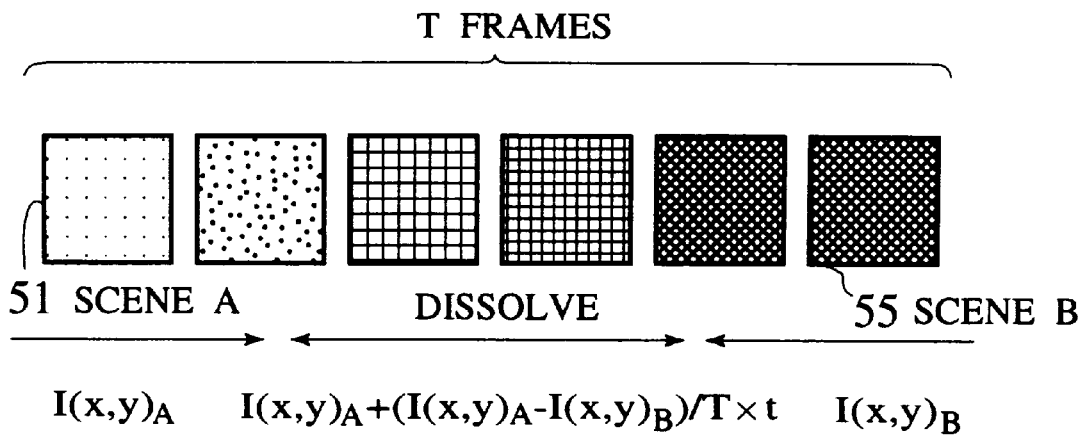
T FRAMES
51 SCENE A     DISSOLVE     55 SCENE B
$I(x,y)_A$     $I(x,y)_A + (I(x,y)_A - I(x,y)_B)/T \times t$     $I(x,y)_B$
FIG.5B
PRIOR ART
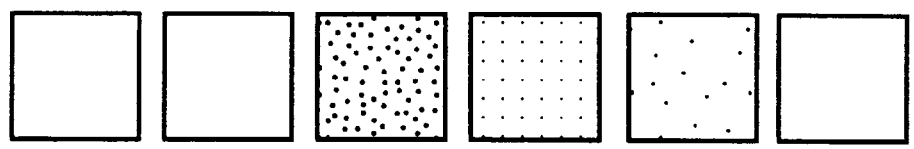
FIG.5C
PRIOR ART
= INTENSITY OF SCENE B − INTENSITY OF SCENE A
56 DIFFERENCE DATA FOR EACH FRAME = DIFFERENCE DATA / T

FIG.6A
PRIOR ART
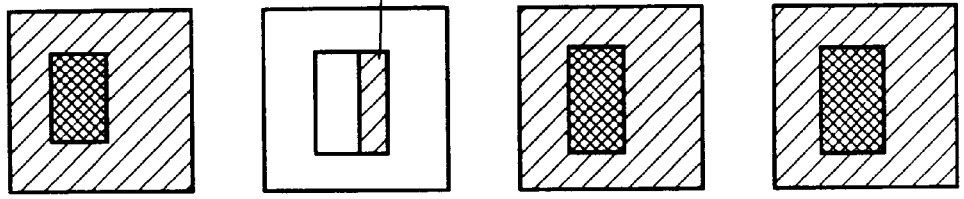
SHADOW OF IMAGING TARGET 60
FIG.6B
PRIOR ART
INTER-FRAME PREDICTION CODED BLOCK 61
INTER-FRAME PREDICTION CODED BLOCK 62
FIG.6C
PRIOR ART
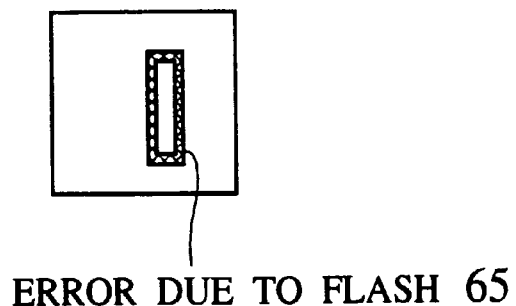
ERROR DUE TO FLASH 65

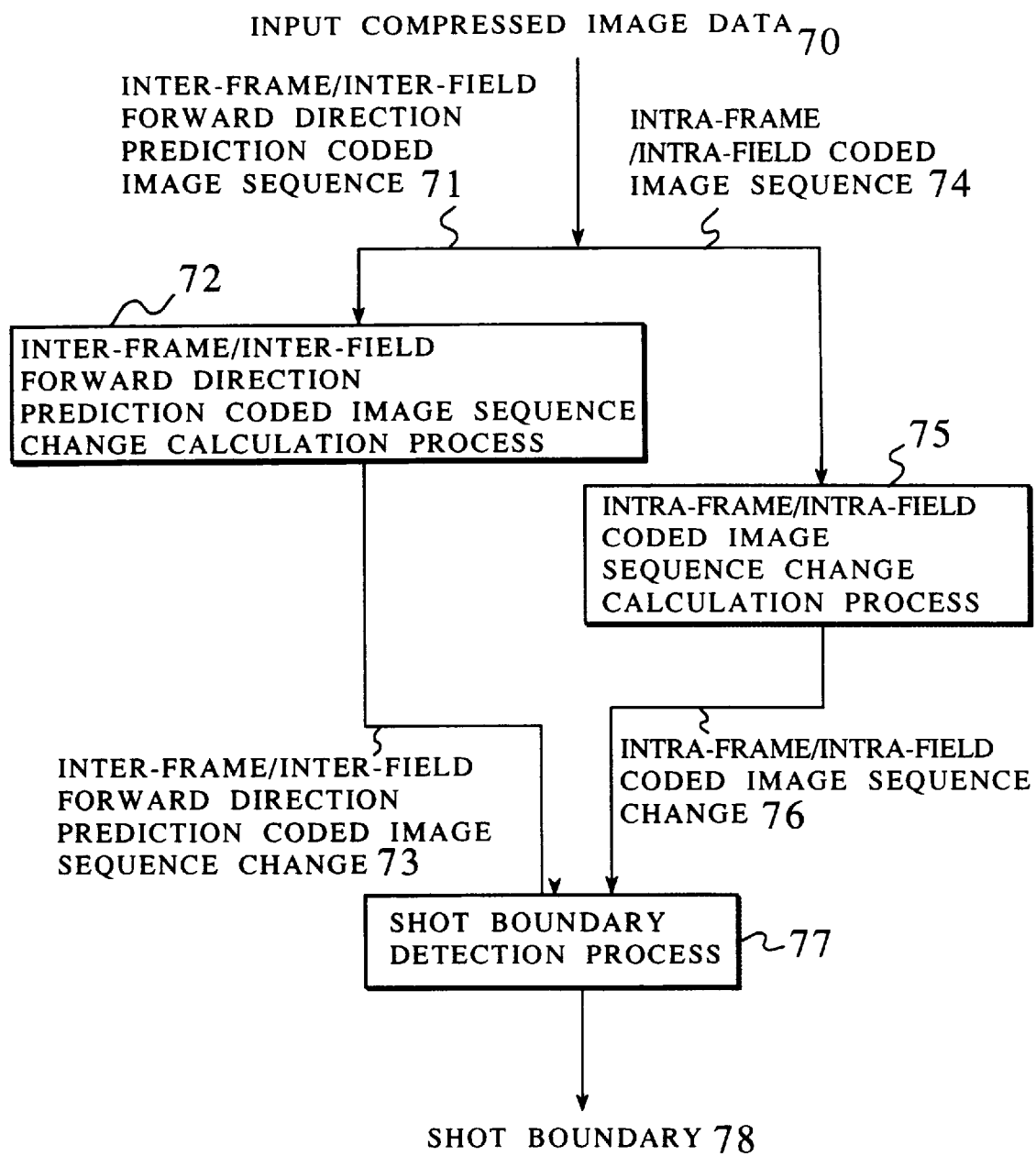

SHADOW OF IMAGING TARGET 4500

INTER-FRAME PREDICTION CODED BLOCK 4501

INTER-FRAME PREDICTION CODED BLOCK 4502

4501

ENLARGED

CONTRACTED REGION 4504

INFLUENCING RANGE 4503

SCHEME FOR DETECTING SHOT BOUNDARIES IN COMPRESSED VIDEO DATA USING INTER-FRAME/INTER-FIELD PREDICTION CODING AND INTRA-FRAME/INTRA-FIELD CODING

BACKGROUND OF THE INVENTION

1. Field of the Invention

The present invention relates to a scheme for detecting shot boundaries in compressed video data, and more particularly, to a scheme for detecting shot boundaries from a video data sequence compressed by a compression coding scheme using an inter-frame/inter-field prediction coding and an intra-frame/intra-field coding such as MPEG2 video data.

2. Description of the Background Art

The video data usually comes in a huge data amount, and in order to learn its content, there has been no choice but to watch this video data as playbacked in a time order. In this regard, if the video data can be partitioned according to some standard, it would be helpful in skipping some parts of the video data and comprehending an overview of its content. Ideally speaking, there is a need to partition the video data by taking a story of its content into consideration, but such a task can only be done manually at present and there has been a problem that an enormous amount of human works would be required for such a task, so that there has been a great demand for automatization of such a task. To this end, it is necessary to develop a technique for partitioning the video data in units of shots, where a shot corresponds to one continuously imaged scene.

In the video data as playbacked in a time order, a timing at which a shot is switched will be called a shot boundary. The image content suddenly changes before and after a shot boundary, so that it is possible to detect a shot boundary by calculating a difference between adjacent images along a time order and detecting a timing of a large difference as a shot boundary. For example, according to an automatic video data partitioning method as disclosed in Japanese Patent Application Laid Open No. 5-37853 (1993), a shot boundary is detected by calculating a change in consecutive frames according to a number of pixels in which physical quantities such as an intensity and a color have changed for each position (x, y) in the consecutive video frames.

However, it is also necessary to satisfy requirements of being able to stably detect not just the ordinary shot boundaries at which the image content suddenly changes but also those shot boundaries known as wipes and dissolves at which the image content changes gradually, and of being able to prevent erroneous detections of flashes and camera motions as shot boundaries. There are some conventionally known shot boundary detection techniques which can satisfy these requirements, but all of these conventionally known shot boundary detection techniques have been developed for non-compressed video data obtained by digitizing analog video signals.

On the other hand, in conjunction with a trend for utilizing video data more frequently, remarkable progresses have been made in the video data compression coding techniques in order to reduce loads in transmission and storage media, and the compression coding techniques such as H.261 and MPEG have already been standardized. In such compression coding techniques, two representative coding schemes are utilized, one is an intra-frame/intra-field coding scheme which reduces a redundancy within an image, and the other is an inter-frame/inter-field prediction coding scheme which reduces a redundancy among image.

As shown in FIG. 1A, in the intra-frame/intra-field coding scheme, a target image 10 is divided into a plurality of blocks 11 in square shapes, for example, and each block 11 is transformed by the DCT (Discrete Cosine Transform) so as to quantize each block 11 and thereby coding each block 11. In this case, the coded data is given by the DCT coefficients obtained by applying the DCT to each block 11. In a case of MPEG scheme, the block 11 is decomposed into intensity and color difference components, and the DCT coefficients obtained by applying the DCT to each of these components are kept as the intra-frame/intra-field coded data.

On the other hand, as shown in FIG. 1B, in the inter-frame/inter-field prediction coding scheme, a target image 10 is divided into a plurality of blocks 11 in square shapes, and a region 13 resembling each block 11 most within another image of a past (a different time) is substituted into each block 11. Among the adjacent images, a change in the image content is little in general, so that it is possible to reduce the redundancy among the image fields by replacing each block 11 by the resembling region 13. This technique is called the inter-frame/inter-field prediction coding, while a displacement between a block of interest 11A and its resembling region 13 is called a motion vector 14.

The coded data in the inter-frame/inter-field prediction coding scheme comprises the motion vector 14 and the DCT coefficients for a difference between the block 11 and the resembling region 13. When a region which resembles a certain block 11 does not exist, it is regarded as a case of wrong prediction, and this block 11 is quantized and coded by applying the DCT to this block 11 similarly as in the intra-frame/intra-field coding scheme. Such a block 11 is called an intra-block.

Two representative forms of the inter-frame/inter-field prediction coding scheme includes an inter-frame/inter-field forward direction prediction coding scheme and an inter-frame/inter-field bidirectional prediction coding scheme. As shown in FIG. 1B, the inter-frame/inter-field forward direction prediction coding scheme searches the resembling region 13 for the block of interest 11A from a past (different time) image 12. In contrast, as shown in FIG. 1C, the inter-frame/inter-field bidirectional prediction coding scheme searches the resembling region 13 for the block of interest 11A from both of a past image 15 and a future image 17.

Consequently, the motion vector 14 contained in the inter-frame/inter-field forward direction prediction coded data represents a displacement between positions of the resembling region 13 and the block of interest 11A in the past image 12, whereas the motion vector 14 contained in the inter-frame/inter-field bidirectional prediction coded data represents either one or both of a displacement between positions of the resembling region 13 and the block of interest 11A in the past image 15 and a displacement between positions of the resembling region 13 and the block of interest 11A in the future image 17.

The target image 10 coded by the inter-frame/inter-field forward direction prediction coding cannot be decoded unless the past image 12 is decoded, whereas the target image 10 coded by the inter-frame/inter-field bidirectional prediction coding cannot be decoded unless both of the past image 15 and the future image 17 are decoded. In contrast, the image compressed by the intra-frame/intra-field coding scheme can be decoded by itself.

The MPEG scheme is a combination of the intra-frame/intra-field coding scheme, the inter-frame/inter-field forward direction prediction coding scheme, and the inter-frame/inter-field bidirectional prediction coding scheme, which is expected to be the major compression coding techniques in near future. In the MPEG scheme, the image compressed by the intra-frame/intra-field coding scheme, the inter-frame/inter-field forward direction prediction coding scheme, or the inter-frame/inter-field bidirectional prediction coding scheme is called an Intra-picture (I picture), Predictive-picture (P picture), or Bidirectionally predictive-picture (B picture), respectively. In the video data according to MPEG, these different types of pictures appear in mixture, as in a sequence of IBBPBBPBBPBBIBBPBBPBBPBBPBB, for example. Here, a frequency of appearances for each type of picture is not predetermined, and allowed to be changed variously within the same video data.

The detection of shot boundaries from compression coded video data such as those of MPEG scheme can be realized by decoding the coded video data once so as to recover the non-compressed digital video data, and detecting shot boundaries from the non-compressed digital video data by using the conventionally known technique. However, there has been a problem that the decoding processing is a quite time consuming processing.

Now, the conventional known techniques for detecting shot boundaries from the MPEG video data without requiring the decoding processing will be described.

B. L. Yeo and B. Liu: "A Unified Approach to Temporal Segmentation of Motion JPEG and MPEG Compressed Video", IEEE Proceeding of the International Conference on Multimedia Computing and Systems, pp. 81–88, discloses a technique in which a contracted image of each picture is reconstructed by using the DC (Direct Current) components of the DCT coefficients for the I picture and the motion vectors for the P and B pictures, and contracted images are sequentially compared so as to detect a portion with a large change as a shot boundary.

However, this technique has been associated with the problem that a partial decoding processing involved in reconstructing the contracted image is rather time consuming.

F. Arman, A. Hsu, and M. Y. Chiu: "Image Processing on Compressed Data for Large Video Database", ACM Multimedia '93, pp. 267–272, and Japanese Patent Application Laid Open No. 7-236153 (1995), disclose a technique in which the shot boundaries are detected by comparing the DCT coefficients for the I pictures.

In the MPEG scheme, the frequency of appearances of the I picture is relatively lower than those of the P and B pictures in general. In a typical video data sequence according to the MPEG scheme, the I picture appears in about two frames per second. When this frequency of appearances is low, a possibility for erroneously detecting a camera movement or an imaging target movement as a shot boundary is expected to be increased, because the image content is largely changed before the next I picture appears when there is a camera movement or an imaging target movement. Consequently, this technique for detecting the shot boundaries using only the I picture has been associated with the problem that the detection error rate becomes higher when the frequency of appearances of the I picture becomes lower.

Japanese Patent Application Laid Open No. 4-207876 (1992) discloses a technique in which the shot boundaries are detected by utilizing a number of intra-blocks within the P picture. This technique utilizes the property that a number of intra-blocks increases abruptly when there is a shot boundary because the inter-frame/inter-field prediction becomes incorrect when there is a shot boundary.

However, this technique has been associated with the problem that it cannot detect a shot boundary which is located immediately before the I picture, although it is possible to detect a shot boundary which is located immediately before the P picture. This is because, in the prediction at a time of generating the P picture, a search target image in the resembling region for the image of interest is either the P picture or the I picture which is located immediately before the image of interest, and the resembling region is not going to be searched starting from an image further past of the I picture which is located immediately before the image of interest. In other words, if there is a shot boundary which is located immediately before the I picture, the prediction would become incorrect and there would not be any P picture in which a number of intra-blocks is increased.

H. J. Zhang, C. Y. Low, Y. Gong, and S. W. Smoliar: "Video Parsing Using Compressed Data", Proc. IS&T/SPIE Conf. on Image and Video Processing II, pp. 142–149, 1994, and Japanese Patent Application Laid Open No. 7-284017 (1995), disclose a technique in which the shot boundaries are detected by checking whether a position displacement indicated by the motion vector recorded in the B picture block is from the past image or from the future image.

However, the frequency of appearances of the B picture varies considerably from one compressed data to another, and there is even a compressed video data in which the B picture does not appear at all. Consequently, this technique has been associated with the problem that the shot boundaries cannot be detected at all from such a compressed video data without the B picture.

Thus, the problems of the conventionally known techniques described so far can be summarized as follows.

(i) When the shot boundaries are detected by decoding the compressed data, the decoding takes a considerable amount of time.

(ii) A camera or imaging target movement can be erroneously detected as a shot boundary.

(iii) A noise such as a flash can be erroneously detected as a shot boundary.

(iv) It is hard to detect gradual shot boundaries such as wipes and dissolves.

(v) An accuracy of shot boundary detection can be changed according to the frequency of appearance of each picture in the compressed data.

Conventionally, various schemes for detecting shot boundaries (that is, scene changes such as those due to camera switching or splicing) from video. If a shot boundary can be detected, it becomes possible to extract one or more representative images from a shot (a scene) partitioned by the shot boundaries and produce a list display of the extracted representative images, so that it becomes possible to provide a user interface by means of which an outline of the video can be comprehended without actually watching the video from start to end and a desired scene can be accessed quickly.

The conventional shot boundary detection schemes have been mainly those which are designed to handle the non-coded video data, in which a correlation between adjacent frames is calculated and a position where the correlation is small is regarded as a shot boundary. However, there has been a problem that a time consuming decoding processing becomes necessary in order to calculate a correlation between adjacent frames from the coded video data in this manner.

In view of this problem, there are several propositions for the shot boundary detection scheme which can detect a shot boundary directly from the coded video data without requiring the decoding processing.

Japanese Patent Application Laid Open No. 6-22304 discloses a scheme for detecting shot boundaries according to feature values (such as a cumulative value of residual error after motion compensation, a data amount of coded video data, a number of intra-frame coded pixels, etc.) that can be calculated relatively quickly from the coded video data of the inter-frame/inter-field coded frames.

However, this conventional shot boundary detection scheme is associated with the problems that (1) a shot boundary cannot be detected correctly for the video data in which the intra-frame/intra-field coded frames (frames compressed by utilizing correlations within a frame/field) and the inter-frame/inter-field coded frames (frames compressed by utilizing correlations among frames/fields) are mixedly present, and that (2) a considerable amount of computation time is required in calculating the feature values mentioned above frame by frame.

Now, these two conventionally encountered problems will be described in further detail.

First, the problem (1) will be described for an exemplary case of the MPEG coded video.

In the MPEG, the video is coded by combining the intra-frame/intra-field coded frames (I pictures) which are coded by utilizing the correlations within a field alone (without utilizing information on frames other than a target frame), the inter-frame/inter-field forward direction coded frames (P pictures) which are coded by utilizing correlations between a target frame and a past reference frame, and the inter-frame/inter-field bidirectional coded frames (B pictures) which are coded by utilizing correlations among a target frame, a past reference frame, and a future reference frame. These I, P and B pictures appear alternately, as in a sequence of:

I, B, B, P, B, B, P, B, B, I, B, . . .

for example. According to the MPEG standard, an interval and an order in the arrangement of I, P and B pictures can be set up freely within a certain constraint.

Now, consider the coded video data:

$P_1, P_2, P_3, P_4, P_5, P_6, \ldots$ which is formed by the P pictures alone. In this coded video data, if there is a shot boundary at a timing of the frame $P_3$, the correlation between the frame $P_2$ and the frame $P_3$ becomes small, so that the feature values mentioned above (such as a number of intra-frame coded pixels, a data amount of coded video data) will be increased. Consequently, a shot boundary can be correctly detected by means of an appropriate thresholding processing for the feature values.

In contrast, consider the coded video data:

$I_1, P_1, P_2, P_3, P_4, P_5, I_2, \ldots$ which are compressed by combinations of the I pictures and the P pictures. In this coded video data, a shot boundary can be detected correctly as long as a shot boundary is located at a timing of $P_1, P_2, P_2, P_4$, or $P_6$, but if a shot boundary is located between $P_5$ and $I_2$, such a shot boundary cannot be detected. This is because $I_2$ is not coded by utilizing correlations among frames so that the feature values such as a cumulative value of residual error after motion compensation and a number of intra-frame coded pixels are meaningless for this I picture, while a data amount of coded video data always takes a large value for the I picture compared with the P picture, so that a shot boundary cannot be detected correctly according to these feature values.

Next, the problem (2) will be described. In order to calculate the feature values mentioned above (except for a case of using a coded video data amount as a feature value) from the coded video data, it is necessary to expand the data compressed by the variable length coding scheme (a scheme in which a shorter code is allocated to a more frequently appearing value) with respect to every inter-frame/inter-field coded frame, and a considerable computation time required for this processing has posed a problem (especially in a case of realizing this scheme by software).

Thus, most of the conventional shot boundary detection schemes have been associated with the problem that a considerable amount of time is required for the decoding processing or the variable length coding expansion processing. Among the conventionally known schemes, the scheme using the data amount of coded video data is fast as it does not require the variable length coding expansion processing, but this scheme has been associated with a problem that a shot boundary cannot be detected correctly for the coded video data in which the intra-frame/intra-field coded frames and the inter-frame/inter-field coded frames are mixedly present.

It is common to watch the video in its time order in order to comprehend the outline of the video, but if a shot boundary (a scene change) can be detected automatically from the video data, it becomes possible to automatically produce a list of scenes, so that it becomes possible to realize a comprehension of an outline of the video and a search of a desired scene more efficiently.

In recent years, an application of digital video is widely spread to various fields such as communication, broadcasting, and entertainment, and there is a need for a technique to detect a shot boundary from the coded video data directly (without requiring the decoding).

Most of the conventionally known shot boundary detection schemes are designed to handle the non-coded video data, so that the decoding processing is necessary in order to handle the coded video data. However, there has been a problem that a considerable processing time is required for this decoding processing by software, or a problem that a large hardware size is required in order to realize this decoding processing by hardware.

As already mentioned above, Japanese Patent Application Laid Open No. 6-22304 discloses a scheme for automatically detecting shot boundaries according to feature values such as a cumulative value of residual error after motion compensation for each frame, a data amount of coded video data, a number of intra-frame coded pixels, etc. which are calculated at a time of coding/decoding the video image. The principle of this shot boundary detection scheme will now be described with reference to FIG. 2.

In the frame sequence shown in FIG. 2, there is a shot boundary between consecutive frames 21 and 22 (where a scene is changed from a white (blank) scene to a black (shaded) scene). In this case, the correlation between the frames 21 and 22 becomes small, so that every one of the feature values mentioned above takes a large value. Consequently, by comparing the feature values mentioned above with an appropriate threshold value, it is possible to detect the shot boundary automatically.

However, this conventional shot boundary detection scheme has the following problem in a case of handling coded interlaced video data which are obtained by coding the interlaced video data such as NTSC analog signals (which are video signals commonly used for TV broadcasting).

Consider a frame sequence shown in FIG. 3. In this frame sequence of FIG. 3, a frame 31 and an odd field of a frame 32 constitutes one scene (a white (blank) scene) while an even field of the frame 32 and a frame 33 constitutes another scene (a black (shaded) scene). This type of situation where the shot boundary is located between the odd and even fields of one frame frequently occurs in the so called telecine conversion in which the film video (with 24 frames per second) is converted into the NTSC signals (with 30 frames per second). When the above described conventional shot boundary detection scheme is applied to such a frame sequence, the feature values mentioned above have large values for both of the frame 32 and the frame 33, so that both of these two consecutive frames 32 and 33 are detected as two shot boundaries. In order to prevent such an erroneous shot boundary detection, it is possible to apply a rule that two shot boundaries detected at two consecutive frames are to be regarded as a single shot boundary, but a use of such a rule gives rise to another problem as follows.

Consider a frame sequence shown in FIG. 4. This frame sequence of FIG. 4 diagrammaticaly illustrates a situation in which a flashlight is imaged at a time of imaging. Namely, the completely dark scene in a frame 41 is temporarily brightened in the even field of a frame 42 and then set back to the completely dark scene in a frame 43. When the above described conventional shot boundary detection scheme is applied to such a frame sequence, the feature values mentioned above have large values for both of the frame 42 and the frame 43, similarly as in a case of FIG. 3. Consequently, when the above described rule for the purpose of detecting a shot boundary located between the even field and the odd field is applied, a noise such as a flashlight is also erroneously detected as a shot boundary in this type of situation depicted in FIG. 4.

Thus, in the conventional shot boundary detection scheme, an instantaneous noise such as a flashlight is erroneously detected as a shot boundary when an attempt is made to detect a shot boundary between the odd field and the even field. On the contrary, when this erroneous detection of the flashlight is to be avoided, it becomes impossible to detect a shot boundary between the odd field and the even field.

In the conventional shot boundary detection scheme such as that disclosed in Japanese Patent Application Laid Open No. 5-37853 (1993) mentioned above, one of the technical problems to be resolved has been a stable detection of a gradually changing scene change such as a dissolve.

A dissolve is a type of scene change in which the image content continuously changes gradually from a scene A to a scene B. The fade-in in which the image gradually emerges from a white scene or the fade-out in which the image gradually disappears can be considered as special cases of the dissolve in which a scene A or a scene B is a monotonous white or black scene. This type of scene change is usually a linear change in which the intensity and the color components are gradually changed.

Some characteristics of the dissolve will now be described in further detail with references to FIGS. 5A, 5B and 5C.

In an original image sequence shown in FIG. 5A, the scene is gradually changed over T frames from the scene A 51 to the scene B 55. In this transition process from the scene A to the scene B, the corresponding pixel (x, y) of each frame has a component value which is gradually changed from a component value of the scene A to a component value of the scene B as indicated by the difference data shown in FIG. 5B. The component value (intensity) of a t-th pixel in the dissolve can be expressed by the following expression:

$$I(x,y)_A + (I(x,y)_B - I(x,y)_A)/T \times t \quad (1)$$

where $I(x, y)_A$ and $I(x, y)_B$ are the component values (intensities) of an image block (x, y) in the scene A and the scene B, respectively, T is a total number of frames over which the dissolve takes place, and t is a frame number countered from the top frame at which the dissolve starts.

In the dissolve, the gradually changing frames as described above continuously appear over an entire field. When these frames are coded, the motion compensation prediction becomes correct for such a gradual change, so that the motion vector due to the correct motion compensation prediction and the inter-block difference data on a reference frame are recorded in the P picture sequence of the coded data. That is, the motion compensation prediction is made while the inter-block difference data on a reference frame alone is recorded and transmitted. Consequently, in a case of the coding scheme in which the P pictures are consecutively arranged, for example, as shown in FIG. 5C, the difference data 56 for the DC component contained in a block of the t1-th P picture during the dissolve is given by the following expression.

$$I(x, y)_A + (I(x, y)_B - I(x, y)_A)/T \times t_1 - I(x, y)_A + \quad (2)$$
$$(I(x, y)_B - I(x, y)_A)/T \times (t_1 - 1) = \{I(x, y)_A - (I(x, y)_B\}/T$$

A dissolve can be detected by calculating feature values that can reflect this phenomenon. Note that the gradually changing scene change also includes a wipe in which a part of the image content is sequentially exchanged between the scene A and the scene B without a process for merging the images, and this wipe is handled separately from a dissolve.

In the detection of a dissolve, it is difficult to judge whether a change in the image component such as an intensity is that due to movement and lighting or that due to a gradual change such as a dissolve, so that there has been a problem that a scene in which a camera or an imaging target has moved is erroneously detected as a dissolve.

H. J. Zhang, A. Kankanhalli, and S. W. Smoliar: "Automatic Partitioning of Full-motion Video", Multimedia Systems, I(1), pp. 10–28, 1993, discloses a scheme for resolving this problem by using the motion vector or the optical flow.

In order to detect a dissolve from the compressed video data such as those of the MPEG scheme, it has been necessary to recover the non-compressed digital video by decoding the coded data once and use the conventionally known scheme for detecting dissolves. However, there has been a problem that the decoding processing is a processing which requires a considerable computation time. In addition, the above described conventional scheme for detecting dissolves also has a problem that a computation for obtaining the motion vector also requires much time. It is quite inefficient to require an enormous amount of time for both of the decoding processing and the motion vector computation processing. Consequently, there is a need for a technique to detect dissolves without requiring the decoding processing, which has not been available conventionally.

In the conventional shot boundary detection scheme such as that disclosed in Japanese Patent Application Laid Open No. 5-37853 (1993) mentioned above, another one of the technical problems to be resolved has been a prevention of the erroneous detection of a noise such as a flash as a shot boundary in addition to the scene changes in frame units, while stably detecting the ordinary shot boundaries at which the image content suddenly changes.

When there is a flash, a large amount of change occurs over two consecutive frames, and a value of this amount of change is nearly equal in both frames. For this reason, there has been a proposition for judging a case of having a large amount of change over two consecutive frames as a flash and not to detect such a case as a shot boundary.

However, such a conventionally known shot boundary detection scheme has been designed to handle non-compressed video data obtained by digitizing the analog video signals.

As already described above, Japanese Patent Application Laid Open No. 4-207876 (1992) discloses a technique for resolving this problem in which the shot boundaries are detected by utilizing a number of intra-blocks within the P picture. This technique utilizes the property that a number of intra-blocks increases abruptly when there is a shot boundary because the inter-frame/inter-field prediction becomes incorrect when there is a shot boundary. A camera movement and an imaging target movement contained in the original video are recorded as the motion vector which indicates a displacement of a position of the resembling region at a time of prediction, and the prediction is usually correct even when there is a camera or imaging target movement. Consequently, an amount of change calculated according to the intra-blocks does not reflect a camera or imaging target movement, so that a camera or imaging target movement is usually not erroneously detected as a shot boundary.

However, in a case of the coded video data using the inter-frame prediction, when a flash is lit, the motion compensation prediction becomes incorrect at nearly corresponding positions over two consecutive frames so that the intra-blocks appear and their number increases abruptly, but a number of intra-blocks does not coincide among these frames. Because of this difference in a number of intra-blocks, an application of a conventionally known prominence detection filter is not effective in removing the influence of the flash, and it has conventionally been impossible to remove the influence of the flash completely.

This fact is related to a presence of a shadow region of an object which appears when a flash is lit, which will now be described with references to FIGS. 6A, 6B and 6C.

FIG. 6A shows an original image sequence in which the flash is lit toward an imaging target at the second frame so that a brightness of the imaging target is increased abruptly while a shadow portion 60 of the imaging target also appears.

FIG. 6B shows the intra-blocks on the original image sequence of FIG. 6A. In the second frame at which the flash is lit toward the imaging target, the motion compensation prediction becomes incorrect for a region at which the brightness is abruptly increased, so that this region becomes the intra-blocks, but the shadow portion 60 remains unchanged from a previous frame before the flash is lit, so that this portion becomes inter-frame prediction coded blocks 61 for which the prediction was correct.

In the third frame next to the frame at which the flash is lit, the overall brightness is abruptly decreased and set back to the original level, so that the prediction becomes incorrect again for most of the region for which the prediction was incorrect at the second frame, and therefore this region is coded as the intra-blocks. The positions of the intra-blocks in the second and third frames nearly coincide, so that the intra-block appears at corresponding positions in the consecutive frames.

However, a region surrounding the shadow portion 60 of the imaging target has almost the same brightness as the shadow portion 60, so that the prediction from the shadow portion becomes correct and this region becomes inter-frame prediction coded blocks 62. In other words, for the surrounding region of the shadow portion 60, different types of blocks appear at corresponding positions in the consecutive frames, and a number of intra-blocks in the third frame immediately after the frame at which the flash is lit becomes less than that in the second frame at which the flash is lit, so that as shown in FIG. 6C, the surrounding region of the shadow portion 60 remains as an error 65 due to the flash. In practice, the image content is far more complicated than an example depicted in FIGS. 6A, 6B and 6C, so that shadows appear at many regions. Consequently, it has conventionally been necessary to provide a processing which makes a number of intra-blocks identical over the second and third frames and removes noises, so that the conventionally known prominence detection filter for emphasizing the shot boundary becomes operable.

Thus, it has conventionally been impossible to remove the influence of the flash, and therefore there has been a problem that the flash is erroneously detected as a shot boundary.

SUMMARY OF THE INVENTION

It is therefore an object of the present invention to provide a scheme for detecting shot boundaries in the compressed video data, which is capable of detecting the shot boundaries from the compressed video data at high speed and high accuracy.

It is another object of the present invention to provide a scheme for detecting shot boundaries in the compressed video data, which is capable of detecting the shot boundaries at high speed and high accuracy, even for the coded video data in which the intra-frame/intra-field coded frames and the inter-frame/inter-field coded frames are mixedly present.

It is another object of the present invention to provide a scheme for detecting shot boundaries in the compressed video data, which is capable of detecting the shot boundaries from the video data coded by using the field prediction coding scheme such as MPEG2, at high speed and high accuracy (that is, a flash is not detected as a shot boundary erroneously while a shot boundary between the odd field and the even field can be detected correctly).

It is another object of the present invention to provide a scheme for detecting shot boundaries in the compressed video data, which is capable of detecting the dissolves at high speed, without requiring the time consuming processing such as a compressed video data decoding processing and a motion vector computation processing.

It is another object of the present invention to provide a scheme for detecting shot boundaries in the compressed video data, which is capable of detecting the shot boundaries from the coded video data at high speed by not requiring the decoding processing, and at high accuracy by not detecting the flash as a shot boundary erroneously.

According to one aspect of the present invention there is provided a method for detecting a shot boundary from an input video data compressed by a coding scheme using both an inter-frame/inter-field prediction coding scheme and an intra-frame/intra-field coding scheme, comprising the steps of: (a) calculating a Predictive-picture (P picture) change from a P picture sequence in the input video data which is compressed by an inter-frame/inter-field forward direction prediction coding scheme, according to coded data contained in the P picture sequence; (b) calculating an Intra-picture (I picture) change from an I picture sequence in the input video data which is compressed by an intra-frame/intra-field coding scheme, according to coded data contained in the I picture sequence; and (c) detecting a shot boundary by evaluating both the P picture change calculated at the step (a) and the I picture change calculated at the step (b).

According to another aspect of the present invention there is provided an apparatus for detecting a shot boundary from an input video data compressed by a coding scheme using both an inter-frame/inter-field prediction coding scheme and an intra-frame/intra-field coding scheme, comprising: a picture judgement unit for judging types of coding schemes used in the input video data and separating a Predictive-picture (P picture) sequence in the input video data which is compressed by an inter-frame/inter-field forward direction prediction coding scheme and an Intra-picture (I picture) sequence in the input video data which is compressed by an intra-frame/intra-field coding scheme; a P picture change calculation unit for calculating a P picture change from the P picture sequence, according to coded data contained in the P picture sequence; an I picture change calculation unit for calculating an I picture change from the I picture sequence, according to coded data contained in the I picture sequence; and a shot boundary detection unit for detecting a shot boundary by evaluating both the P picture change calculated by the P picture change calculation unit and the I picture change calculated by the I picture change calculation unit.

According to another aspect of the present invention there is provided an article of manufacture, comprising: a computer usable medium having computer readable program code means embodied therein for causing a computer to function as a system for detecting a shot boundary from an input video data compressed by a coding scheme using both an inter-frame/inter-field prediction coding scheme and an intra-frame/intra-field coding scheme, the computer readable program means including: first computer readable program code means for causing the computer to function as a picture judgement unit for judging types of coding schemes used in the input video data and separating a Predictive-picture (P picture) sequence in the input video data which is compressed by an inter-frame/inter-field forward direction prediction coding scheme and an Intra picture (I picture) sequence in the input video data which is compressed by an intra-frame/intra-field coding scheme; second computer readable program code means for causing the computer to function as a P picture change calculation unit for calculating a P picture change from the P picture sequence, according to coded data contained in the P picture sequence; third computer readable program code means for causing the computer to function as an I picture change calculation unit for calculating an I picture change from the I picture sequence, according to coded data contained in the I picture sequence; and fourth computer readable program code means for causing the computer to function as a shot boundary detection unit for detecting a shot boundary by evaluating both the P picture change calculated by the second computer readable program code means and the I picture change calculated by the third computer readable program code means.

Other features and advantages of the present invention will become apparent from the following description taken in conjunction with the accompanying drawings.

BRIEF DESCRIPTION OF THE DRAWINGS

FIGS. 5A to 5C are diagrams for explaining characteristics of a type of shot boundary called a dissolve.

FIGS. 6A to 6C are diagrams for explaining a problem associated with another conventional shot boundary detection scheme.

FIG. 7 is a flow chart for the processing of a shot boundary detection scheme according to the first embodiment of the present invention.

DETAILED DESCRIPTION OF THE PREFERRED EMBODIMENTS

Figure 1A:
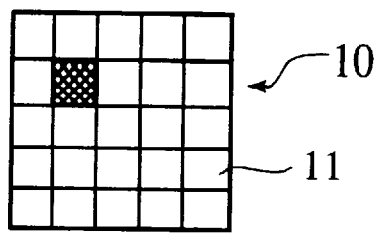
FIG. 1A is a diagram for explaining the intra-frame/intra-field coding scheme.
Figure 1B:
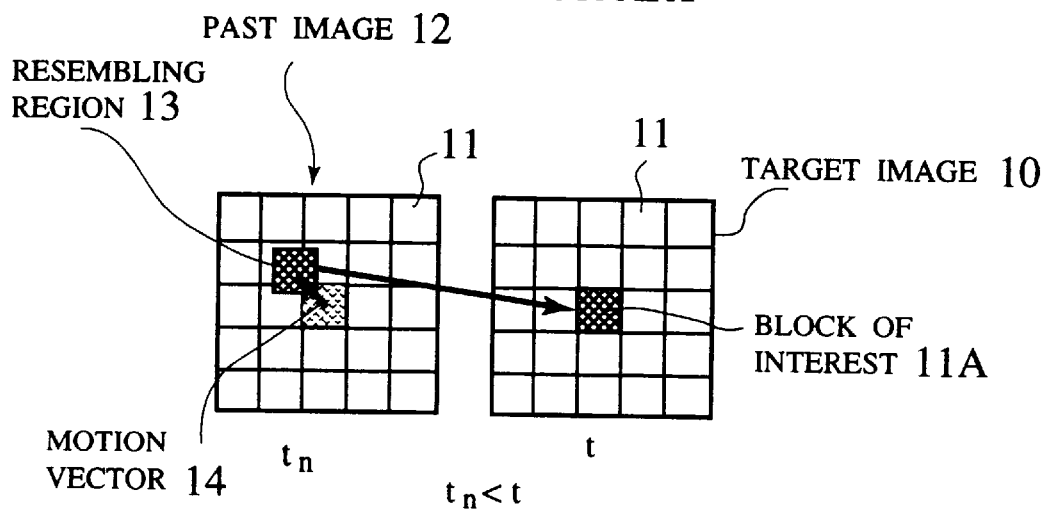
FIG. 1B is a diagram for explaining the inter-frame/inter-field forward direction prediction coding scheme.
Figure 1C:
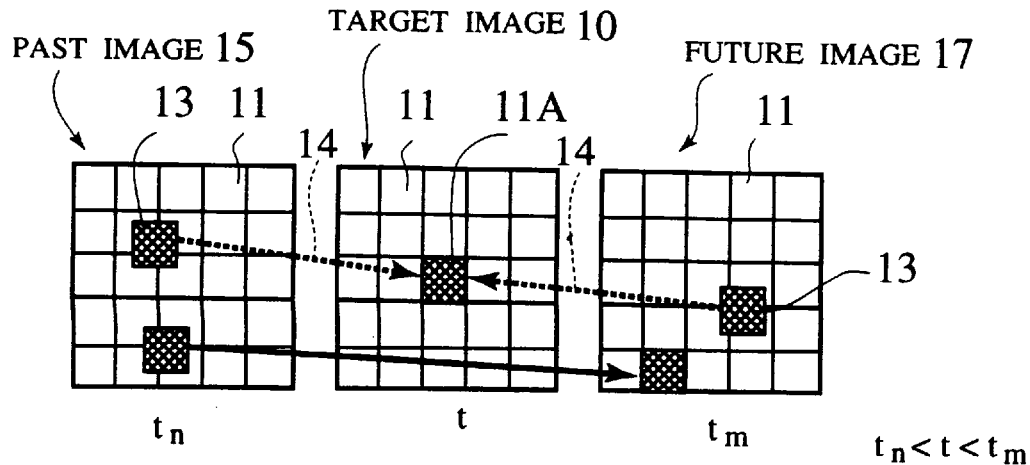
FIG. 1C is a diagram for explaining the inter-frame/inter-field bidirectional prediction coding scheme.
Figure 2:
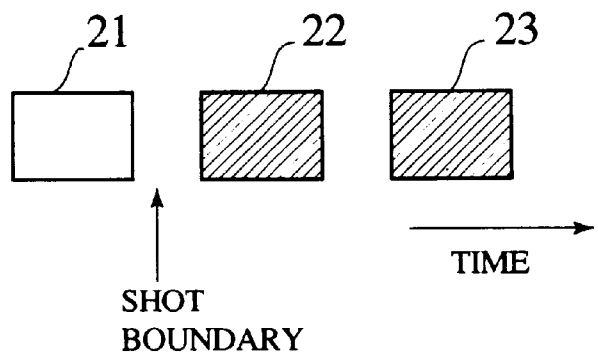
FIG. 2 is a diagram for explaining one convention shot boundary detection scheme.
Figure 3:
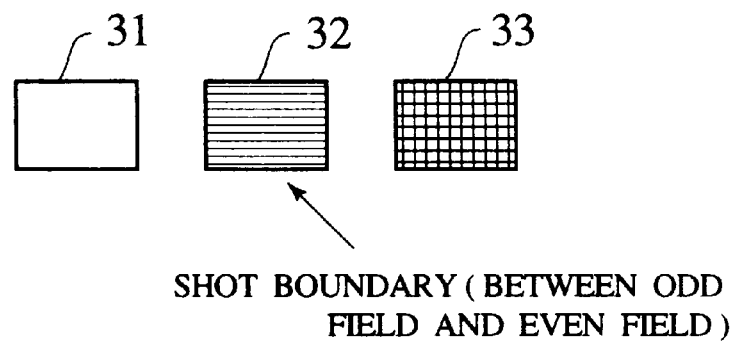
FIG. 3 is a diagram for explaining a problem associated with the conventional shot boundary detection scheme explained in FIG. 2.
Figure 4:
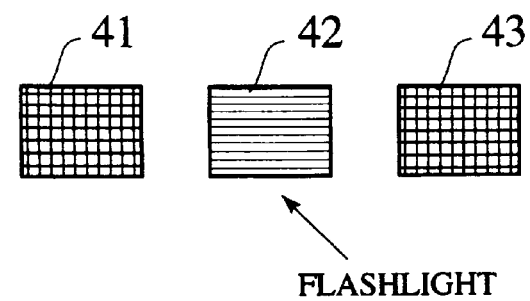
FIG. 4 is a diagram for explaining another problem associated with the conventional shot boundary detection scheme explained in FIG. 2.

Referring now to FIG. 7 to FIG. 17, the first embodiment of a shot boundary detection scheme according to the present invention will be described in detail.

FIG. 7 shows a flow of processing in the first embodiment of a shot boundary detection scheme according to the present invention. As shown in FIG. 7, according to this first embodiment, an input compressed image data 70 is separated into an inter-frame/inter-field forward direction prediction coded image sequence 71 and an intra-frame/intra-field coded image sequence 74, which are respectively given to an inter-frame/inter-field forward direction prediction coded image sequence change calculation process 72 and an intra-frame/intra-field coded image sequence change calculation process 75. Each of these change calculation processes 72 and 75 calculates a respective feature value which takes a large value when an image content of the respective image sequence is largely changed, as a respective image sequence change (an amount of change in time) 73 or 76. These change calculation processes will be described in further detail below. The obtained inter-frame/inter-field forward direction prediction coded image sequence change 73 and intra-frame/intra-field coded image sequence change 76 are then given to a shot boundary detection process 77 for obtaining a shot boundary 78. This shot boundary detection process will be described in further detail below.

Thus, according to this first embodiment, two image sequence changes are calculated separately from two types of image sequences, and a shot boundary is detected by evaluating these two image sequence changes together.

Figure 8:
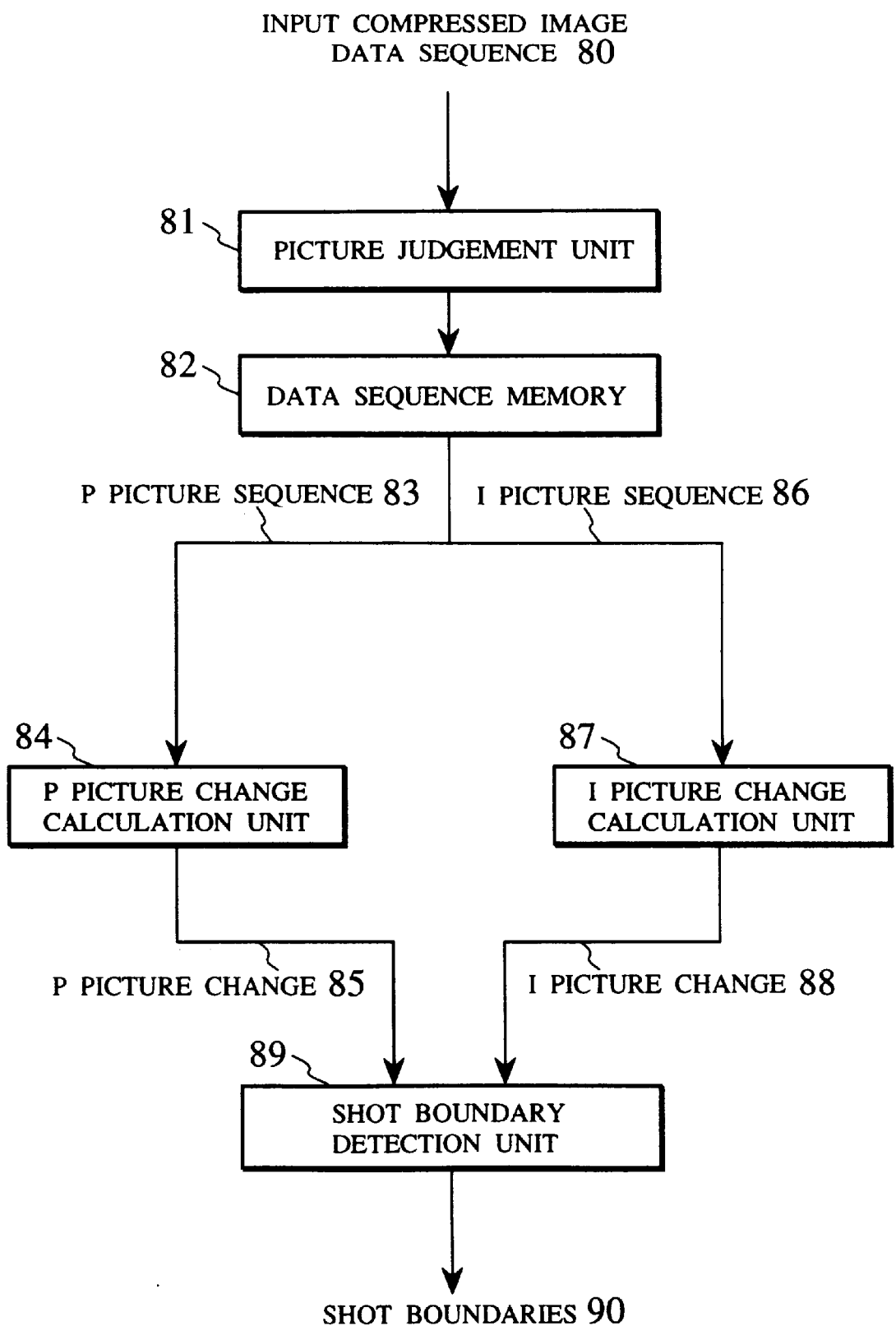
FIG. 8 is a schematic block diagram of a shot boundary detection apparatus in the first embodiment of the present invention.

FIG. 8 shows a schematic configuration of a shot boundary detection apparatus for realizing the shot boundary detection scheme of this first embodiment. As shown in FIG. 8, this shot boundary detection apparatus comprises: a picture judgement unit 81 for receiving an input compressed image data sequence 80 and judging a P picture sequence and an I picture sequence contained therein; a data sequence memory 82 for storing the input compressed image data sequence 80; a P picture change calculation unit 84 for receiving a P picture sequence 83 from the data sequence memory 82 and calculating a P picture change 85; an I picture change calculation unit 87 for receiving an I picture sequence 86 from the data sequence memory 82 and calculating an I picture change 88; and a shot boundary detection unit 89 for receiving the P picture change 85 and the I picture change 88 from the P picture change calculation unit 84 and the I picture change calculation unit 87 respectively, and detecting shot boundaries 90.

In this shot boundary detection apparatus of FIG. 8, the shot boundaries 90 are detected from the input compressed image data sequence 80. In this first embodiment, the input compressed image data sequence 80 is compressed by the MPEG scheme, and comprises t+1 sets of picture sequence groups, where each picture sequence group has one frame of I picture followed by fourteen frames of P pictures, that is an image data sequence in a form of:

$(IP_0 \ P_1 \ P_2 \ P_3 \ P_4 \ P_5 \ P_6 \ P_7 \ P_8 \ P_9 \ P_{10} \ P_{11} \ P_{12} \ P_{13})_0,$ $(IP_0 P_1 P_2 P_3 P_4 P_5 P_6 P_7 P_8 P_9 P_{10} P_{11} P_{12} P_{13})_1,$ $(\ldots$ $(IP_0 P_1 P_2 P_3 P_4 P_5 P_6 P_7 P_8 P_9 P_{10} P_{11} P_{12} P_{13}))_t.$ In the following, the I picture sequence is denoted as $I_h$ and the P picture sequence is denoted as $P_{h, k}$, where $h=0, 1, \ldots, t$ is a picture sequence group number, and $k=0, 1, \ldots, 13$ is a frame number within a picture sequence group.

Note that the input compressed image data sequence 80 can be image files stored in a storage device such as a hard disk or a CD-ROM, or image files transmitted through a network. A size and a sampling rate of the input compressed image data sequence 80 are arbitrary, but it must be compressed by using both the intra-frame/intra-field coding scheme and the inter-frame/inter-field prediction coding scheme. For example, it can be the image data sequence according to H.261, MPEG1, or MPEG2 scheme. In such a compression scheme, the image data sequence contains intra-frame/intra-field coded images, inter-frame/inter-field forward direction prediction coded images, and inter-frame/inter-field bidirectional prediction coded images, but their frequencies of appearance can be arbitrary.

The data sequence memory 82 stores the input compressed image data sequence 80 over a prescribed number of frames. In this first embodiment, the data sequence memory 82 stores each picture data in correspondence with a serial number starting from the top picture, a picture type judged by the picture judgement unit 81, and an I picture serial number for each I picture starting from a top of the I picture sequence 86 or a P picture serial number for each P picture starting from a top of the P picture sequence 83. The data sequence memory 82 may also store a whole or a part of the coded data, a frame number starting from a top file of the image, a supplementary information such as a feature value obtained by the preliminary processing, as well as an external information such as an imaging time, imaging location, etc. which are obtained and attached to the image data by an external device.

Among the image sequence read out from the data sequence memory 82, the P picture sequence 83 ($P_{h, k}$: $h=0, 1, \ldots, t; k=0, 1, \ldots, 13$) is entered into the P picture change calculation unit 84 in order to obtain the P picture change 85 ($DP_{h, k}$: $h=0, 1, \ldots, t; k=0, 1, \ldots, 13$). Here, the P picture change 85 ($DP_{h, k}$) is calculated from the P picture sequence 83 ($P_{h, k}$) by using feature values which vary according to the image content change, such as a number of block types and positions of blocks in the P picture, and motion vectors recorded in correspondence to blocks. This P picture change calculation will be described in further detail below.

Among the image sequence read out from the data sequence memory 82, the I picture sequence 86 ($I_h$: $h=0, 1, \ldots, t$) is entered into the I picture change calculation unit 87 in order to obtain the I picture change 88 ($DI_h$: $h=0, 1, \ldots, t$). Here, the I picture change 88 ($DI_h$) is calculated from the I picture sequence 86 ($I_h$) by using feature values which reflect the image content change, such as a sum of differences among corresponding pixels in adjacent images for an intensity and a color difference contained in blocks of the I picture, a number of pixels with large differences, a hue calculated according to an intensity and a color difference, and histograms obtained from these feature values. This I picture change calculation will be described in further detail below.

These two picture changes 85 and 88 ($DP_{h, k}$ and $DI_h$) are evaluated by the shot boundary detection unit 89 in order to obtain the shot boundaries 90. Here, these two picture changes 85 and 88 ($DP_{h, k}$ and $DI_h$) respectively reflect the image content changes in the P picture sequence 83 and the I picture sequence 86. In this first embodiment, two specific procedures for obtaining the shot boundaries will be described, including a procedure in which the shot boundaries are separately detected from each of these two picture changes 85 and 88 ($DP_{h, k}$ and $DI_h$) and these detected shot boundaries are combined, and a procedure in which the shot boundaries are detected from a weighted sum of these two picture changes 85 and 88 ($DP_{h, k}$ and $DI_h$). In the following, it is assumed that weights and thresholds to be used in these procedures are given in advance, but it is also possible to vary these weights and thresholds according to frequencies of appearance of the I pictures and the P pictures, as will be described in detail below.

Now, the P picture change calculation unit 84 in the shot boundary detection apparatus of FIG. 8 will be described in further detail.

In the first exemplary implementation of the P picture change calculation unit 84, the P picture change 85 is calculated by using an information contained in the P picture. The P picture has two types of blocks includes those blocks for which the predictions were correct (which will be referred hereafter as p blocks) and intra-blocks for which the predictions were not correct (which will be referred hereafter as i blocks). At the shot boundary, the image content suddenly changes so that the predictions become incorrect and a number of i blocks is increased abruptly. By utilizing this property, a rate of i blocks with respect to a total number of blocks is calculated as the P picture change. This choice of the P picture change also has an effect for preventing the erroneous detection of a camera movement or an imaging target movement as a shot boundary.

Figure 9:
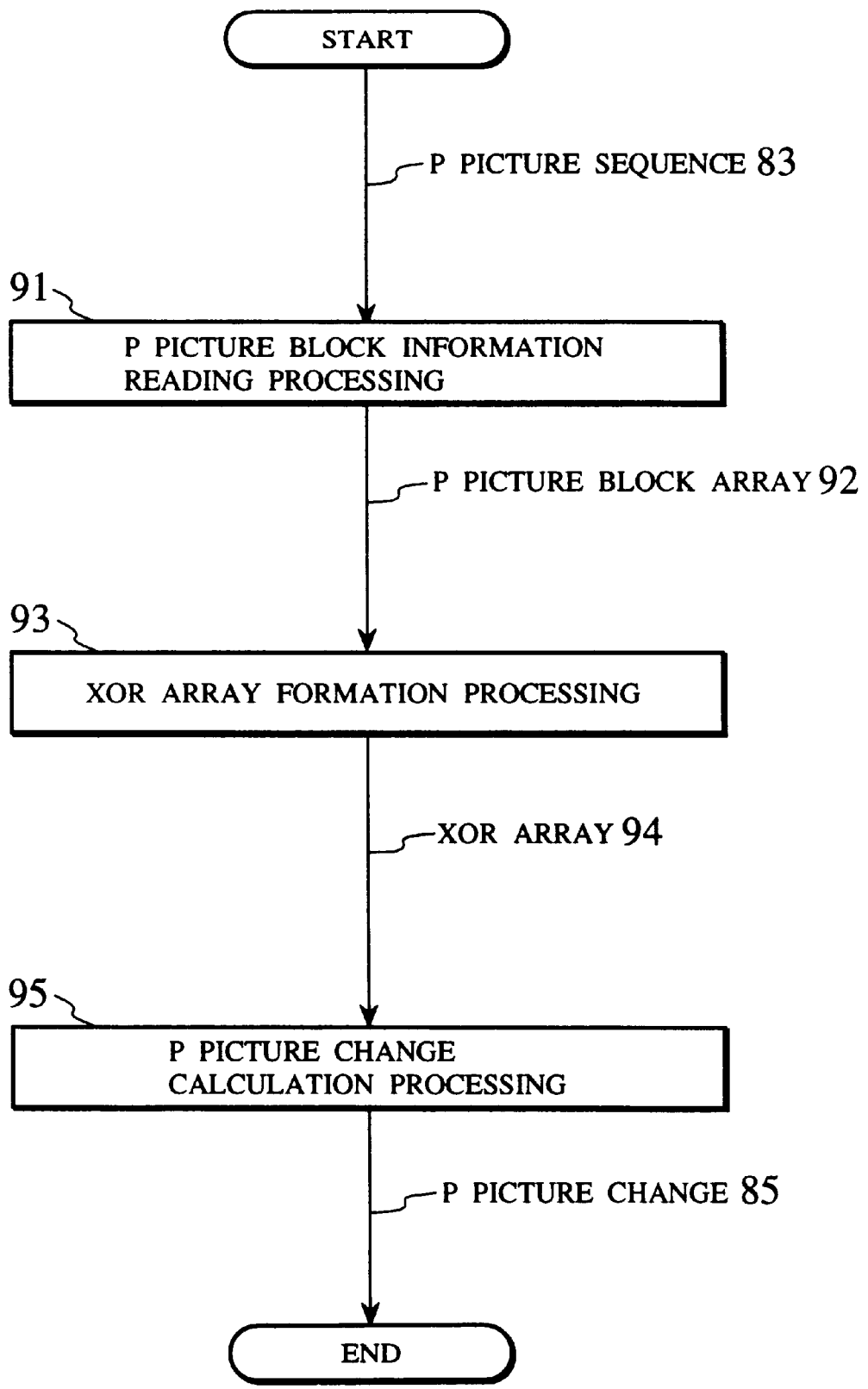
FIG. 9 is a flow chart for the processing by a P picture change calculation unit in the shot boundary detection apparatus of FIG. 8.

Alternatively, in the second exemplary implementation of the P picture change calculation unit 84, the P picture change calculation unit 84 operates according to the flow chart of FIG. 9 as follows. First, the P picture sequence 83 ($P_{h, k}$) is entered. Then, with respect to each entered P picture, a P picture block information reading processing 91 is carried out in order to read out positions and types of blocks in each entered P picture, from which a P picture block array 92 is obtained.

Figure 10:
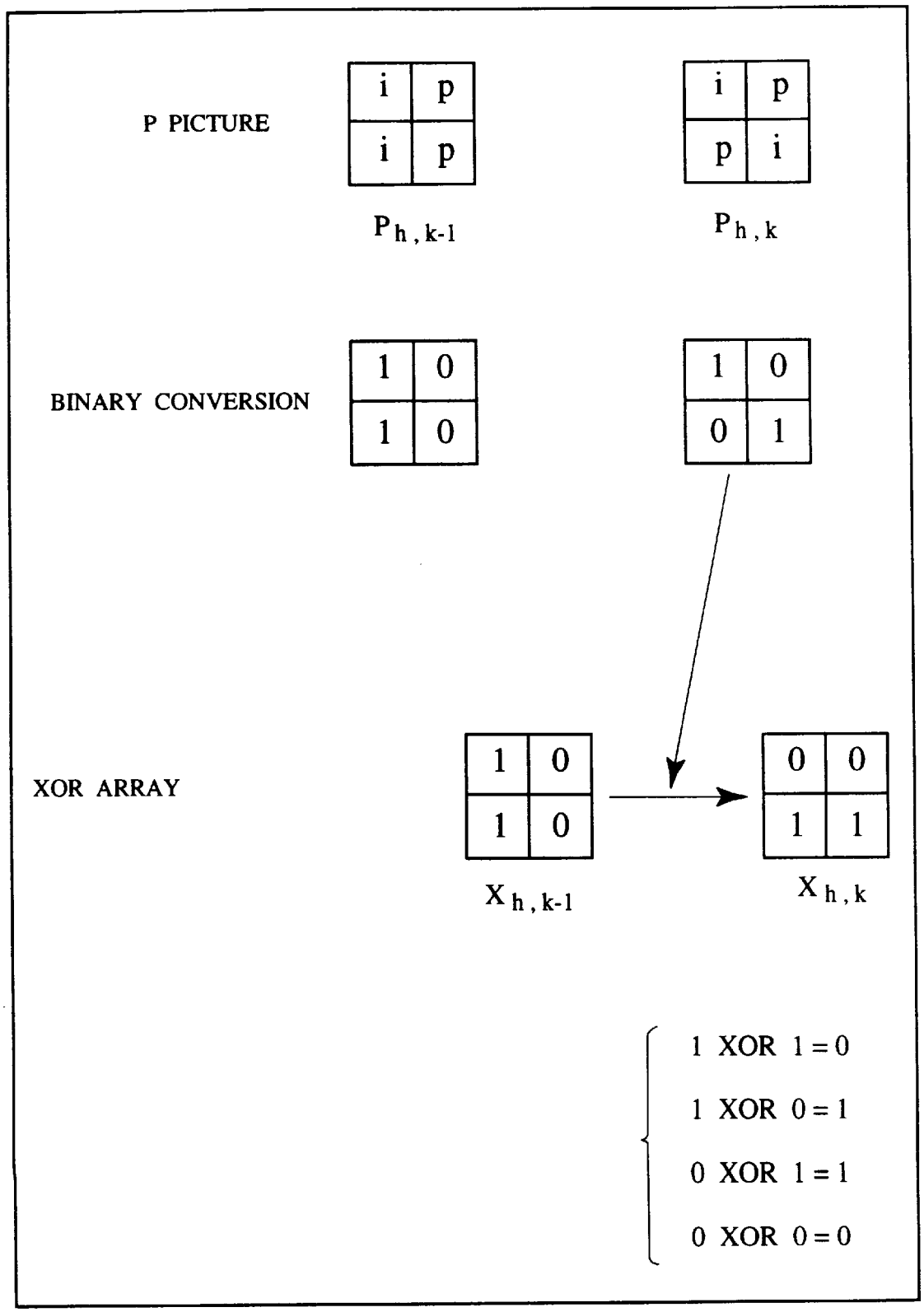
FIG. 10 is a diagram for explaining an XOR array formation processing in the processing according to FIG. 9.

Next, the binary conversion to regard the i block as "1" and the p block as "0" is applied to the obtained P picture block array 92, and an XOR array formation processing 93 is carried out. In this XOR array formation processing 93, as shown in FIG. 10, an XOR of the P picture of interest and a previous XOR array $X_{h, k-1}$ is calculated in order to form an XOR array $X_{h, k}$ for the P picture of interest. When this XOR array formation is repeated for a prescribed number of times, the XOR array is reset. A period for resetting the XOR array can be set up arbitrarily. By setting a longer period, it becomes easier to detect a gradual change but it becomes hard to detect shot boundaries which are occurring at short intervals.

In this first embodiment, the XOR arrays are sequentially formed for fourteen frames between one I picture and a next I picture. An exemplary transition of the XOR arrays for the P picture sequence containing an ordinary shot boundary, a wipe, or a flash are illustrated in FIGS. 11, 12 and 13, respectively.

Figure 11:
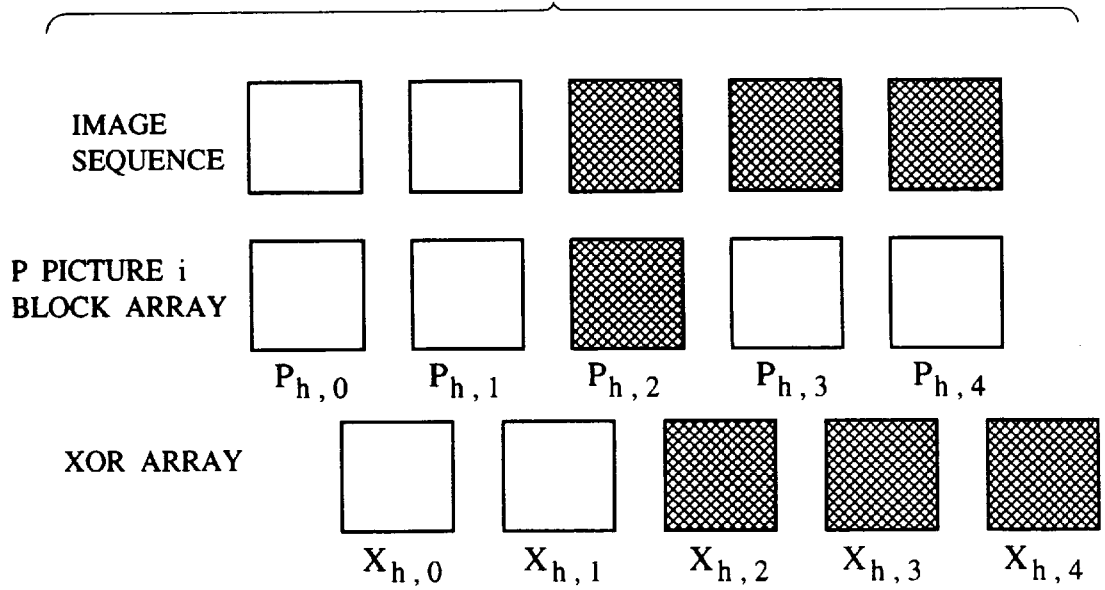
FIG. 11 is a diagram showing an exemplary transition of an image sequence, a P picture i block array, and an XOR array for a case of having an ordinary shot boundary in the first embodiment of the present invention.

For the P picture sequence containing an ordinary shot boundary, as shown in FIG. 11, many i blocks are produced immediately after the shot boundary, but a number of i blocks appearing thereafter is very small, so that a number of the value "1" on the XOR array remains high after the shot boundary.

Figure 12:
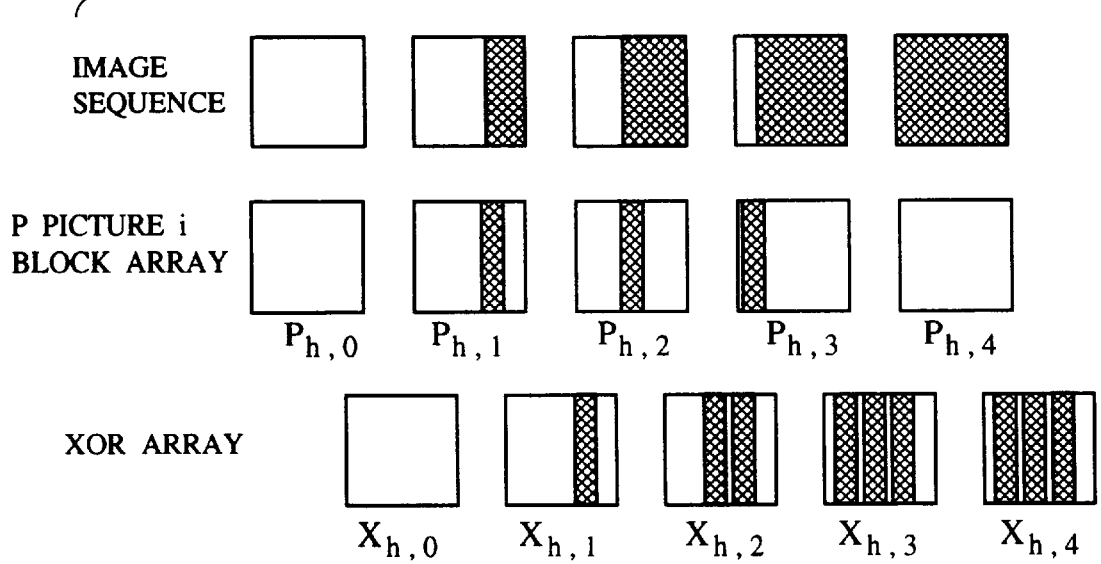
FIG. 12 is a diagram showing an exemplary transition of an image sequence, a P picture i block array, and an XOR array for a case of having a wipe in the first embodiment of the present invention.

For the P picture sequence containing a wipe, as shown in FIG. 12, the i blocks appear at sequentially displaced positions, so that the value "1" on the XOR array is sequentially accumulated.

Figure 13:
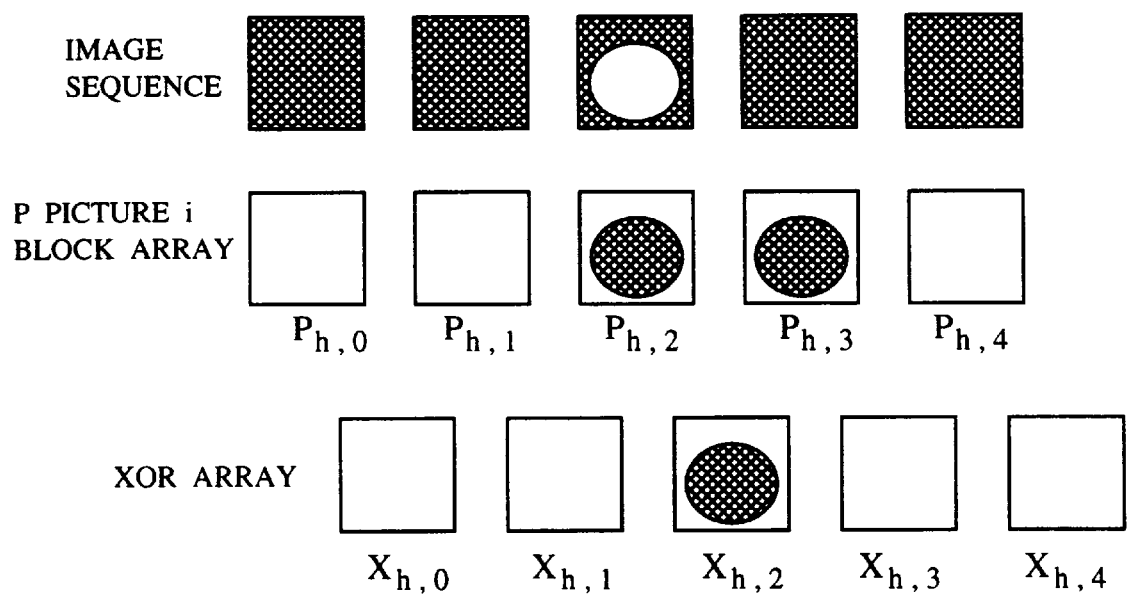
FIG. 13 is a diagram showing an exemplary transition of an image sequence, a P picture i block array, and an XOR array for a case of having a flash in the first embodiment of the present invention.

For the P picture sequence containing a flash, as shown in FIG. 13, the i blocks appear in a P picture with the flash and an immediately following P picture at nearly the same positions for nearly the same number. In this case, a number of the value "1" on the XOR array temporarily increases, but soon nullified thereafter.

Figure 14:
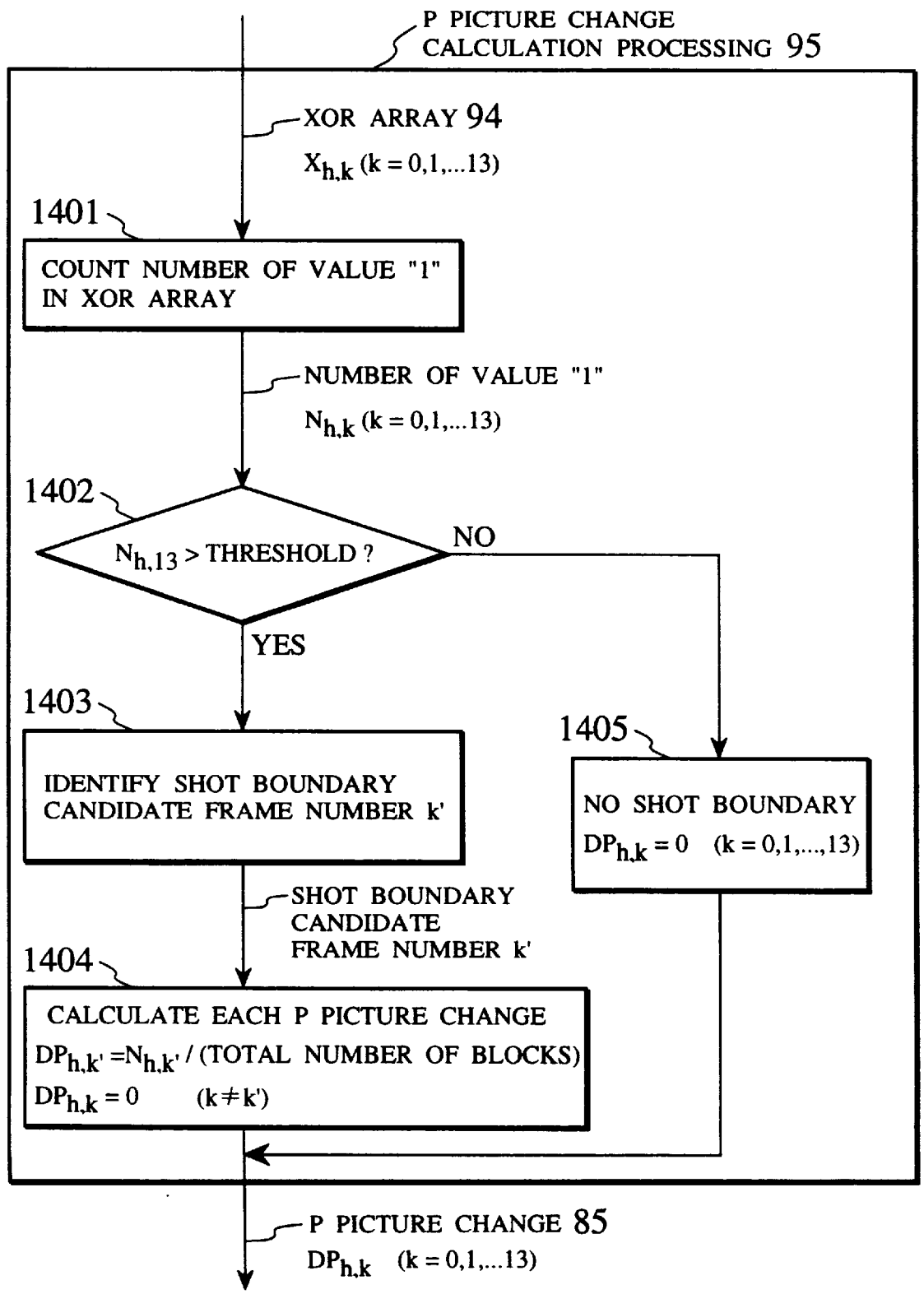
FIG. 14 is a flow chart for a P picture change calculation processing in the processing according to FIG. 9.

Next, a P picture change calculation processing 95 is carried out to obtain the P picture change 85, according to the flow chart of FIG. 14 as follows.

First, a number of the value "1" $N_{h, k}$ contained in the XOR array $X_{h, k}$ is counted as $N_{h, k}$ at the step 1401. When a shot boundary exists within the picture sequence group, a number of the value "1" $N_{h, 13}$ in the last XOR array $X_{h, 13}$ of this picture sequence group is large, so that whether this $N_{h, 13}$ is greater than a prescribed threshold or not is checked at the step 1402.

When $N_{h, 13}$ is greater than the prescribd threshold (step S1402 YES), it is judged that a shot boundary candidate exists in the picture sequence group h, and a frame number of the shot boundary candidate (shot boundary candidate frame number k') is identified by checking the past $N_{h, k}$ to find out a frame from which $N_{h, k}$ started to exceed the prescribed threshold at the step 1403.

Then, for $N_{h, k'}$ corresponding to the identified shot boundary candidate frame number k', a rate of this $N_{h, k'}$ with respect to a total number of blocks is calculated as the P picture change 85 ($DP_{h, k'}$), while the P picture change 85 ($DP_{h, k}$) for the other frame number $k \neq k'$ is set equal to zero, at the step 1404.

On the other hand, when $N_{h, 13}$ is not greater than the threshold (step S1402 NO), it is judged that there is no shot boundary and the P picture change 85 ($DP_{h, k}$) for every frame number k is set equal to zero, at the step 1405.

In this second exemplary implementation of the P picture change calculation unit 84, the P picture change is calculated by carrying out a spatial computation for emphasizing an ordinary shot boundary as well as a gradual shot boundary such as a wipe or a dissolve while removing a noise which is apparently not a shot boundary, so that it becomes easier to detect a shot boundary.

In a case of the ordinary shot boundary, the similar images continue after the shot boundary, so that a number of i blocks in the P picture is small.

There are various types of wipe, and in a case of the wipe using two static images before and after the shot boundary in which a front side image is gradually peeled to reveal a back side image, the i blocks appear along a portion which is gradually peeled. A number of i blocks appearing in the P picture during the wipe is very small, but a cumulative number of i blocks over several frames is large.

In the flash, the brightness is abruptly increased for one frame only and then immediately decreased thereafter, so that the i blocks appear in the P picture at which the flash is lit and an immediately following P picture, at nearly the same positions.

In the second exemplary implementation of the P picture change calculation unit 84, the spatial computation for obtaining the XOR array is utilized in order to emphasize the shot boundary and remove the noise, but it is also possible to carry out a spatial computation such as that for calculating the P picture change by producing a histogram, or that for calculating the P picture change according to an average value over several consecutive frames.

Next, the I picture change calculation unit 87 in the shot boundary detection apparatus of FIG. 8 will be described in further detail.

The I picture change calculation unit 87 calculates the I picture change from the I picture sequence 86. The I picture only contains i blocks. The DC component of the DCT coefficients of each i block indicates an average value of intensity or color difference components in each i block, so that it is possible to generate a contracted image from the DC component. In this first embodiment, the contracted image is generated by using the intensity component in the DC component, and a number of pixels for which a difference between corresponding pixels in adjacent contracted images is large is calculated as the I picture change.

Figure 15:
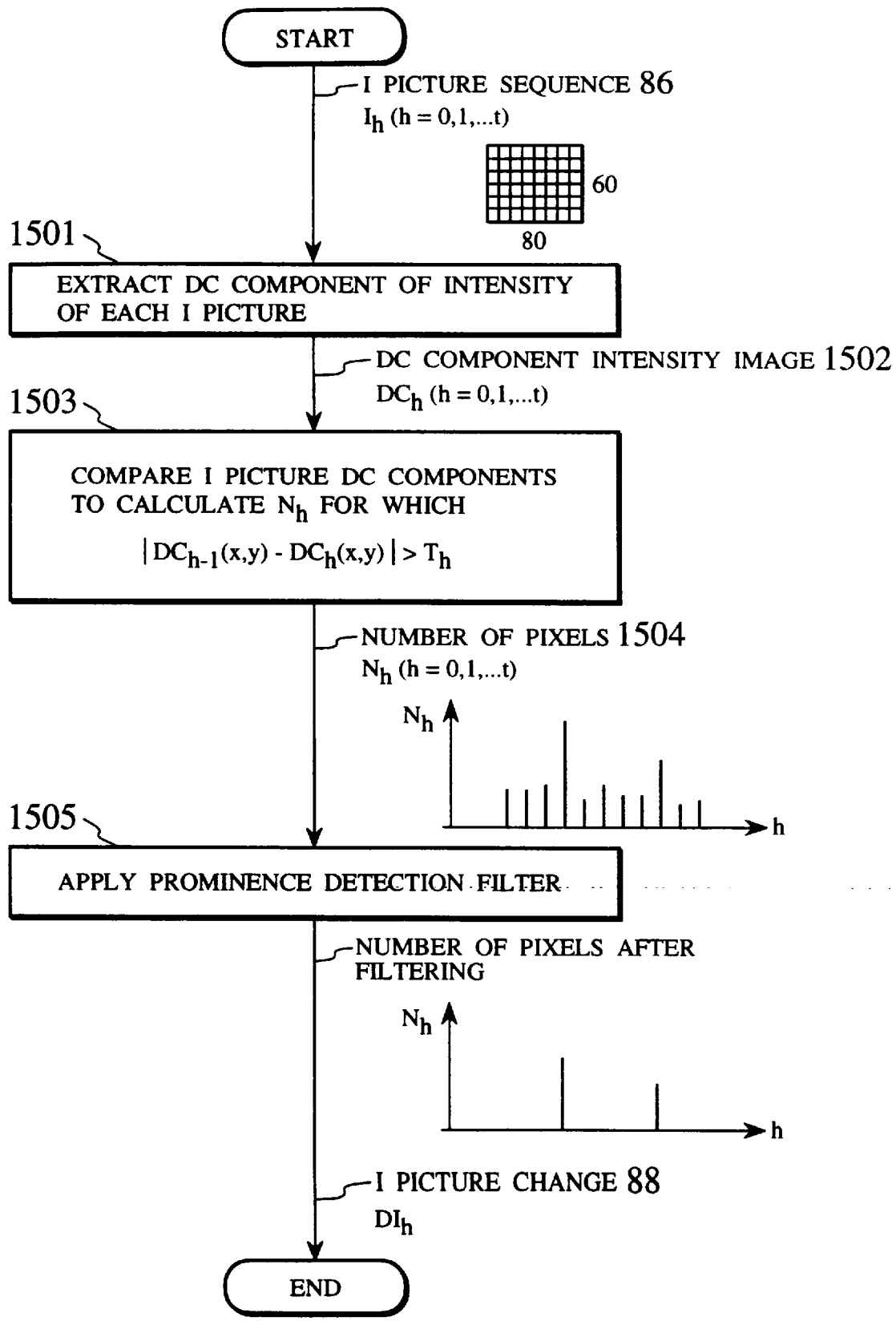
FIG. 15 is a flow chart for the processing by an I picture change calculation unit in the shot boundary detection apparatus of FIG. 8.

More specifically, the I picture change calculation unit 87 operates according to the flow chart of FIG. 15 as follows.

First, a DC component extraction processing 1501 is applied to the I picture sequence 86 in order to obtain a DC component intensity image 1502 ($DC_h$: h=0, 1, ..., t) from the intensity component in the DC component of the i block.

Next, by an I picture DC component comparison processing 1503, a number of pixels 1504 ($N_h$ h=0, 1, ..., t) for which a difference between the adjacent DC component intensity images is greater than a prescribed threshold $T_h$ is calculated. The number of pixels 1504 ($N_h$) becomes small when the image contents in the adjacent DC component intensity images are similar, whereas the number of pixels 1504 ($N_h$) becomes large when the image contents in the adjacent DC component intensity images are largely different.

Here, however, the difference can also be caused by a camera or imaging target movement, so that such a noise is removed by applying a prominence detection filter processing 1505. This prominence detection filter processing 1505 obtains a difference between the feature value $N_h$ of interest and the largest one among the several feature values ( ..., $N_{h-2}$, $N_{h-1}$, $N_{h+1}$, $N_{h+2}$, ... ) before and after the feature value $N_h$ of interest. In this first embodiment, the feature values for two frames before and two frames after the feature value of interest are used to obtain the I picture change 88 ($DI_h = N_h - \max\{N_{h-2}, N_{h-1}, N_{h+1}, N_{h+2}\}$) in which the noise such as a camera or imaging target movement is removed and the shot boundary is emphasized by the prominence detection filter processing as indicated in FIG. 15.

The contracted images to be generated at a time of calculating the I picture change can be monochromatic images using only the intensity component in the DC component, or color images using both the intensity and color difference components in the DC component. Here, it suffices for the I picture change to be a feature value which reflects an amount of change between the adjacent I pictures, so that it can alternatively be given by a difference in the intensity or the color between the corresponding pixels, a difference between histograms obtained according to the intensity and color of each image, or a difference between pixel blocks obtained by collecting several pixels. In this first embodiment, the prominence detection filter is applied at a time of calculating the I picture change, but it is also possible to use any other desired filter or no filter.

Next, the shot boundary detection unit 89 in the shot boundary detection apparatus of FIG. 8 will be described in further detail.

In the shot boundary detection unit 89, the shot boundary is obtained by combining the I picture change $DI_h$ and the P picture $DP_{h, k}$ obtained by the I picture change calculation unit 87 and the P picture change calculation unit 84 respectively.

In the first exemplary implementation of the shot boundary detection unit 89, thresholds TI and TP are set up for the I picture change $DI_h$ and the P picture change $DP_{h,\,k}$ respectively, and it is judged that a shot boundary exists whenever either one of these I picture change $DI_h$ and P picture change $DP_{h,\,k}$ exceeds the respective threshold. Note here that these thresholds TI and TP can be prescribed fixed ones, or variable ones as described in detail below.

Figure 16:
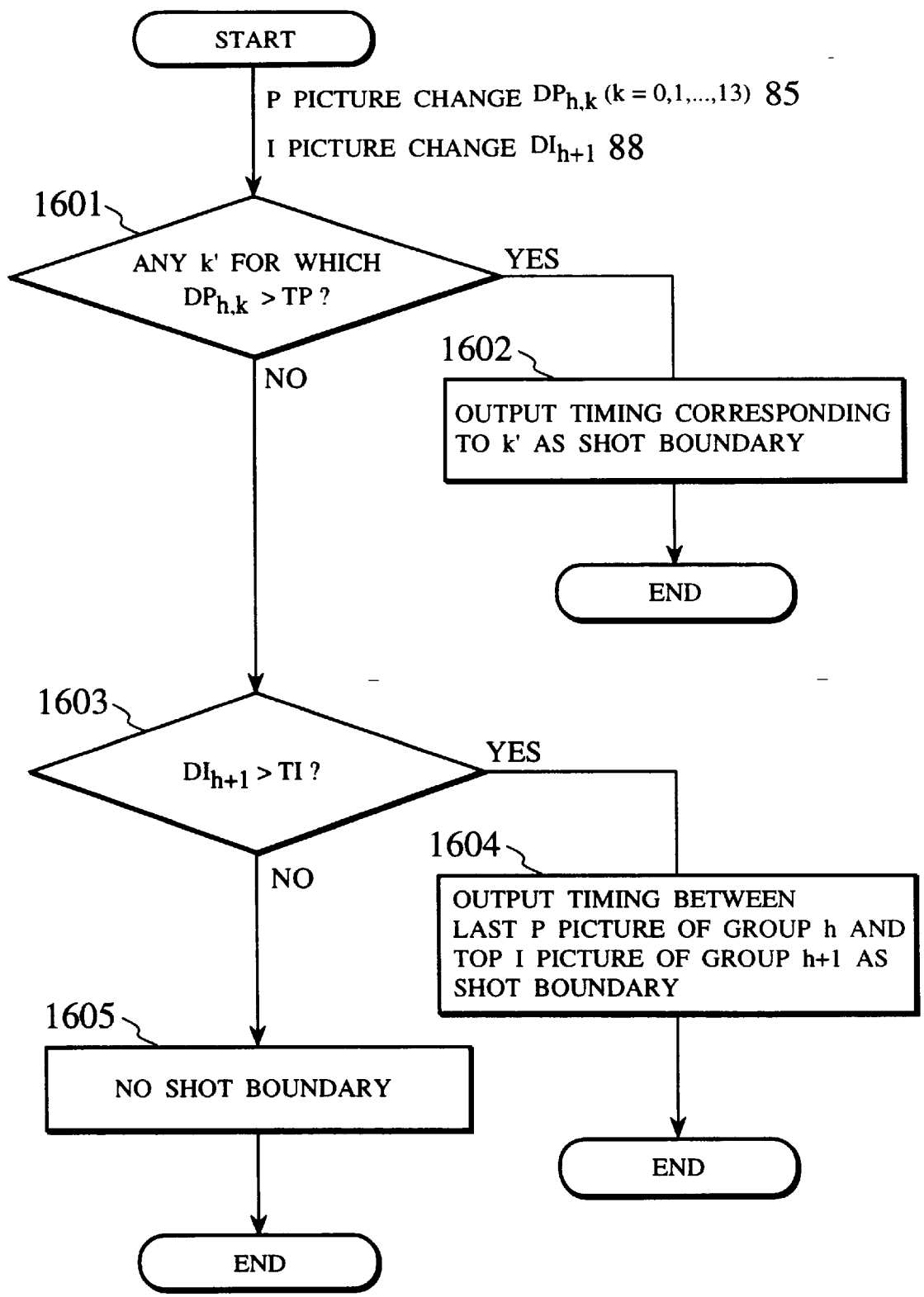
FIG. 16 is a flow chart for one implementation of the processing by a shot boundary detection unit in the shot boundary detection apparatus of FIG. 8.

More specifically, the shot boundary detection unit 89 in this first exemplary implementation operates according to the flow chart of FIG. 16 as follows.

First, whether there exists a frame number k' for which the P picture change $DP_{h,\,k}$ calculated from the P picture sequence 83 of each picture sequence group h is greater than the threshold TP or not is judged at the step 1601. When such a frame number k' exists (step 1601 YES), it is judged that a shot boundary exists at this frame number k', so that a timing corresponding to this frame number k' is outputted as a shot boundary at the step 1602, and the shot boundary detection processing for this picture sequence group h is finished regardless of the value of the I picture change $DI_h$.

Even when the P picture change $DP_{h,\,k}$ is not greater than the threshold TP (step 1601 NO), there is a possibility for the shot boundary to exist between the last P picture of this picture sequence group and the top I picture of the next picture sequence group, so that whether $DI_{h+1}$ is greater than the threshold TI or not is judged at the step 1603. When $DI_{h+1}$ exceeds the threshold TI (step 1603 YES), it is judged that a shot boundary exists between the last P picture of this picture sequence group h and the top I picture of the next picture sequence group h+1, so that a corresponding timing between the last P picture of this picture sequence group h and the top I picture of the next picture sequence group h+1 is outputted as a shot boundary at the step 1604, and the shot boundary detection processing for this picture sequence group h is finished.

When the I picture change $DI_{h+1}$ is not greater than the threshold TI (step 1603 NO), it is judged that there is no shot boundary in this picture sequence group h, and the shot boundary detection processing for this picture sequence group h is finished at the step 1605.

Alternatively, in the second exemplary implementation of the shot boundary detection unit 89, it is judged that a shot boundary exists when a weighted sum of the P picture change and the I picture change obtained by the P picture change calculation unit 84 and the I picture change calculation unit 87 is greater than a threshold.

Figure 17:
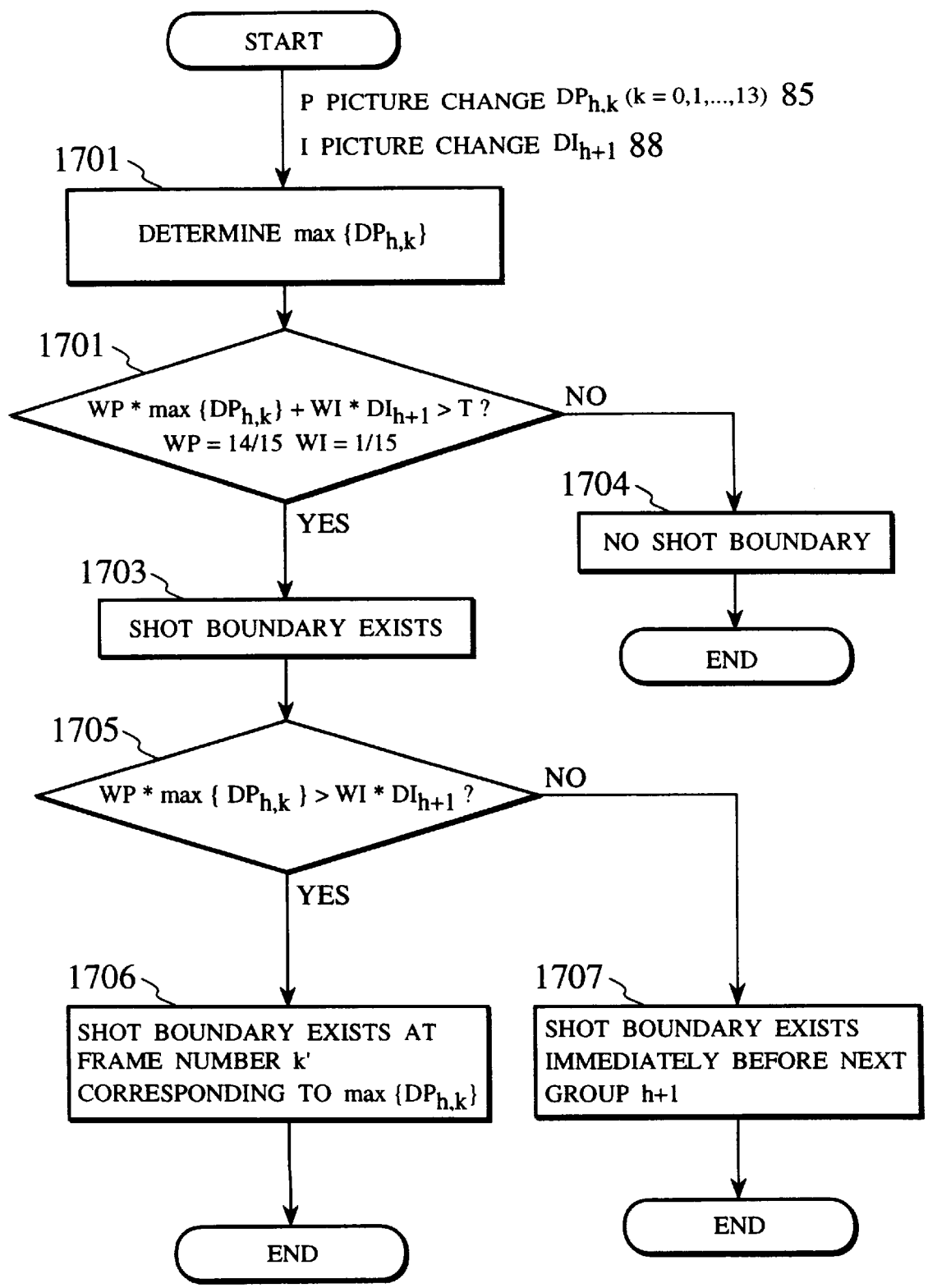
FIG. 17 is a flow chart for another implementation of the processing by a shot boundary detection unit in the shot boundary detection apparatus of FIG. 8.

More specifically, the shot boundary detection unit 89 in the second exemplary implementation operates according to the flow chart of FIG. 17 as follows.

First, the largest value $\max\{DP_{h,\,k}\}$ among the P picture changes $DP_{h,\,k}$ calculated from the P picture sequence 83 of each picture sequence group h is determined at the step 1701, and a weighted sum: $WP^*\max\{DP_{h,\,k}\}+WI^*DI_{h+1}$ is obtained by multiplying the largest P picture change $\max\{DP_{h,\,k}\}$ for the picture sequence group h with a weight WP while multiplying the I picture change $DI_{h+1}$ for the next picture sequence group h+1 with a weight WI and summing them, where WP=14/15 and WI=1/15 in this first embodiment.

Then, whether this weighted sum: $WP^*\max\{DP_{h,\,k}\}+WI^*DI_{h+1}$ is greater than the threshold T or not is judged at the step 1702. When this weighted sum is greater than the threshold T (step 1702 YES), it is judged that a shot boundary exists in this picture sequence group h at the step 1703, whereas when this weighted sum is not greater than the threshold T (step 1702 NO), it is judged that there is no shot boundary in this picture sequence group h at the step 1704.

When it is judged that a shot boundary exists in this picture sequence group h, the weighted largest P picture change $WP^*\max\{DP_{h,\,k}\}$ for this picture sequence group h and the weighted I picture change $WI^*DI_{h+1}$ for the next picture sequence group h+1 are compared at the step 1705. When the weighted largest P picture change $WP^*\max\{DP_{h,\,k}\}$ is larger (step 1705 YES), it is judged that a shot boundary exists at a frame number k' corresponding to the largest P picture change $\max\{DP_{h,\,k}\}$ at the step 1706. On the other hand, when the weighted I picture change $WI^*DI_{h+1}$ is larger (step 1705 NO), it is judged that a shot boundary exists immediately before the next picture sequence group h+1 at the step 1707.

Note that the weights WP and WI and the threshold T used in this operation of FIG. 17 can be prescribed fixed ones, or variable ones as described in detail below.

Alternatively, in the third exemplary implementation of the shot boundary detection unit 89, the threshold TI used in the first exemplary implementation of the shot boundary detection unit 89 described above is varied according to the frequency of appearance of the I pictures.

Namely, a correspondence table indicating an optimal threshold setting for each value of the frequency of appearance of the I pictures is produced in advance, and the setting of the threshold TI is varied according to the frequency of appearance of the I pictures using this correspondence table.

When the frequency of appearance of the I pictures is high, the I pictures are present at close intervals, so that the image content change due to a camera or imaging target movement is small and the I picture change is small, so that a camera or imaging target movement will not be erroneously detected as a shot boundary even when the threshold TI is set to be low. On the other hand, by setting the threshold TI lower, it becomes possible to prevent an overlooking of a shot boundary with a relatively small image content change.

When the frequency of appearance of the I pictures is low, the image content change due to a camera or imaging target movement is large and the I picture change is large, so that the threshold TI is set to be high in order to prevent an erroneous detection of a camera or imaging target movement as a shot boundary.

When the frequency of appearance of the I pictures is very high, the shot boundary can be detected by using the I picture change alone. Namely, by extracting the DC component of the DCT coefficients from the I picture, the contracted image for the I picture can be generated, Then, by subjecting this contracted image to the conventional shot boundary detection scheme designed for the noncompressed video data, it is possible to detect the shot boundary at nearly the same accuracy as in the conventional shot boundary detection scheme. In this first embodiment, when the I picture appears more frequently than ten frames per second, the shot boundary detection using only the I pictures is carried out.

Similarly as in the above described case of varying the threshold TI according to the frequency of appearance of the I pictures, it is also possible to vary the threshold TP according to the frequencies of appearance of different pictures, as follows.

The P pictures are motion compensation prediction coded so that the P pictures have an advantage of being not easily influenced by a motion. For this reason, there is no need to vary the threshold TP when the I pictures or the P pictures are consecutively appearing. However, when the B picture appears between the P picture sequences, an interval between the P pictures becomes wide so that the influence of a motion of a camera or an imaging target in the image appears larger compared with a case of the P pictures appearing consecutively. Consequently, the threshold TP for the P picture change can be varied according to whether the P pictures are consecutively appearing or the B picture is appearing, that is, according to the frequency of appearance of the B pictures.

For example, the threshold TP is varied to be different for a case in which no B picture appears between two P picture frames and for a case in which two B picture frames appear between two P picture frames. When it is easier to be influenced by a motion, many intra-blocks tend to appear and the picture change tends to be larger, so that the threshold TP is set lower when no B picture appears, whereas the threshold TP is set higher when two B picture frames appear.

Also, similarly as in the above described case of varying the threshold TI or TP according to the frequencies of appearance of the I pictures and the P pictures, it is also possible to vary the weight WI or WP for the I pictures or the P pictures according to the frequencies of appearance of the I pictures and the P pictures, as follows.

Namely, instead of setting weights WI and WP fixedly to 1/15 and 14/15 as in the second exemplary implementation of the shot boundary detection unit 89, it is possible to make the weight WI larger or smaller according to whether the frequency of appearance of the I pictures is high or low, and to make the weight WP larger or smaller according to whether the frequency of appearance of the P picture is high or low. For example, when the I picture appears more frequently than ten frames per second, the weight WI is set equal to 15/15=1 while the weight WP is set equal to 0. In this manner, it is possible to switch a procedure for evaluating the P picture change and the I picture change according to frequencies of appearance of the P pictures and the I pictures.

In the first embodiment described above, it is assumed that the thresholds are automatically given by the shot boundary detection apparatus, but it is also possible to freely vary the thresholds by additionally providing a user interface unit. For example, it is possible to provide the user interface unit along with a function for displaying an image immediately after the shot boundary so that it becomes easier for a user to browse through the compressed video data content. Then, by allowing the user to set up the thresholds at any desired values, it is possible to adjust a number of images for showing the compressed video data content according to the user's preference so that it becomes easier for the user to make an access to the desired scene.

Similar modifications may also be made for the threshold and the weights used in the second exemplary implementation of the shot boundary detection unit 89 described above.

As described, according to this first embodiment, the shot boundaries are detected from the compressed image data sequence by using various information contained in the intra-frame/intra-field coded images and the inter-frame/inter-field forward direction prediction coded images, so that it becomes possible to detect the shot boundaries at high speed and high accuracy stably, without requiring the decoding of the coded video data.

In particular, in this first embodiment, the shot boundaries are detected by using only the coded video data without decoding the coded video data, so that it is possible to detect the shot boundaries by deriving some information from the coded video data.

Also, in the conventional shot boundary detection scheme using only the inter-frame/inter-field forward direction prediction coded images, there has been a problem that it is not possible to detect a shot boundary located at a boundary of the inter-frame/inter-field forward direction prediction coded image and the intra-frame/intra-field coded image. In contrast, in this first embodiment, this problem is resolved by combining the P picture change and the I picture change which are independently obtained from the inter-frame/inter-field forward direction prediction coded image sequence and the intra-frame/intra-field coded image sequence respectively.

Moreover, in this first embodiment, a rate of regions for which the inter-frame/inter-field predictions were not correct with respect to an entire field is used as the P picture change. In the inter-frame/inter-field forward direction prediction coding scheme, the prediction is made while searching the resembling region between the present image and the past image at a time of coding blocks. A camera movement and an imaging target movement contained in the original video are recorded as a motion vector indicating a displacement of a position of the resembling region at a time of prediction, and the prediction is usually correct even when there is a camera or imaging target movement. Consequently, when a rate of regions for which the inter-frame/inter-field predictions were not correct with respect to an entire field is used as the P picture change, a camera or imaging target movement is not reflected in the P picture change, so that a camera or imaging target movement is usually not erroneously detected as a shot boundary. In this manner, the problem (ii) mentioned in the background of the invention section can be resolved in this first embodiment.

Furthermore, in this first embodiment, it is possible for either one or both of the inter-frame/inter-field forward direction prediction coded image change calculation process and the intra-frame/intra-field coded image change calculation process to incorporate a process for obtaining a region at which a change occurred between adjacent images in the image sequence as a changed region, and a process for applying a prescribed spatial calculation to a time series of the changed region and then integrating over a time.

In this manner, a noise such as a flash is removed by applying the spatial calculation to a region at which the change occurred between the adjacent images of the image sequence, so that the problem (iii) mentioned in the background of the invention section can be resolved. In addition, by carrying out the integration over a time after the spatial calculation is applied, it becomes possible to detect a gradual change such as a wipe correctly, so that the problem (iv) mentioned in the background of the invention section can also be resolved.

Moreover, in this first embodiment, it is judged that a shot boundary exists at a timing where the P picture change DP exceeds the threshold TP or the I picture change DI exceeds the threshold TI, Furthermore, in this first embodiment, it is possible for the shot boundary detection process to incorporate a process for measuring frequencies of appearance of the P pictures and the I pictures, and a procedure for evaluating the P picture change DP and the I picture change DI is switched according to the measured frequencies of appearance.

Moreover, in this first embodiment, it is possible for the shot boundary detection process to incorporate a process for measuring frequencies of appearance of the P pictures and the I pictures, and the thresholds TP and TI for the P picture change DP and the I picture change DI are controlled according to the measured frequencies of appearance.

In this case, a manner of combining the P picture change DP and the I picture change DI is varied according to the frequencies of appearance of the P pictures and the I pictures at a time of detecting the shot boundary. When the frequency of appearance of the I pictures is high, the I picture change DI is mainly used while the P picture change DP is supplementary used for improving the detection accuracy. On the other hand, when the frequency of appearance of the P pictures is high, the P picture change DP is weighted more heavily in the evaluation.

In this manner, the shot boundary is detected by combining the P picture change and the I picture change according to the frequencies of appearance of the P pictures and the I pictures, so that it is possible to detect the shot boundary at high accuracy even when the frequency of appearance of the I pictures is low, while it is also possible to detect the shot boundary located immediately before the I picture which cannot be detected by using the P pictures alone. In other words, the shot boundary can be detected regardless of the frequencies of appearance of the P pictures and the I pictures so that the problem (v) mentioned in the background of the invention section can be resolved.

Referring now to FIG. 18 to FIG. 21, the second embodiment of a shot boundary detection scheme according to the present invention will be described in detail.

In this second embodiment, the first embodiment described above is modified as follows. Namely, in the first embodiment described above, the feature values are calculated from the I picture sequence and the P picture sequence separately, and then combined in the shot boundary detection processing so as to realize a stable shot boundary detection regardless of the frequencies of appearance of the I pictures and the P pictures. In addition, in this second embodiment, both of the I picture sequence and the P picture sequence are utilized in calculating the I picture change and the P picture change so that full advantages of both can be taken and their disadvantages can be complemented each other, and therefore it becomes possible to realize the shot boundary detection at even higher accuracy.

In the MPEG coded data in general, the P pictures usually have a higher frequency of appearance than the I pictures. Consequently, the I picture change (feature value) based on an information of the I pictures alone indicates global changes, while the P picture change (feature value) based on an information of the P pictures alone indicates more local changes. In addition, the P picture change contains an information on a motion compensation, so that the P picture change is less affected by an influence of a camera or imaging target movement than the I picture change. On the other hand, the shot boundary detection according to the P picture change has a drawback in that an instantaneously generated noise such as a noise due to a flash or a fast traversing object has a greater possibility for being erroneously detected as a shot boundary.

In view of these facts, in this second embodiment, the P picture change is corrected by utilizing the I picture change which is a global feature value that is less affected by an instantaneously generated noise. In this manner, it becomes possible to realize a stable shot boundary detection which is not affected by local noises.

More specifically, an exemplary implementation of such a correction of the P picture change by the I picture change for the purpose of removing noises is as follows.

In the first embodiment described above, the P picture change calculation procedure capable of preventing an erroneous detection of a sudden change due to a flash or a camera or imaging target movement has been described. Namely, in the P picture change calculation procedure for calculating the P picture change by forming the XOR array, it is possible to remove a noise due to a flash by carrying out XOR calculation, because the blocks (which will also be referred to as macro-blocks in the following) at corresponding positions in a frame at which a flash is lit and an immediately following frame are going to be the intra-blocks (which will also be referred to as intra-macro-blocks in the following). This procedure based on the XOR array is effective in cancelling out an influence of a noise such as a flash, and detecting a gradual change such as a dissolve.

Figure 18:
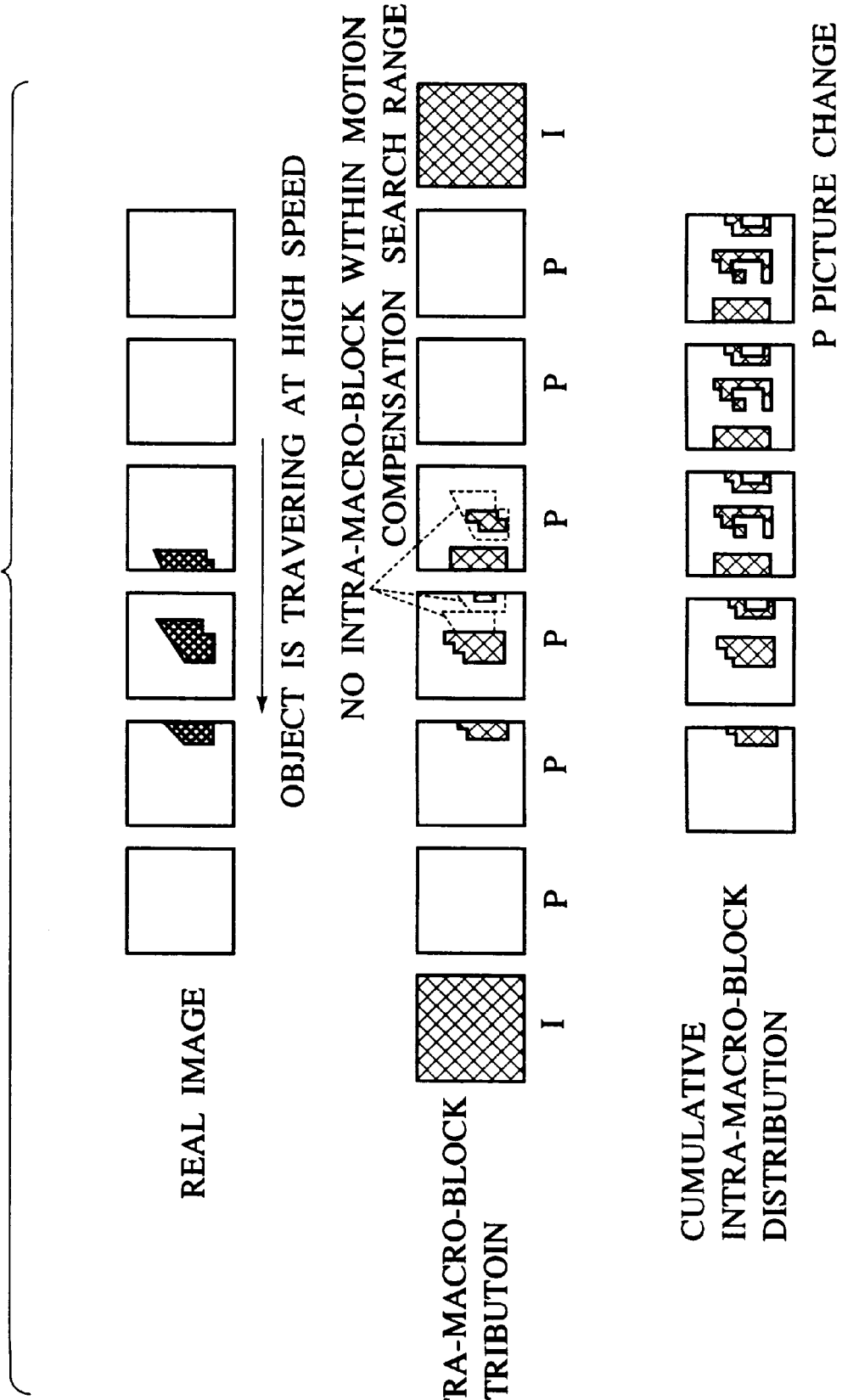
FIG. 18 is a diagram showing a real image, an intra-macro-block distribution, and a cumulative intra-macro-block distribution in a case of having a fast traversing object.

However, when there is a fast traversing object, as indicated in FIG. 18, the intra-macro-blocks also appear in conjunction with an edge region of this fast traversing object, and the procedure based on the XOR array cannot cancel out such a noise due to the fast traversing object so that a large P picture change will be obtained.

On the other hand, since this object traverses so quickly, the components of the corresponding I pictures coincide with each other and therefore the I picture change based on the I picture comparison is small.

Consequently, the P picture change is large while the I picture change is small in this case, and depending on a procedure for evaluating these P picture change and I picture change, there is a possibility for erroneously detecting this fast traversing object as a shot boundary even through there is actually no shot boundary.

Figure 19:
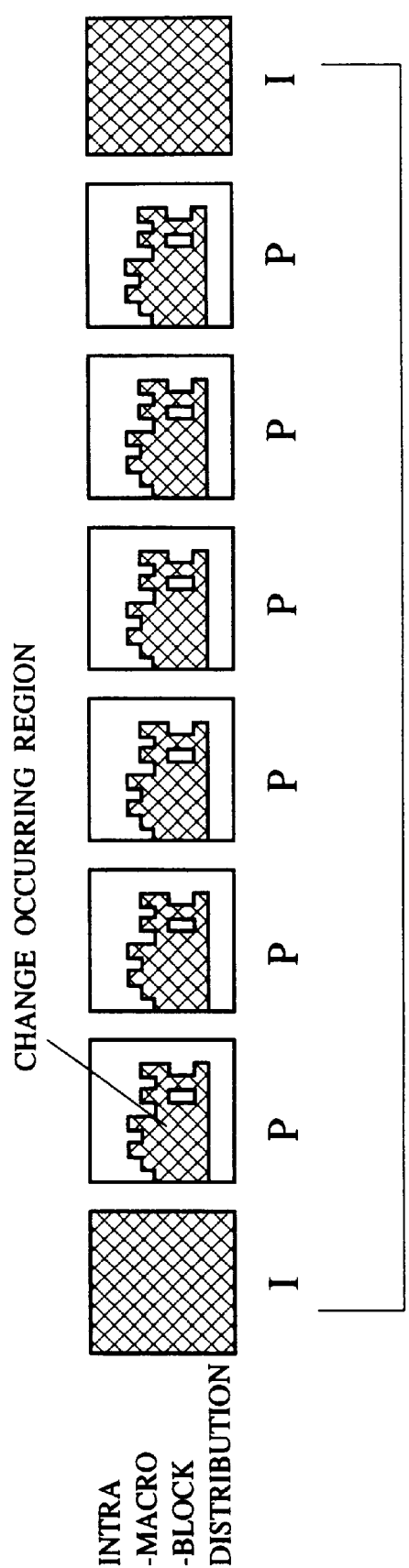
FIG. 19 is a diagram for explaining an exemplary implementation of a correction of a P picture change by an I picture change according to the second embodiment of the present invention.

In order to resolve this problem, in this second embodiment, the P picture change calculated from the P picture sequence is corrected by deleting values at macro-blocks on the P picture sequence which are corresponding to those macro-blocks on the I picture sequence which are judged similar by the I picture macro-block comparison, and this corrected P picture change is used as the feature value. In other words, as indicated in FIG. 19, the intra-macro-block distribution is accumulated by using only those intra-macro-blocks within a change occurring region on the P picture, where this change occurring region on the P picture corresponds to a region on the I picture in which a change occurred.

Figure 20:
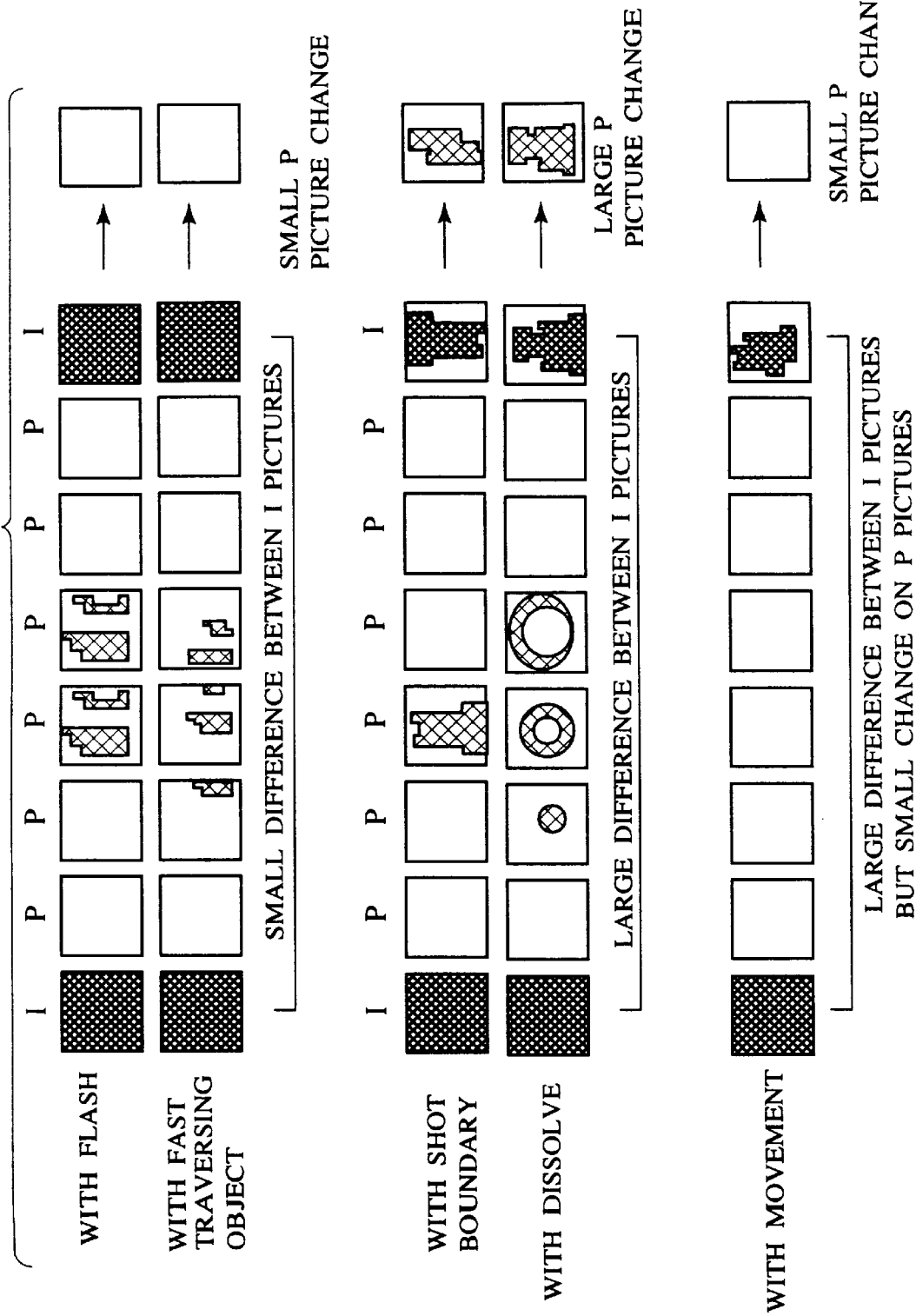
FIG. 20 is a diagram showing exemplary I picture and P picture contents for five different cases which are processed according to the second embodiment of the present invention.

FIG. 20 shows exemplary I picture and P picture contents for five different cases of: a case with a flash on the P picture sequence, a case with a fast traversing object on the P picture sequence, a case with a shot boundary on the P picture sequence, a case with a dissolve on the P picture sequence, and a case with a camera or imaging target movement on the P picture sequence, which are processed according to this second embodiment.

In a case with a flash and a case with a fast traversing object, there is only a small difference between the I pictures, so that only a small P picture change is obtained.

In a case with a shot boundary and a case with a dissolve, there is a large difference between the I pictures, so that a large P picture change is also obtained.

In a case with a camera or imaging target movement, there is a large difference between the I pictures but there is only a small change on the P pictures because of the motion compensation, so that only a small P picture change is obtained.

Thus, according to this second embodiment, it becomes possible to realize a stable shot boundary detection by calculating the P picture change according to an information obtained from the I pictures.

Next, another feature of this second embodiment concerning a correction of the I picture change by utilizing the P picture change will be described.

In the most MPEG data, the I pictures appears periodically so that it is impossible to detect a shot boundary located immediately before the I picture by the shot boundary detection scheme based on the P picture change alone as already mentioned above. In this regard, in the first embodiment described above, such a shot boundary is detected by using the I picture change obtained by the I picture comparison. However, the I picture change is a global feature value so that there is a need to eliminate an influence of a change on the P pictures which are present between the I pictures, in order to correctly detect a shot boundary located immediately before the I picture. Here, the change on the P pictures include those due to a shot boundary, a flash, and a camera or imaging target movement.

To this end, in this second embodiment, the changes on the P pictures which are likely to influence the detection of a shot boundary by the I picture comparison are recorded, and the I picture change calculated by the I picture comparison is corrected by removing the recorded changes on the P pictures, so as to be able to correctly detect a shot boundary located immediately before the I picture.

More specifically, one exemplary implementation of such a correction of the I picture change by the P picture change is as follows.

The I picture change calculated by the straightforward I picture comparison can be affected by a camera or imaging target movement. For this reason, a trajectory of the camera or imaging target movement on the image field is traced by utilizing the motion compensation prediction vectors of the P pictures in advance, and a search range for macro-blocks to be compared is narrowed by utilizing an information on likely positions of corresponding macroblocks on the I picture of interest and the I picture to be compared, so that it becomes possible to calculate the I picture change accounting for the camera or imaging target movement by the I picture comparison. By cancelling out the camera or imaging target movement in this manner, it is also possible to prevent an erroneous detection of an object traversing the image field as a shot boundary.

Next, another exemplary implementation of such a correction of the I picture change by the P picture change is as follows.

The I picture change obtained from the I picture sequence is also used for a detection of a shot boundary located between a P picture and an I picture which cannot be detected by the P picture change. In such a case, it is impossible to judge whether the detected shot boundary is due to a change occurred on the P pictures or a change occurred between a P picture and an I picture, on a basis of the I picture change obtained by the straightforward I picture comparison alone. In order to make such a judgement, there is a need for a processing to remove an influence due to a change on the P pictures from the I picture change.

The movement or the brightness change on the P pictures appear in forms of inter-frame/inter-field forward direction prediction coded blocks (which will also be referred to as inter-macro-blocks) with large residual errors after motion compensation or the intra-blocks (intra-macro-blocks). For this reason, in this second embodiment, regions at which the Intra-macro-blocks or the inter-macro-blocks with large residual errors after motion compensation appeared on the P pictures are sequentially accumulated and recorded. These recorded regions correspond to the changes on the P pictures, and should be removed at a time of the I picture comparison for the purpose of obtaining the change between a P picture and an I picture.

Figure 21:
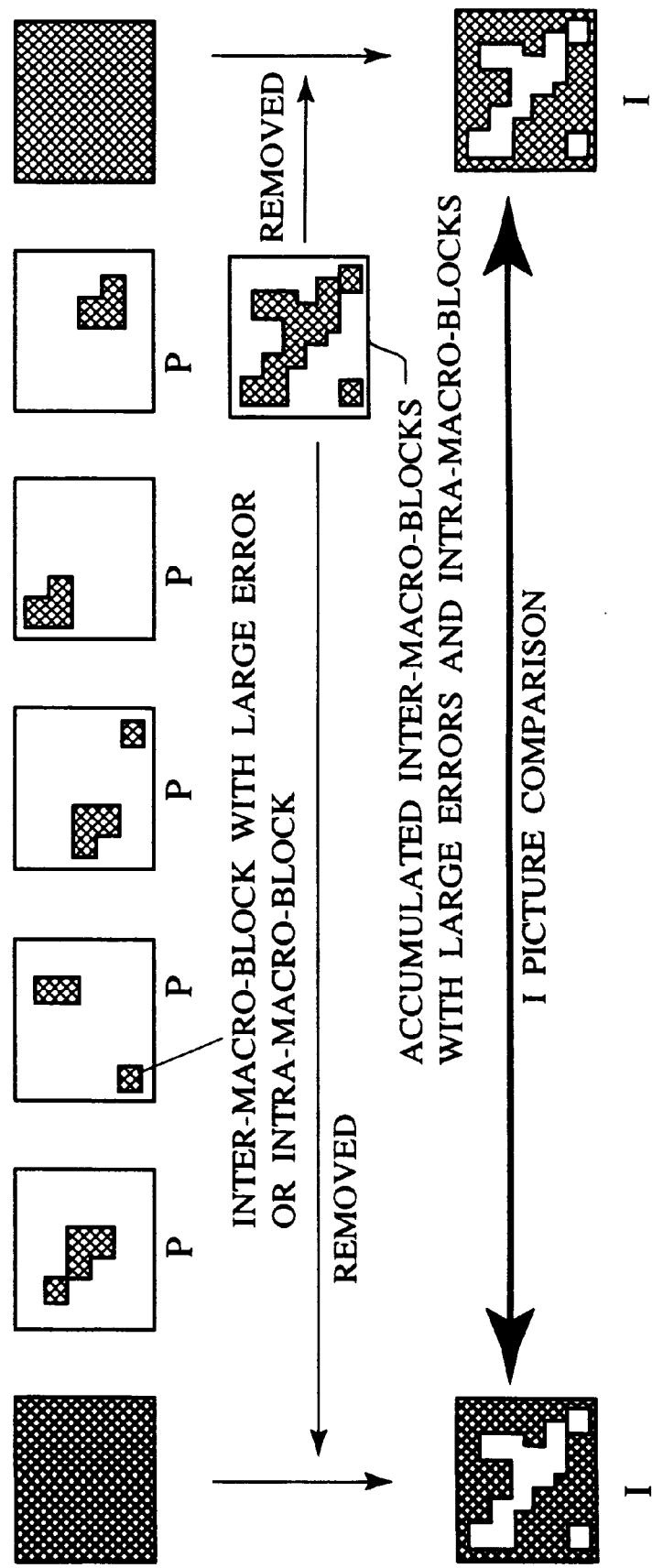
FIG. 21 is a diagram for explaining an exemplary implementation of a correction of an I picture change by a P picture change according to the second embodiment of the present invention.

Therefore, in this second embodiment, as indicated in FIG. 21, the I picture change values calculated from those regions corresponding to the recorded regions on the P pictures are removed from the straightforwardly calculated I picture change at a time of the I picture comparison for the purpose of obtaining the change between a P picture and an I picture.

Referring now to FIG. 22 to FIG. 26, the third embodiment of a shot boundary detection scheme according to the present invention will be described in detail.

In this third embodiment, a section S in which a shot boundary may possibly be existing is determined according to coded data of the inter-frame/inter-field coded frames, and feature values are calculated only for the inter-frame/inter-field coded frames contained within this section S, so as to reduce a time required for the decoding and variable length code decoding processing. In addition, by detecting a shot boundary according to the feature value calculated from the inter-frame/inter-field coded frames, it becomes possible to detect a shot boundary correctly even when the inter-frame/inter-field coded frames and the intra-frame/intra-field coded frames are mixedly present.

Moreover, the section S in which a shot boundary may possibly be existing is further narrowed to a section S' by using an amount of coded data constituting the inter-frame/inter-field coded frames contained in the section S as the feature value, and the shot boundary detection processing based on the feature values of the inter-frame/inter-field coded frames is realized by carrying out the variable length code decoding processing only with respect to the inter-frame/inter-field coded frames contained within this section S', so that a calculation time required for the variable length code decoding processing is reduced and the even faster shot boundary detection is realized.

Furthermore, when the coded frames contained within the section S' are the inter-frame/inter-field coded frames and the intra-frame/intra-field coded frames, the shot boundary detection is realized by carrying out the decoding only with respect to these coded frames, so that the even more accurate shot boundary detection is realized at high speed even when the intra-frame/intra-field coded frames and the inter-frame/inter-field coded frames are mixedly present.

Figure 22:
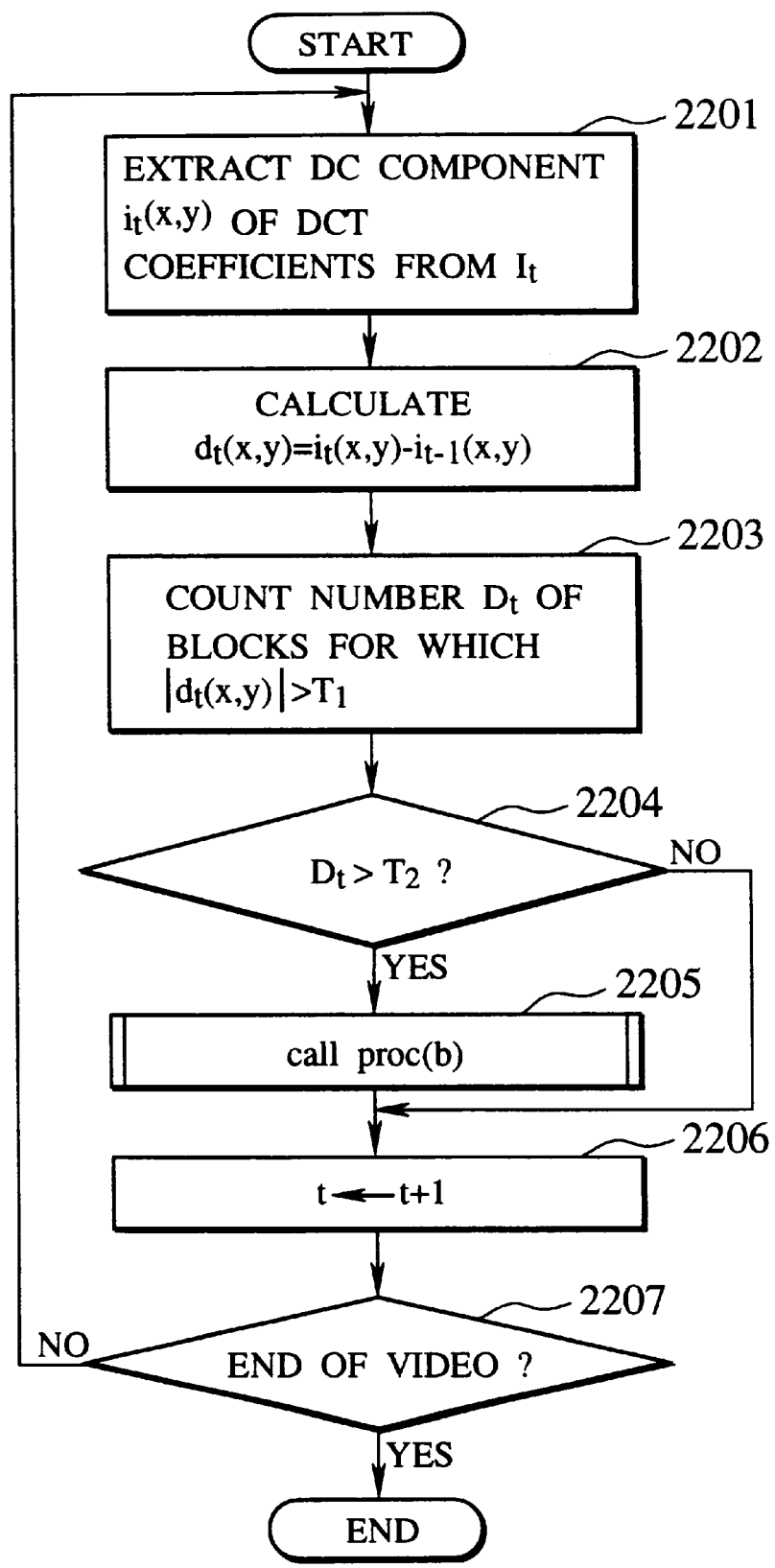
FIG. 22 is a flow chart for a main routine of the shot boundary detection processing according to the third embodiment of the present invention.
Figure 23:
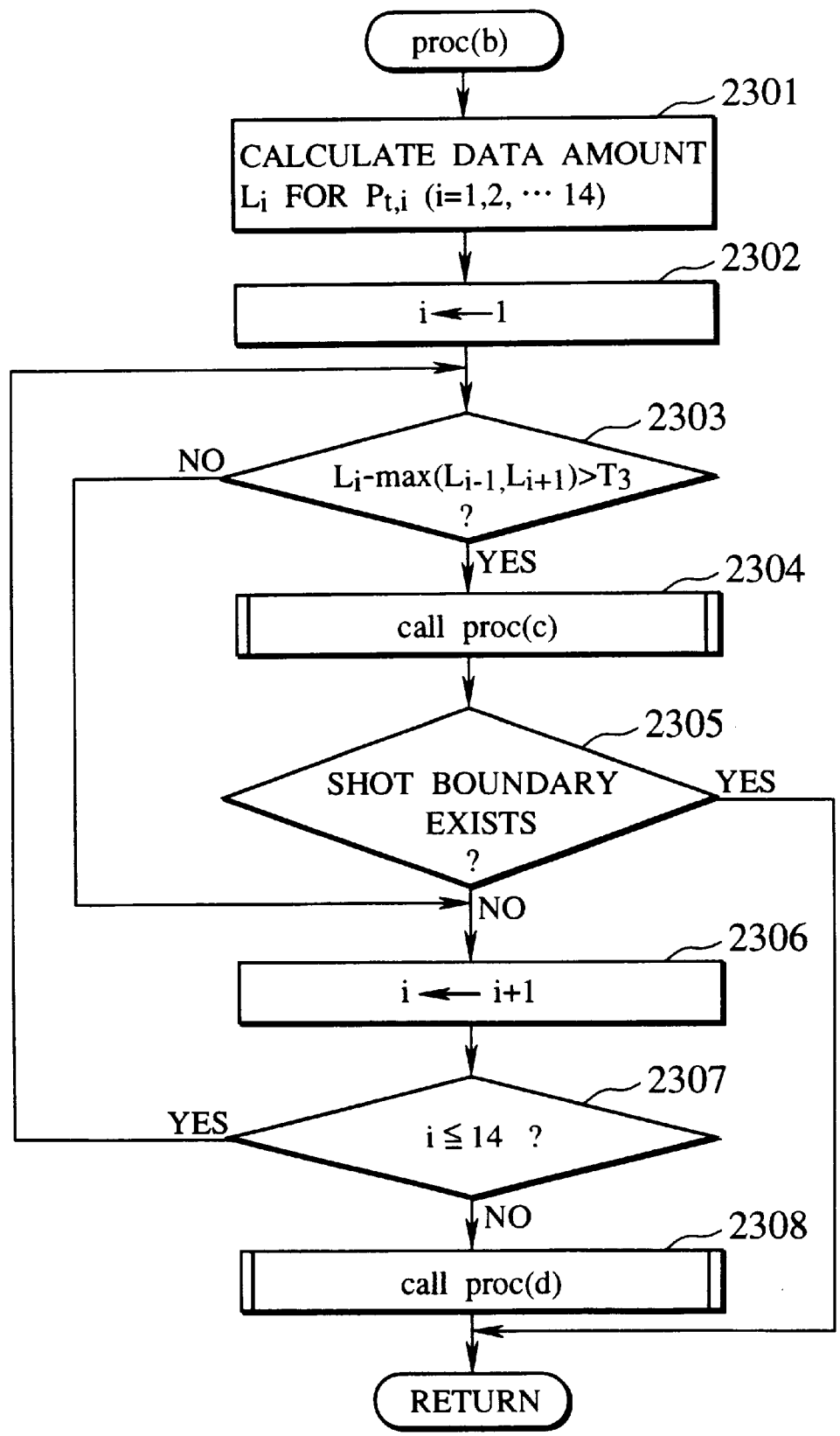
FIG. 23 is a flow chart for a sub-routine proc(b) of the shot boundary detection processing according to the third embodiment of the present invention.
Figure 24:
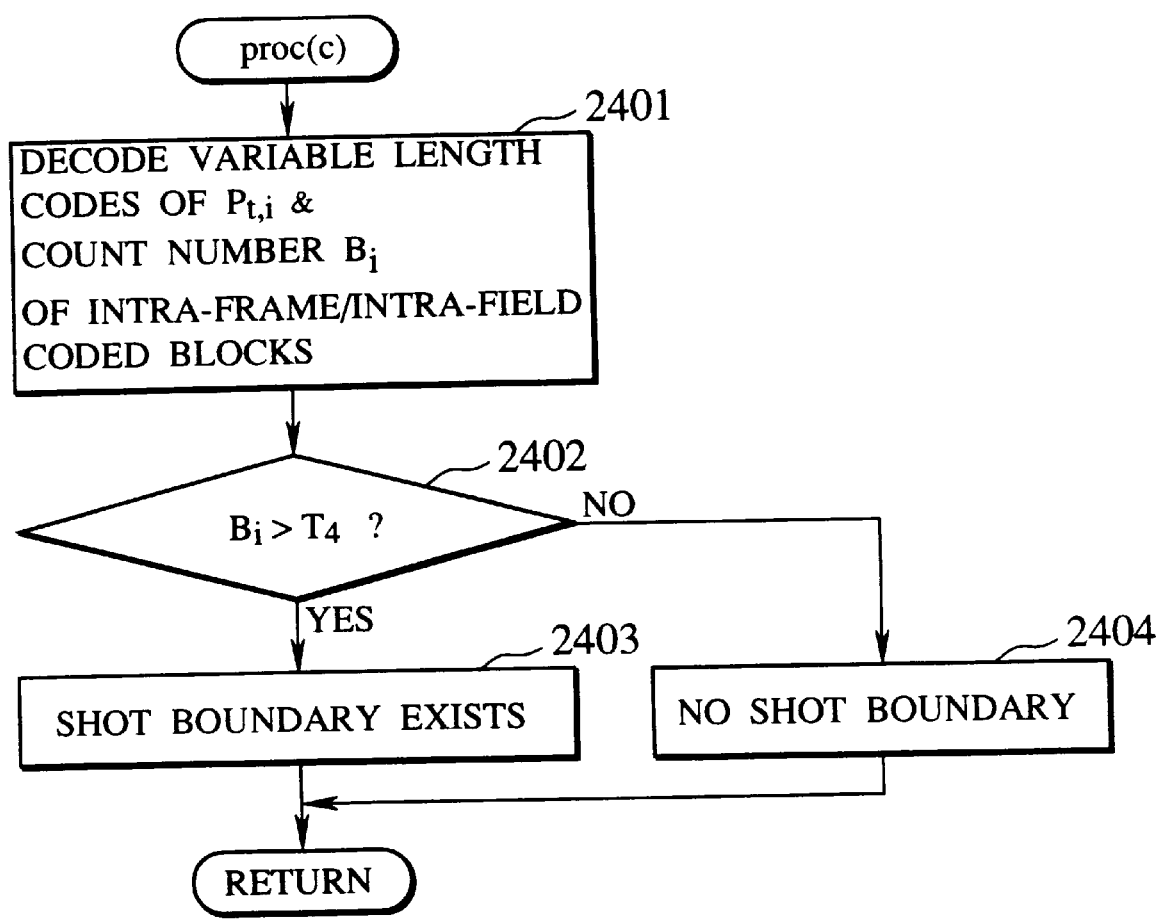
FIG. 24 is a flow chart for a sub-routine proc(c) of the shot boundary detection processing according to the third embodiment of the present invention.
Figure 25:
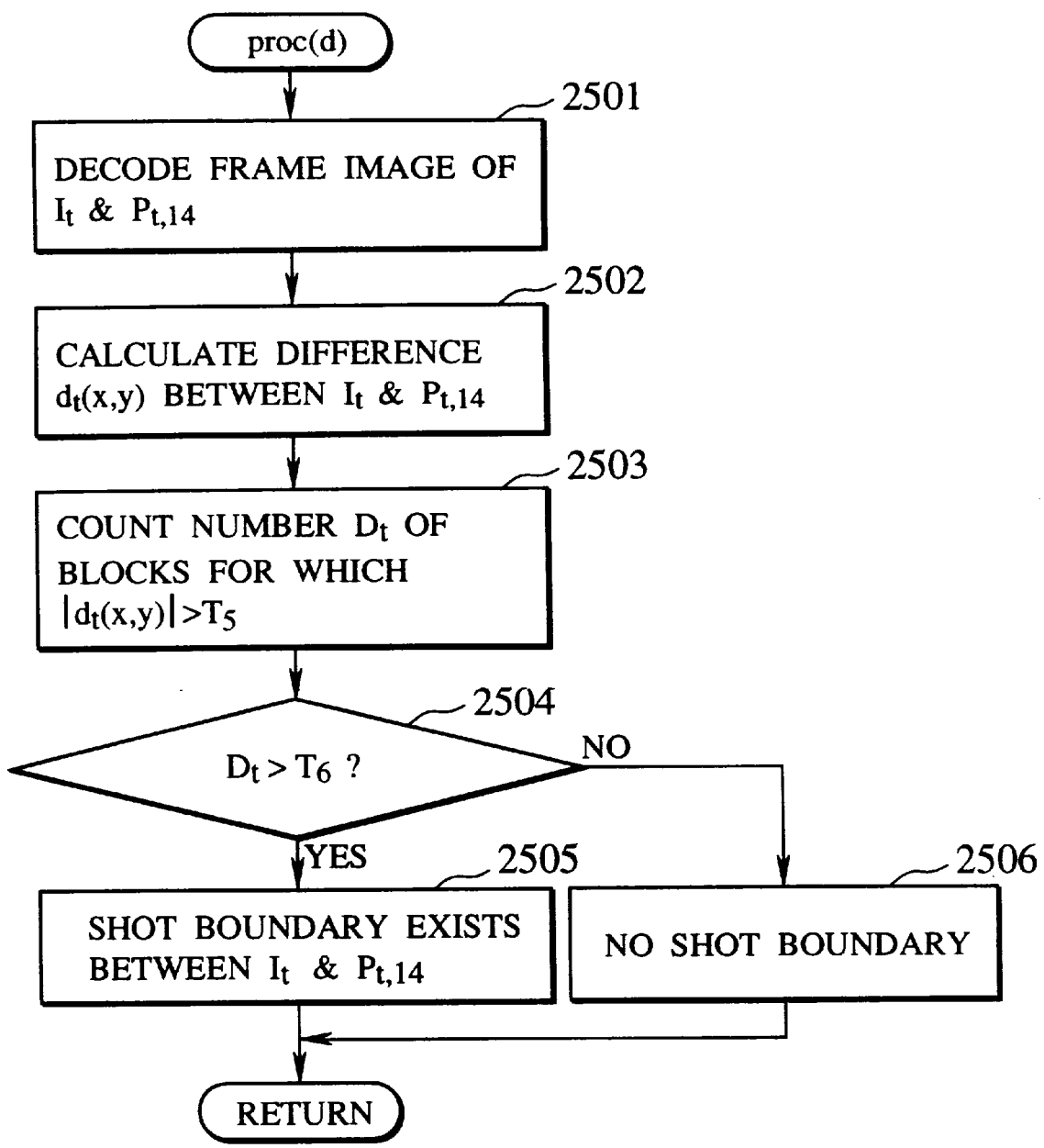
FIG. 25 is a flow chart for a sub-routine proc(d) of the shot boundary detection processing according to the third embodiment of the present invention.

More specifically, the shot boundary detection processing in this third embodiment is realized according to the flow charts of FIG. 22 to FIG. 25, where the shot boundary detection processing starts from the main routine shown in FIG. 22, in a course of which the sub-routines (proc(b), proc(c) and proc(d)) shown in FIG. 23 to FIG. 25 are called up according to the need.

In this third embodiment, it is assumed that the picture sequence to be handled is given in a form of:

$I_{t-1}, P_{t,1}, P_{t,2}, P_{t,3}, \ldots, P_{t,14}, I_t, P_{t+1,1}P_{t+1,2}, \ldots, P_{t+,14}, I_{t+1}, \ldots, (t=0, 1, 2, \ldots)$ that is the picture sequence in which one I picture is followed by fourteen P pictures.

<Main routine>

The processing in the main routine of FIG. 22 proceeds as follows.

First, a DC component $i_t(x, y)$ of DCT coefficients for each block is extracted from the I picture $I_t$ (step 2201). Here, x and y are variables indicating a spatial position of a block within a frame, and $x=0, 1, 2, \ldots, NX-1$ and $y=0, 1, 2, \ldots, NY-1$, where NX is a total number of blocks in a transversal direction and NY is a total number of blocks in a longitudinal direction. The DC component of the DCT coefficients indicates average values of the intensity and the color difference within a square block. Consequently, $i_t(x, y)$ effectively constitutes a contracted image of the original image.

Next, a difference $d_t(x, y) = i_t(x, y) - i_{t-1}(x, y)$ $(-225 \leq d_t(x, y) \leq 255)$ with respect to the already calculated DC component $i_{t-1}$ (x, y) of the previous I picture $I_{t-1}$ is calculated (step 2202), and a number $D_t$ ($0 \leq D_t \leq NX \cdot NY$) of blocks (pixels) for which an absolute value of the difference $|d_t (x, Y)|$ is greater than a prescribed threshold $T_1$ is counted (step 2203). This $D_t$ is a value for evaluating a difference of an image content between two I pictures. In other words, when the image contents of two frames $I_t$ and $I_{t-1}$ are largely different, $D_t$ takes a large value. It is also possible to use any other suitable feature value for the purpose of evaluating the image content difference. For example, a color histogram difference or other statistical quantities may be used instead.

Next, the number $D_t$ of blocks is compared with a prescribed threshold $T_2$ (step 2204), and when $D_t$ is greater than $T_2$, it is judged that a shot boundary may exist between $I_t$ and $I_{t-1}$ at a high probability, so that the sub-routine proc(b) is called up for the sake of more detailed checking (step 2205). Otherwise, it is judged that there is no shot boundary between $I_t$ and $I_{t-1}$, so that a variable t is incremented by one (step 2206), and as long as the processing has not reached the last frame of the video (step 2207 NO) the processing returns to the step 2201.

<Sub-routine proc(b)>

The processing in the sub-routine proc(b) of FIG. 23 proceeds as follows.

In this sub-routine, a section in which a shot boundary may possibly be existing is further narrowed down according a data amount of coded data for the fourteen P pictures between $I_{t-1}$ and $I_t$.

First, a data amount $L_i$ of the coded data for each P picture $P_{t, i}$ (i=1, 2, . . . , 14) is calculated (step 2301). For convenience, $L_0$ is set equal to 0. Then, in order to carry out the processing of the steps 2303 to 2307 for each i=1, 2, . . . , 14, the variable i is initialized to 1 (step 2302).

Next, whether a condition: $L_i - \max (L_{i-1}, L_{i+1}) > T_3$ holds for a prescribed threshold $T_3$ or not is checked (step 2303). When this condition holds, it is judged that a shot boundary may exist in $P_{t, i}$ at a high probability. This is because, when there is a shot boundary between $P_{t, i-1}$ and $P_{t, i}$, the image content largely changes between them so that the correlation between frames becomes small and the efficient compression cannot be realized by a scheme using the correlation between frames, and therefore the data amount $L_i$ tends to be larger compared with the data amounts ($L_{i-1}$, $L_{i+1}$) of the other frames. When the above condition holds at the step S2303, the sub-routine proc(c) is called up for the sake of more detailed shot boundary detection (step 2304). When the sub-routine proc(c) returned a result "shot boundary exists" (step 2305 YES), the processing of this sub-routine proc(b) is finished and the operation returns to the main routine.

When the condition of step 2303 does not holds or when the sub-routine proc(c) returns a result "no shot boundary" at the step 2305, a variable i is incremented by one (step 2306), and as long as the variable i is less than or equal to 14 (step 2307 YES) the processing returns to the step 2303.

When the variable i reached 15, it implies that the shot boundary is not detected in the P pictures, but there still remains a possibility for a shot boundary to exist between $P_{t, 14}$ and $I_t$. Consequently, the sub-routine proc(d) is called up for the purpose of detecting such a shot boundary (step 2308) and then the processing of this sub-routine proc(b) is finished and the operation returns to the main routine.

<Sub-Routine proc(c)>

The processing in the sub-routine proc(c) of FIG. 24 proceeds as follows.

This sub-routine is for detecting a shot boundary from a section in which a shot boundary may possibly be existing.

First, the variable length codes of the P picture $P_{t, i}$ of interest are decoded, and a number $B_i$ ($0 \leq B_i \leq NB$, where NB is a total number of blocks) of intra-frame/intra-field coded blocks is counted by reading out an information called macro-block type (step 2401), and this number $B_i$ is then compared with a prescribed threshold $T_4$ (step 2402). When $B_i$ is greater than $T_4$, a result "shot boundary exists" is outputted (step 2403), whereas otherwise, a result "no shot boundary" is outputted (step 2404). This is because, when there is a shot boundary between $P_{t, i-1}$ and $P_{t, i}$ the correlation between frames becomes small so that the number $B_i$ of the intra-frame/intra-field coded blocks tends to be increased. Then, the processing of this sub-routine proc(c) is finished and the operation returns to the sub-routine proc(b).

<Sub-routine proc(d)>

The processing in the sub-routine proc(d) of FIG. 25 proceeds as follows.

This sub-routine is for judging whether a shot boundary exists between $P_{t, 14}$ and $I_t$.

First, the frame images of $I_t$ and $P_{t, 14}$ are decoded (step 2501). In order to decode $P_{t, 14}$, it is necessary to go back to $I_{t-1}$ and sequentially decode $P_{t, 1}, P_{t, 2}, \ldots, P_{t, 14}$ in this order so that it is a time consuming processing, but a number of times for which this sub-routine proc(d) is called up is much less compared with the other sub-routines proc(b) and proc(c), so that an overall calculation time consumption rate is not so great.

Next, a different $d_t (x, y) = i_t (x, y) - i_{t, 14} (x, y)$ between $I_t$ and $P_{t, 14}$ is calculated (step 2502), and a number $D_t$ of blocks (pixels) for which an absolute value of the difference $|d_t (x, y)|$ is greater than a prescribed threshold $T_5$ is counted (step 2503).

Next, the number $D_t$ of blocks is compared with a prescribed threshold $T_6$ (step 2504), and when $D_t$ is greater than $T_6$, it is judged that a shot boundary exists between $I_t$ and $P_{t, 14}$ (step 2505), whereas otherwise, it is judged that there is no shot boundary between $I_t$ and $P_{t, 14}$ (step 2506). Then, the processing of this sub-routine proc(d) is finished and the operation returns to the main routine.

Instead of using this sub-routine proc(d), it is also possible to modify this third embodiment such that, when the number $D_t$ of blocks obtained by the main routine of FIG. 22 exceeds a prescribed threshold (which has a larger value than the threshold $T_2$), it is judged that there is a shot boundary between $I_t$ and $P_{t, 14}$.

Figure 26:
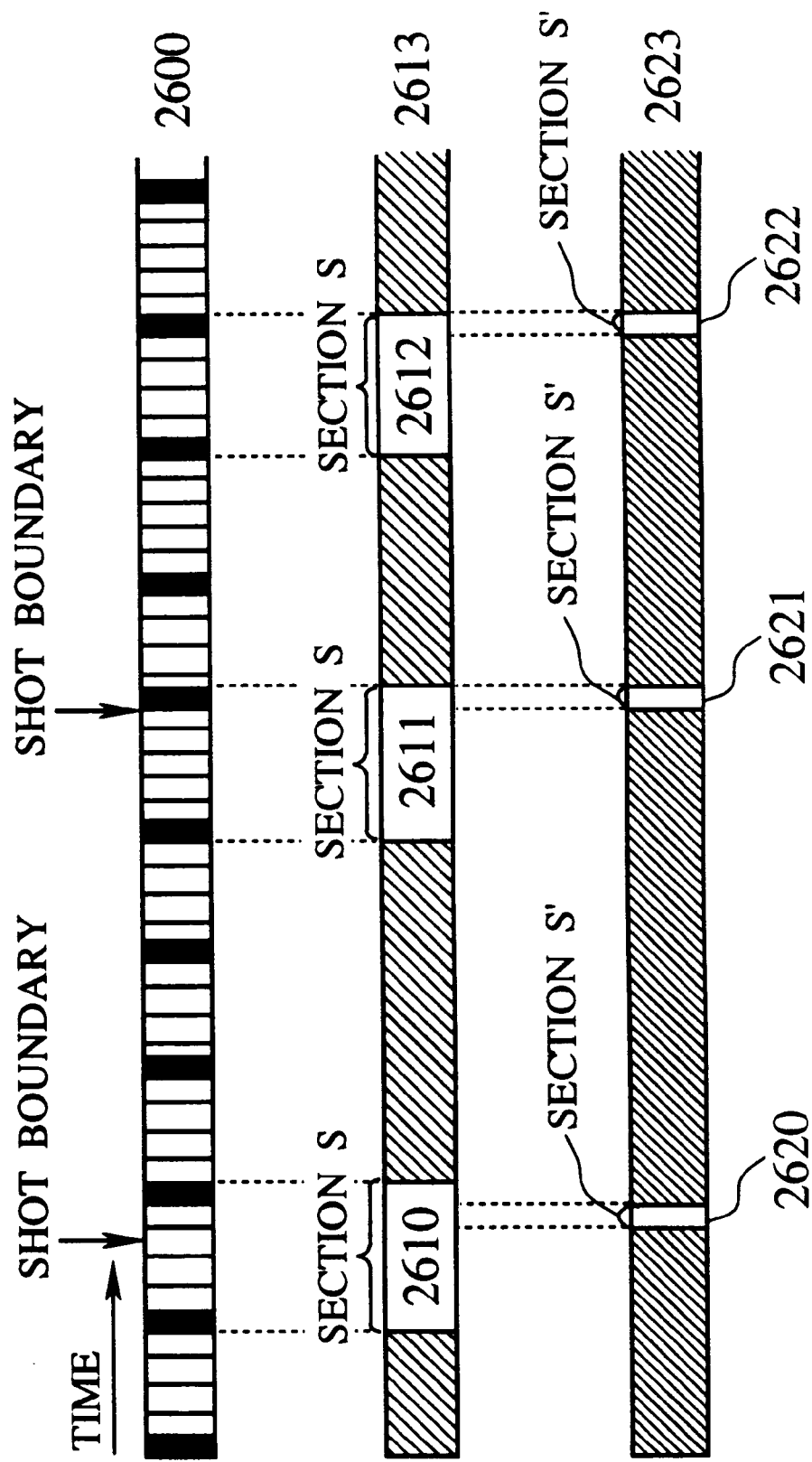
FIG. 26 is a diagram for explaining the reduction of calculation amount realized according to the third embodiment of the present invention.

Now, with reference to FIG. 26, the reduction of calculation amount realized in this third embodiment will be described. FIG. 26 diagrammatically illustrates an exemplary picture sequence 2600 in which black portions represent I pictures and white portions represent P pictures. Here, it is assumed that there are two shot boundaries in this picture sequence 2600 as indicated in FIG. 26.

In this exemplary case, the condition of the step 2204 in the main routine of FIG. 22 holds at sections 2610, 2611 and 2612, so that these sections 2610, 2611 and 2612 are determined as the section S in which a shot boundary may possibly be existing. Among them, the shot boundaries are actually contained in the sections 210 and 211, and no shot boundary is actually contained in the section 212. The remaining shaded portions of a picture sequence representation 2613 are sections which are dropped as it is judged that no shot boundary exists there by the main routine of FIG. 22.

As can be seen in FIG. 26, the major part of the picture sequence 2600 is dropped at this stage, so that there is no need for carrying out the time consuming processing of the sub-routines proc(b), proc(c) and proc(d) for the major part of the picture sequence 2600. In practice, the shot boundary appears at a rate of one in several to several tens of seconds on average, so that the major part of the picture sequence will be dropped at this stage.

In addition, the section in which a shot boundary may possibly be existing is further narrowed down to sections (frames) 2620, 2621 and 2622 which are determined as the section S' by the sub-routine proc(b) of FIG. 23. The remaining shaded portions of a picture sequence representation 2623 are sections which are dropped as it is judged that no shot boundary exists there by the main routine of FIG. 22 and the sub-routine proc(b) of FIG. 23.

Namely, the section 2620 is a frame for which the condition of the step 2303 in the sub-routine proc(b) of FIG. 23 holds, while the sections 2621 and 2622 are frames for which the condition of the step 2307 in the sub-routine proc(b) of FIG. 23 does not hold, so that the section in which a shot boundary may possibly be existing is further narrowed down at this stage. For the frame 2620, the sub routine proc(c) of FIG. 24 is called up in order to make a final judgement for presence/absence of a shot boundary. For each of the frames 2621 and 2622, the sub-routine proc(d) of FIG. 25 is called up in order to make a final judgement for presence/absence of a shot boundary.

In this manner, in this third embodiment, the final judgement for presence/absence of a shot boundary is made by a more time consuming but accurate processing (proc(c) and proc(d)), only after the section in which a shot boundary may possibly be existing is narrowed down in two stages by a less time consuming processing (main routine and proc (b)).

Consequently, according to this third embodiment, it becomes possible to detect the shot boundary accurately while reducing the required processing time, in contrast to the conventional shot boundary detection scheme in which the time consuming processing corresponding to proc(c) and proc(d) is carried out for every frame.

Referring now to FIG. 27 to FIG. 37, the fourth embodiment of a shot boundary detection scheme according to the present invention will be described in detail.

In this fourth embodiment, an exemplary case of handling the coded video data in a form of P pictures (forward direction prediction pictures) according to MPEG2 (a frame structure and a field prediction) scheme.

Figure 27:
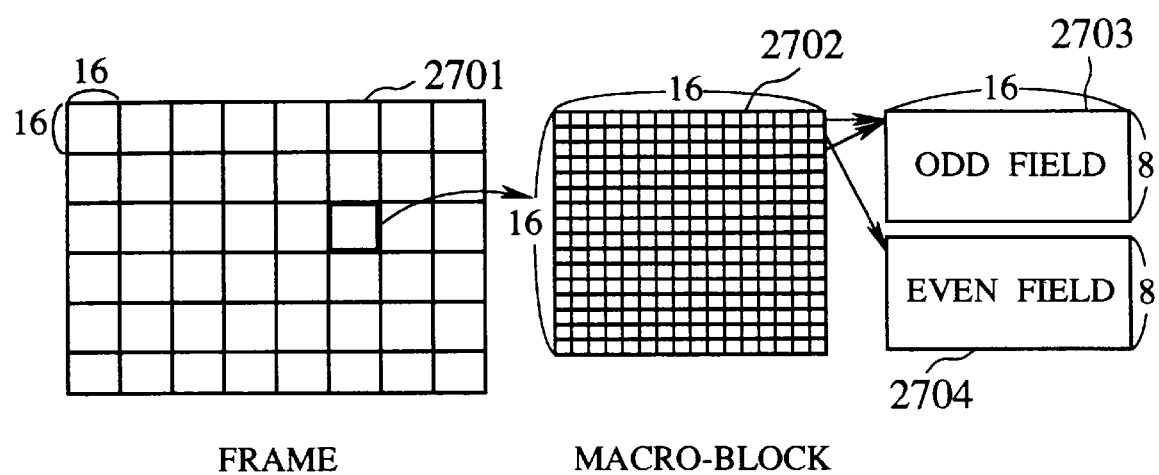
FIG. 27 is a diagram for explaining the mechanism of the MPEG2 coding scheme.

First, the mechanism of the MPEG2 coding scheme will be briefly outlined with reference to FIG. 27.

In the MPEG2, as shown in FIG. 27, a frame 2701 is partitioned into macro-blocks 2702, each of which has 16×16 pixels. Depending on whether the macro-block can be motion predicted from the previous frame or not, either (1) intra-mode, or (2) non-intra-mode, is selected.

In the (1) intra-mode, the coding closed within a frame is carried out without using a correlation between frames. More specifically, the 16×16 pixels macro-block is subdivided into four 8×8 pixels sub-blocks, and then the DCT is applied to each sub-block and the obtained DCT coefficients are outputted as the coded data.

In the (2) non-intra-mode, a frame structure or a field structure can be selected, but only a case of using a frame structure will be described here. In the frame structure field prediction scheme, the 16×16 pixels macro-block is divided into an odd field and an even field, and two 16×8 pixels blocks 2703 and 2704 for the odd field and the even field respectively are formed. Then, the motion compensation prediction is carried out for each 16×8 pixels block, and for each macro-block, (A) two motion vectors, (B) two sets of DCT coefficients for residual errors after motion compensation (differences), and (C) two reference field selection flags are outputted as the coded data. The (C) reference field selection flags are flags for enabling a selection as to whether the motion compensation is to be made from the even field or the odd field at a time of decoding.

Now, the processing of the shot boundary detection scheme in this fourth embodiment is carried out according to the flow chart of FIG. 28 as follows.

Figure 28:
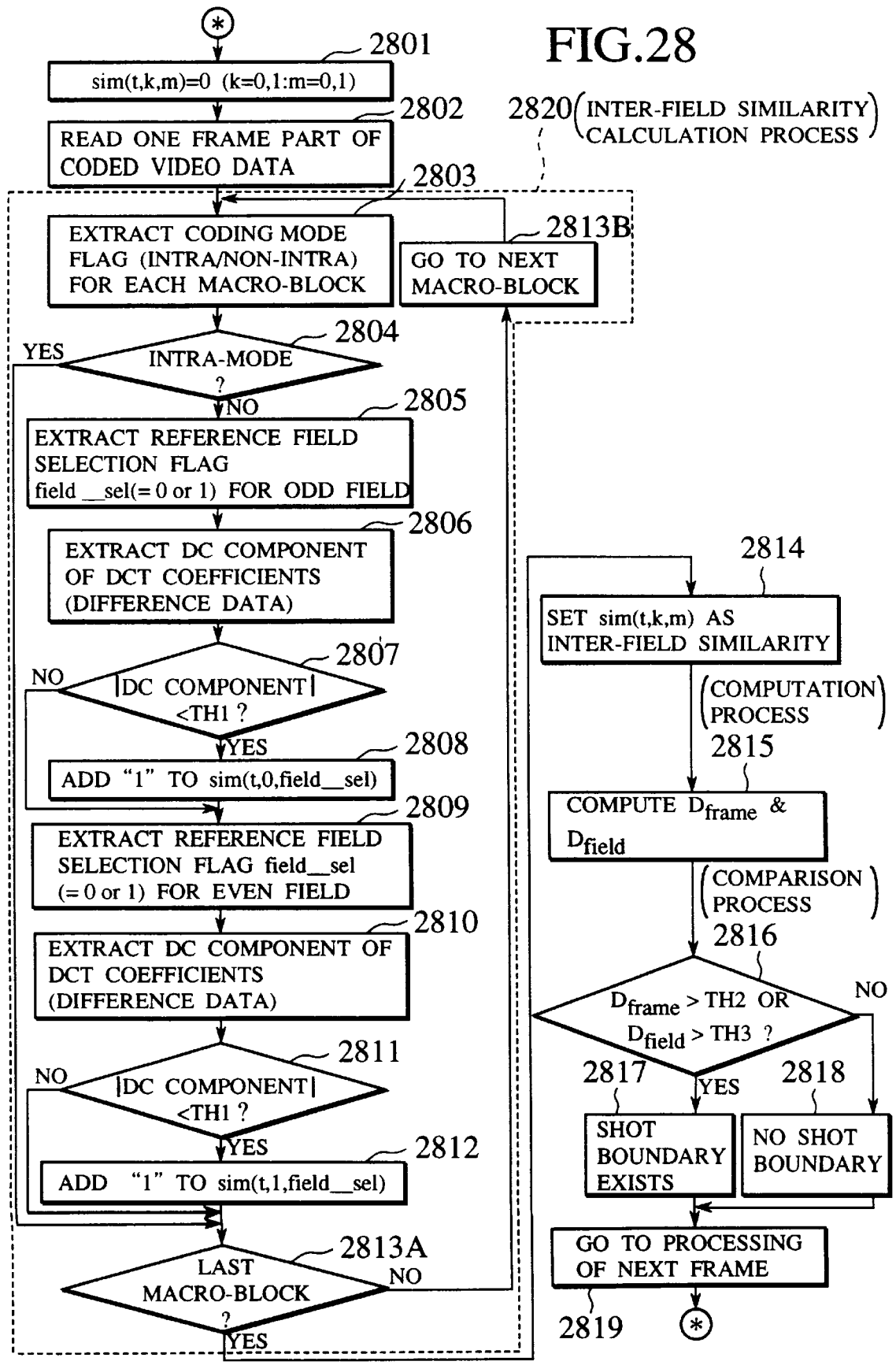
FIG. 28 is a flow chart for the processing of a shot boundary detection scheme according to the fourth embodiment of the present invention.

The procedure shown in FIG. 28 is for processing one frame part of the coded video data (t-th frame) in order to judge whether a shot boundary exists at the previous frame ((t−1)-th frame) or not, and containing three major processes of an inter-field similarity calculation process 2820, a computation process 2815, and a comparison process 2816.

(a) Inter-field similarity calculation process 2820

First, arrays sim(t, k, m) (k=0, 1; m=0, 1) for storing inter-field similarity values are all initialized to 0 (step 2801). Here, a value 0 or 1 taken by variables k and m corresponds to an odd field or an even field, respectively. Then, one frame part of the coded video data is read (step 2802) and the processing enters the inter-field similarity calculation process 2820.

In the inter-field similarity calculation process 2820, a coding mode flag (intra/non-intra) for each macro-block is extracted from the coded video data (step 2803). When the extracted coding mode flag indicates the intra-mode (step 2804 YES), the processing proceeds to the step 2813A described below.

When the extracted coding mode flag indicates the non-intra-mode (step 2804 NO), the coded video data is further analyzed to extract a reference field selection flag field_sel (=0 or 1) for the odd field (step 2805). Here, field_sel=0 indicates that the motion compensation prediction is to be made by referring to the odd field of the previous frame while field_sel=1 indicates that the motion compensation prediction is to be made by referring to the even field of the previous frame. Then, only the DC component among the DCT coefficients representing the residual error after motion compensation (difference data) is extracted from the coded video data (step 2806), and the absolute value of the extracted DC component is compared with a prescribed threshold TH1 (step 2807). Then, only when the extracted DC component is less than the threshold TH1, a value "1" is added to the sim(t, 0, field_sel) (step 2808).

Then, for the even field, the steps 2809 to 2812 similar to the above steps 2805 to 2808 for the odd field are carried out. Namely, the coded video data is further analyzed to extract a reference field selection flag field_sel (=0 or 1) for the even field (step 2809), and only the DC component among the DCT coefficients representing the residual error after motion compensation (difference data) is extracted from the coded video data (step 2810). Then, the absolute value of the extracted DC component is compared with the threshold TH1 (step 2811), and only when the extracted DC component is less than the threshold TH1, a value "1" is added to the sim(t, 1, field_sel) (step 2812).

These steps 2803 to 2812 are then repeated until the last macro-block is reached by the steps 2813A and 2813B.

Then, the resulting sim(t, k, m) is set as the inter-field similarity (step 2814). The properties of this inter-field similarity sim(t, k, m) will be described in detail below.

Note that, in the above, the DC component of the difference data is extracted and its absolute value is subjected to the thresholding processing, but it is also possible to obtain the square sum of the DCT coefficients of the difference data and subject this square sum to the thresholding processing. Also, the steps 2806 to 2808 and 2810 to 2812 may be omitted so as to omit the processing with respect to the difference data.

(b) Computation process and Comparison process

Next, the computations according to the following equations (3) and (4) are applied to the inter-field similarity sim(t, k, m), to obtain two values Dframe(t−1) and Dfield(t−1) (step 2815).

$$D_{frame}(t-1) = \prod_{\substack{k=0,1 \\ m=0,1}} \frac{\text{sim}(t, k, m)}{MB} \cdot \prod_{\substack{k=0,1 \\ m=0,1}} \left(1 - \frac{\text{sim}(t-1, k, m)}{MB}\right) \quad (3)$$

$$D_{field}(t-1) = \prod_{k=0,1} \frac{\text{sim}(t, k, 1)}{MB} \cdot \prod_{k=0,1} \left(1 - \frac{\text{sim}(t, k, 0)}{MB}\right) \cdot \quad (4)$$
$$\prod_{m=0,1} \frac{\text{sim}(t-1, 0, m)}{MB} \cdot \prod_{m=0,1} \left(1 - \frac{\text{sim}(t-1, 1, m)}{MB}\right)$$

where MB is a number of macro-blocks contained in the frame. The meaning of these equations (3) and (4) will be described below.

Next, the obtained Dframe (t−1) is compared with a prescribed threshold TH2 while the obtained Dfield(t−1) is compared with a prescribed threshold TH3 (step 2816), and either when Dframe(t−1) is greater than TH2 or Dfield(t−1) is greater than TH3 (step 2816 YES), it is judged that a shot boundary exists (step 2817), whereas otherwise, it is judged that there is no shot boundary (step 2818). Then, the processing proceeds to the processing of the next frame (step 2819).

Note that the computations to be carried out at the computation process 2815 are not necessarily limited to those of the above equations (3) and (4), and can be replaced by the computations according to the following equations (3') and (4'), for instance.

$$D_{frame}(t-1) = \prod_{k=0,1} \frac{\text{sim}(t, k, 0) + \text{sim}(t, k, 1)}{MB} \cdot \quad (3')$$
$$\prod_{k=0,1} \left(1 - \frac{\text{sim}(t-1, k, 0) + \text{sim}(t-1, k, 1)}{MB}\right)$$

$$D_{field}(t-1) = \prod_{k=0,1} \frac{\text{sim}(t, k, 1)}{MB} \cdot \quad (4')$$
$$\prod_{k=0,1} \left(1 - \frac{\text{sim}(t, k, 0)}{MB}\right) \cdot \frac{\text{sim}(t-1, 0, 0) + \text{sim}(t-1, 0, 1)}{MB} \cdot$$
$$\left(1 - \frac{\text{sim}(t-1, 1, 0) + \text{sim}(t-1, 1, 1)}{MB}\right)$$

In addition, instead of using the inter-field similarity obtained from two frames as described above, it is also possible to use the inter-field similarity obtained from more than two frames.

(c) Properties of the inter-field similarity

Next, with references to FIG. 29 to FIG. 32, the properties possessed by the inter-field similarity sim(t, k, m) will be described.

Figure 29:
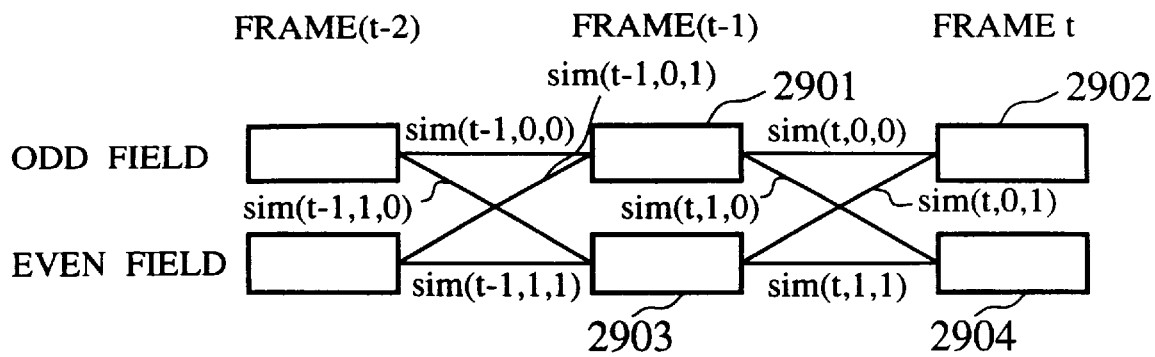
FIG. 29 is a diagram for explaining properties of the inter-field similarities used in the fourth embodiment of the present invention.

FIG. 29 shows three consecutive frames in division to odd and even fields, where lines joining fields correspond to the inter-field similarities. When the above described procedure is carried out for a frame t, the four inter-field similarities sim(t, k, m) (k=0, 1; m=0, 1) are obtained. This sim(t, k, m) has a lower limit equal to 0 and an upper limit equal to a number of macro-blocks MB.

The inter-field similarity between an "odd field of frame t" 2902 and an "odd field of frame (t−1)" 2901 is given by sim(t, 0, 0), which takes a large value when the image contents of the fields 2901 and 2902 are similar. This is because, when the image contents of the fields 2901 and 2902 are similar, a number of times by which the field 2901 is referred from the field 2902 at a time of the motion compensation increases, and therefore a number of times for which the step 2808 is executed also increases.

Similarly, sim(t, 0, 1) is the inter-field similarity between the fields 2902 and 2903, sim(t, 1, 0) is the inter-field similarity between the fields 2901 and 2904, sim(t, 1, 1) is the inter-field similarity between the fields 2903 and 2904.

When there is no shot boundary, that is when the image contents of all the fields 2901, 2902, 2903 and 2904 of FIG. 29 are similar, all of sim(t, k, m) among the frame (t−1), a past frame (t−2) and a future frame t have large values.

Figure 30:
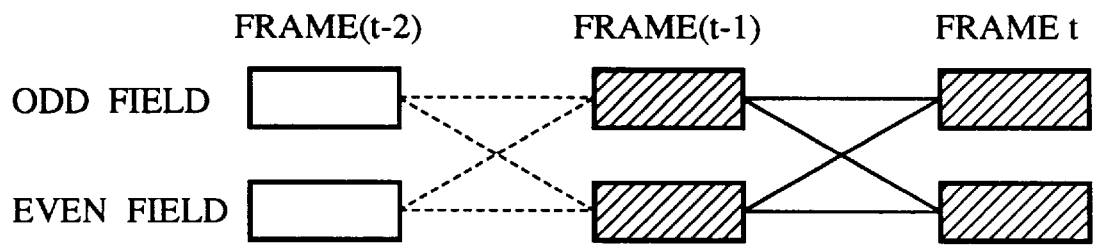
FIG. 30 is a diagram showing a state of inter-field similarities for a case of having a shot boundary between adjacent frames in the fourth embodiment of the present invention.

When there is a shot boundary between the frame (t−2) and the frame (t−1), those inter-field similarities indicated by solid lines in FIG. 30 have large values while those inter-field similarities indicated by dashed lines in FIG. 30 have small values, that is the inter-field similarities between the frame (t−1) and a future frame t (for both odd and even fields) have large values while the inter-field similarities between the frame (t−1) and a past frame (t−2) (for both odd and even fields) have small values.

Figure 31:
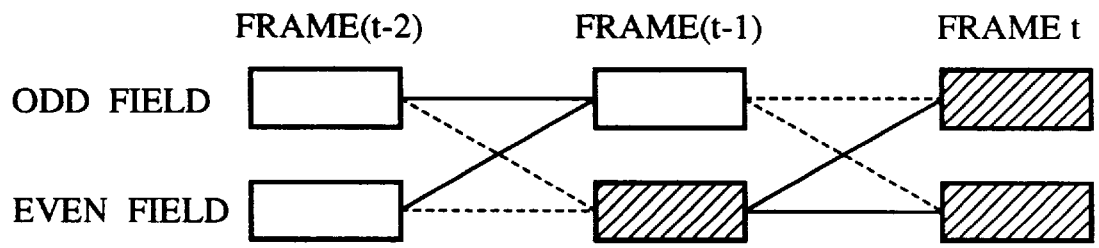
FIG. 31 is a diagram showing a state of inter-field similarities for a case of having a shot boundary between odd and even fields of one frame in the fourth embodiment of the present invention.

When there is a shot boundary between the odd field and the even field of the frame (t−1), those inter-field similarities indicated by solid lines in FIG. 31 have large values while those inter-field similarities indicated by dashed lines in FIG. 31 have small values, that is the inter-field similarities between the odd field of the frame (t−1) and the odd and even fields of a past frame (t−2) as well as the inter-field similarities between the even field of the frame (t−1) and the odd and even fields of a future frame t have large values while the inter-field similarities between the odd field of the frame (t−1) and the odd and even fields of a future frame t as well as the inter-field similarities between the even field of the frame (t−1) and the odd and even fields of a past frame (t−2) have small values.

Figure 32:
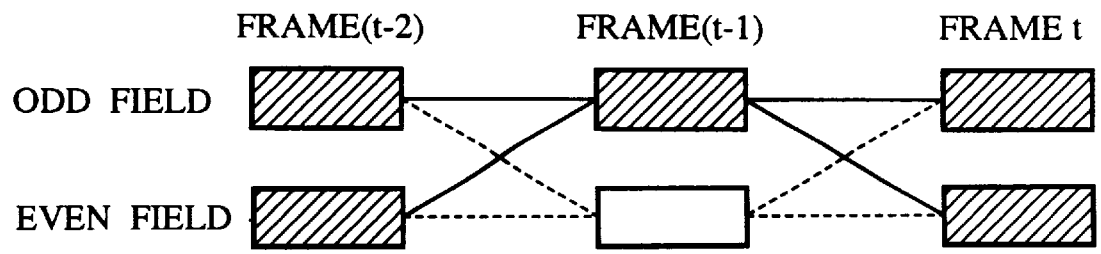
FIG. 32 is a diagram showing a state of inter-field similarities for a case of having a flashlight at one frame in the fourth embodiment of the present invention.

When the flashlight is imaged in the even field of the frame (t−1), those inter-field similarities indicated by solid lines in FIG. 32 have large values while those inter-field similarities indicated by dashed lines in FIG. 32 have small values, that is the inter-field similarities between the odd field of the frame (t−1) and the odd and even fields of a past frame (t−2) as well as the odd and even fields of a future frame t have large values while the inter-field similarities between the even field of the frame (t−1) and the odd and even fields of a past frame (t−2) as well as the odd and even fields of a future frame t have small values.

Note that a case shown in FIG. 32 has a different inter-field similarity pattern than a case shown in FIG. 31. In the prior art, the feature values (such as the cumulative value of residual errors after motion compensation) for evaluating the difference in the image contents between frames have been used, so that it has been impossible to distinguish a case of FIG. 31 and a case of FIG. 32. In contrast, in this fourth embodiment, the inter-field similarities are calculated rather than inter-frame similarities, so that it becomes possible to distinguish a case of FIG. 31 and a case of FIG. 32.

(d) Role of the computation process

Next, the meaning of the above equations (3) and (4) used in the computation process 2815 of FIG. 28 will be described.

The equation (3) is for detecting a shot boundary in a case shown in FIG. 30. In this case of FIG. 30, sim(t, k, m)/MB take values close to 1, while sim(t−1, k, m)/MB take values close to 0. Thus, Dframe(t−1) obtained by the equation (3) takes a value close to 1 in this case of FIG. 30, while it takes a value close to 0 in the other cases (a case of FIG. 31 and a case of FIG. 32). Consequently, by comparing this Dframe (t−1) with the threshold TH2 at the step 2816 of FIG. 28, it becomes possible to detect a shot boundary in a case of FIG. 30 by distinguishing it from the other cases.

The equation (4) is so designed that Dfield(t−1) obtained by the equation (4) takes a value close to 1 only in a case shown in FIG. 31, while it takes a value close to 0 in the other cases (a case of FIG. 30 and a case of FIG. 32). Consequently, by comparing this Dfield(t−1) with the threshold TH3 at the step 2816 of FIG. 28, it becomes possible to detect a shot boundary in a case of FIG. 31 by distinguishing it from the other cases.

In a case shown in FIG. 32, both Dframe (t−1) and Dfield(t−1) take small values, so that it becomes possible to prevent a detection of a noise such as a flashlight erroneously as a shot boundary.

(e) Modified procedure

Figure 33:
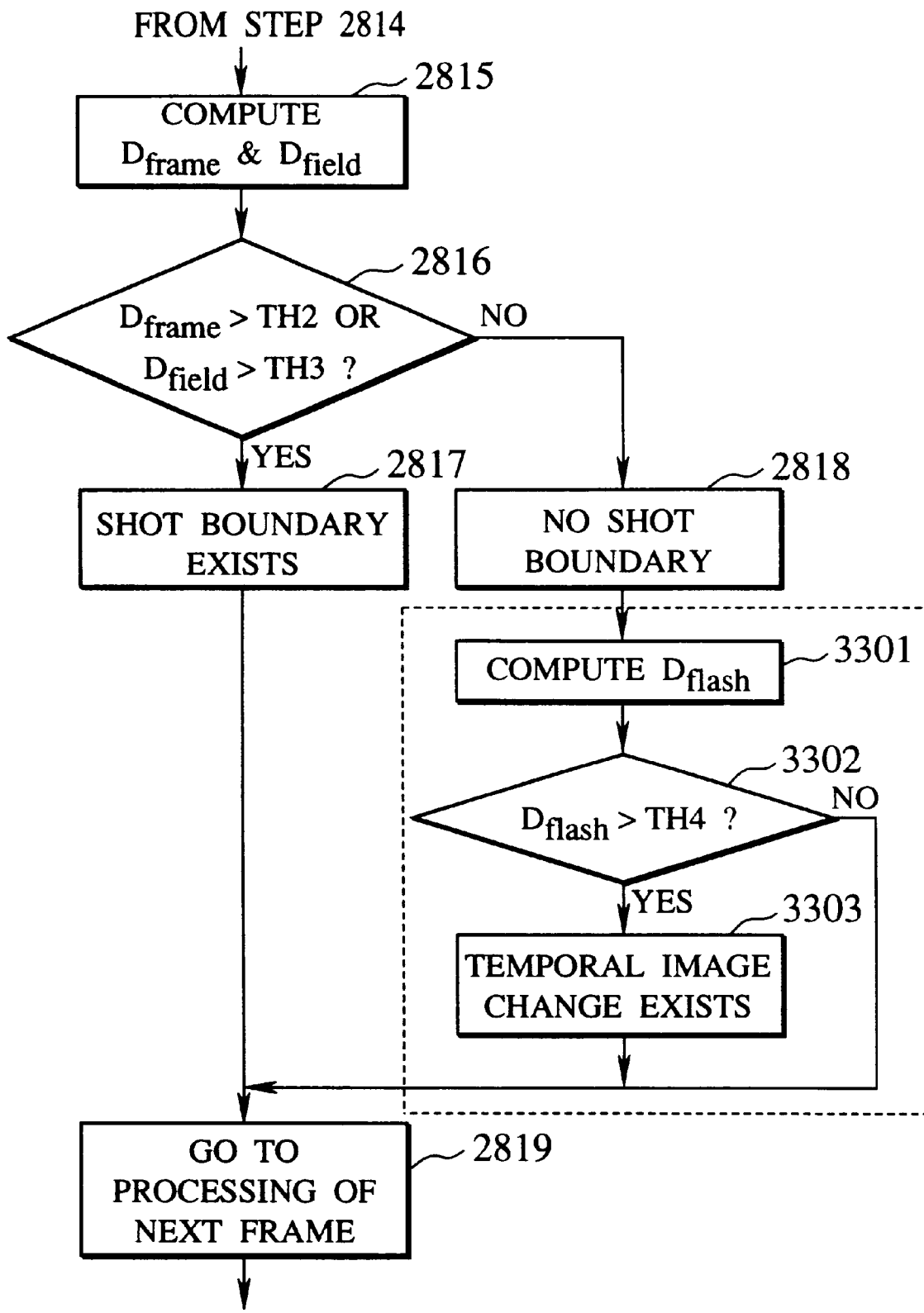
FIG. 33 is a partial flow chart for a modified procedure of a shot boundary detection scheme according to the fourth embodiment of the present invention.

Next, with reference to FIG. 33, the modified procedure for the shot boundary detection scheme in this fourth embodiment will be described. In this modified procedure, the steps up to step 2814 including the inter-field similarity calculation process are identical to those of FIG. 28 so that they are not shown in FIG. 33. In addition, among the steps shown in FIG. 33, the steps 115 to 119 are common to those of FIG. 28 so that they are given the same reference numerals in FIG. 33 and their description will be omitted.

In this modified procedure, when it is judged that there is no shot boundary at the step 2818, the computation according to the following equation (5) is carried out to obtain a value Dflash (t−1) (step 3301).

$$D_{flash}(t-1) = \prod_{k=0,1} \frac{\text{sim}(t, k, 0)}{MB} \cdot \prod_{k=0,1} \left(1 - \frac{\text{sim}(t, k, 1)}{MB}\right) \cdot \tag{5}$$

$$\prod_{m=0,1} \frac{\text{sim}(t-1, 0, m)}{MB} \cdot \prod_{m=0,1} \left(1 - \frac{\text{sim}(t-1, 1, m)}{MB}\right) +$$

$$\prod_{k=0,1} \frac{\text{sim}(t, k, 1)}{MB} \cdot \prod_{k=0,1} \left(1 - \frac{\text{sim}(t, k, 0)}{MB}\right) \cdot$$

$$\prod_{m=0,1} \frac{\text{sim}(t-1, 1, m)}{MB} \cdot \prod_{m=0,1} \left(1 - \frac{\text{sim}(t-1, 0, m)}{MB}\right)$$

Then, the obtained Dflash (t−1) is compared with a prescribed threshold TH4 (step 3302), and when this Dflash (t−1) is greater than TH4, it is judged that a temporal image change exists in the frame (t−1) (step 3303). Then, the processing proceeds to the step 2819.

According to this modified procedure, it is possible to detect a frame in which a flash is lit in the video data for news, for example. It is also possible to detect an instantaneous (single frame) image which is inserted into the video data for the purpose of inducing the subliminal effect.

(f) Apparatus configuration

Next, with references to FIG. 34 to FIG. 36, a configuration of a shot boundary detection apparatus according to this fourth embodiment will be described.

Figure 34:
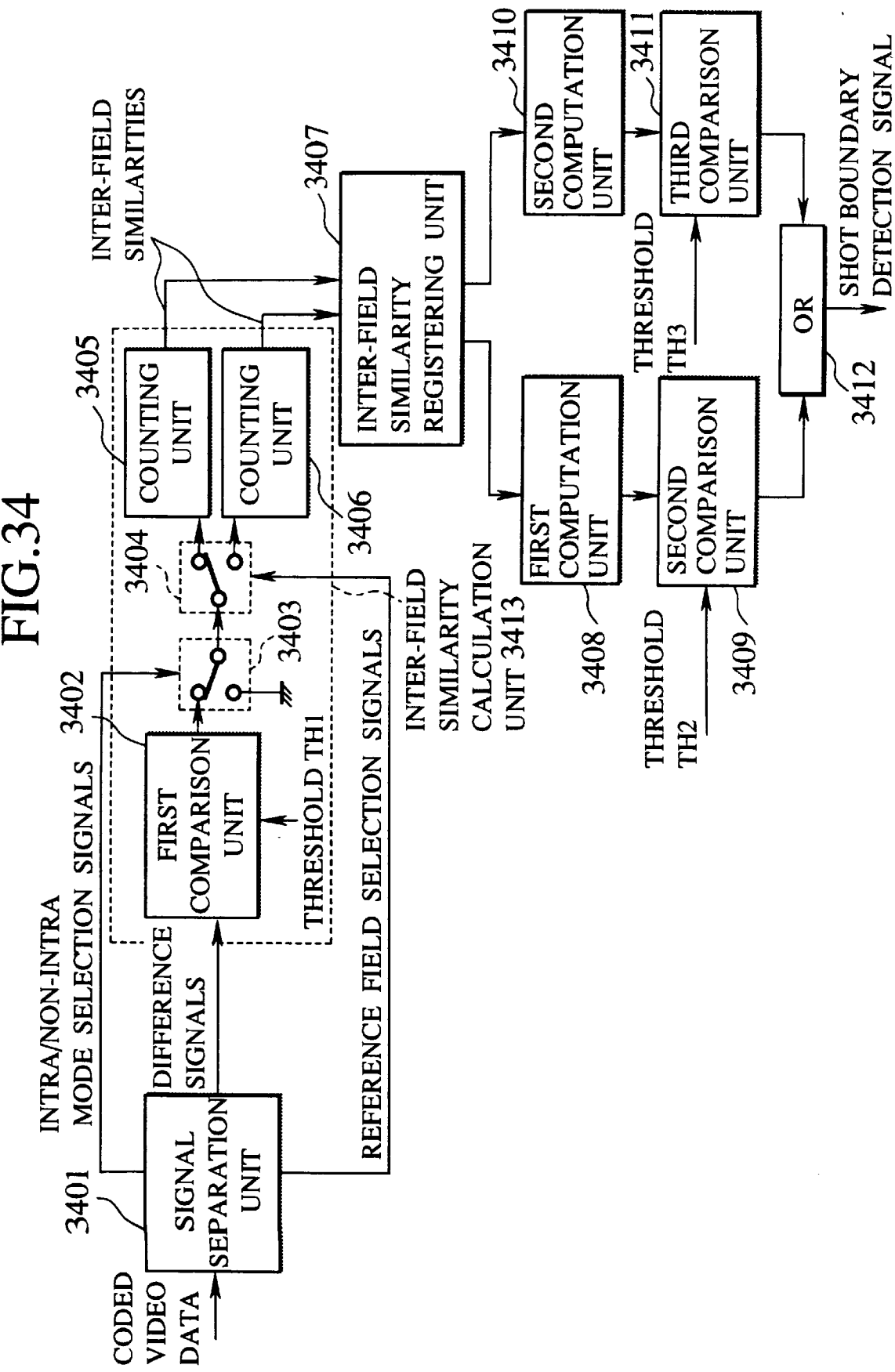
FIG. 34 is a block diagram showing one exemplary configuration of a shot boundary detection apparatus in the fourth embodiment of the present invention.

In this fourth embodiment, a shot boundary detection apparatus has an overall configuration as shown in FIG. 34, which comprises the following elements.

A signal separation unit 3401 separates and extracts intra/non-intra mode selection signals indicating the above described coding mode flags, difference signals indicating the above described DC components of the difference data, and reference field selection signals indicating the above described reference field selection flags, from the input coded video data.

A first comparison unit 3402 compares a sum of absolute values of the difference signals with a prescribed threshold TH1, and outputs a value "1" when the sum of absolute values of the difference signals is smaller than the prescribed threshold TH1 to a switch 3403.

The switch 3403 is switched according to the intra/non-intra mode selection signals, and gives a signal entered from the first comparison unit 3402 in a case of the non-intra-mode, or a value "0" (ground) in a case of the intra-mode, to a switch 3404.

The switch 3404 is switched according to the reference field selection signals, and gives a signal entered from the switch 3403 to a counting unit 3405 when the reference field selection signal indicates an odd field as the reference field, or to a counting unit 3406 when the reference field selection signal indicates an even field as the reference field.

Each of the counting units 3405 and 3406 counts a number of times for which a value "1" is entered as a signal from the switch 3404.

When the counting operation by the counting units 3405 and 3406 for one field part is finished, the respective count values are outputted from the counting units 3405 and 3406 as the inter-field similarities. In FIG. 34, a portion enclosed by a dashed line including the first comparison unit 3402, the switches 3403 and 3404, and counting units 3405 and 3406, constitutes an inter-field similarity calculation unit 3413.

An inter-field similarity registering unit 3407 registers inter-field similarities for N fields part, that is, 2N sets of inter-field similarities (by overwriting a new value into a region in which the oldest inter-field similarity has been registered).

A first computation unit 3408 executes the computation according to the above equation (3) with respect to the inter-field similarities entered from the inter-field similarity registering unit 3407, and enters a computation result into a second comparison unit 3409.

The second comparison unit 3409 compares the entered computation result with a prescribed threshold TH2, and outputs a signal when the computation result has a value greater than the threshold TH2.

A second computation unit 3410 executes the computation according to the above equation (4) with respect to the inter-field similarities entered from the inter-field similarity registering unit 3407, and enters a computation result into a third comparison unit 3411.

The third comparison unit 3411 compares the entered computation result with a prescribed threshold TH3, and outputs a signal when the computation result has a value greater than the threshold TH3.

An OR circuit 3412 calculates an OR of two signals outputted by the second and third comparison units 3409 and 3411, and outputs a calculation result as a shot boundary detection signal.

Figure 35:
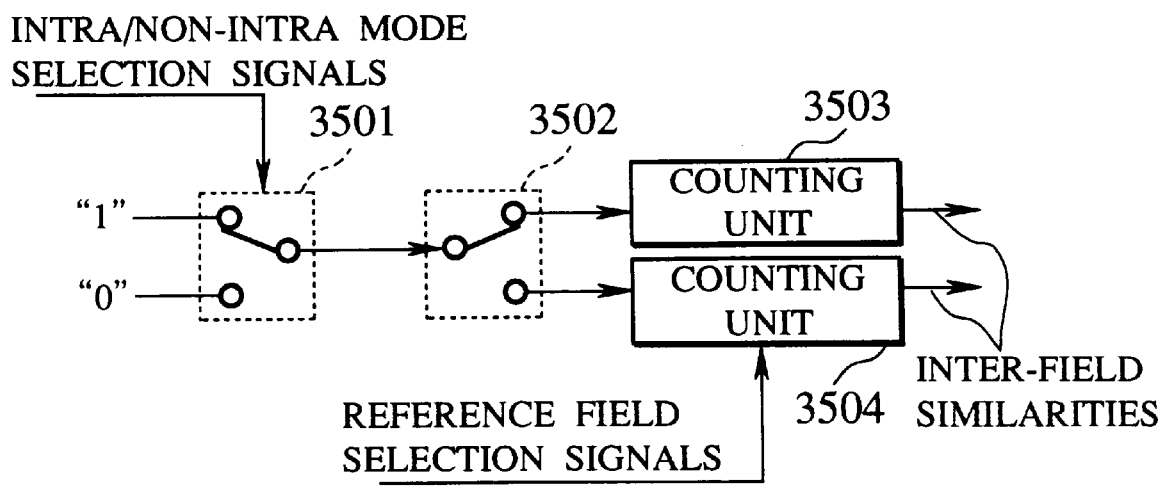
FIG. 35 is a block diagram showing one alternative configuration of an inter-field similarity calculation unit in the shot boundary detection apparatus of FIG. 34.

FIG. 35 shows one alternative configuration of the inter-field similarity calculation unit 3413, which comprises the following elements.

A switch 3501 is switched according to the intra/non-intra mode selection signals, and outputs a value "1" in a case of the non-intra-mode, or a value "0" in a case of the intra-mode.

A switch 3502 is switched according to the reference field selection signals, and gives a signal entered from the switch 3501 to a counting unit 3503 when the reference field selection signal indicates an odd field as the reference field, or to a counting unit 3504 when the reference field selection signal indicates an even field as the reference field.

The counting units 3503 and 3504 count a number of macro-blocks which referred to the odd field and a number of macro-blocks which referred to the even field, respectively.

When the counting operation by the counting units 3503 and 3504 for one field part is finished, the respective count values are outputted from the counting units 3503 and 3504 as the inter-field similarities to the inter-field similarity registering unit 3407.

In a case of using this inter-field similarity calculation unit configuration of FIG. 35, the signal separation unit 3401 of FIG. 34 only separates and extracts the intra/non-intra mode selection signals and the reference field selection signals from the input coded video data. This corresponds to a case of omitting the processing with respect to the difference data mentioned above.

Figure 36:
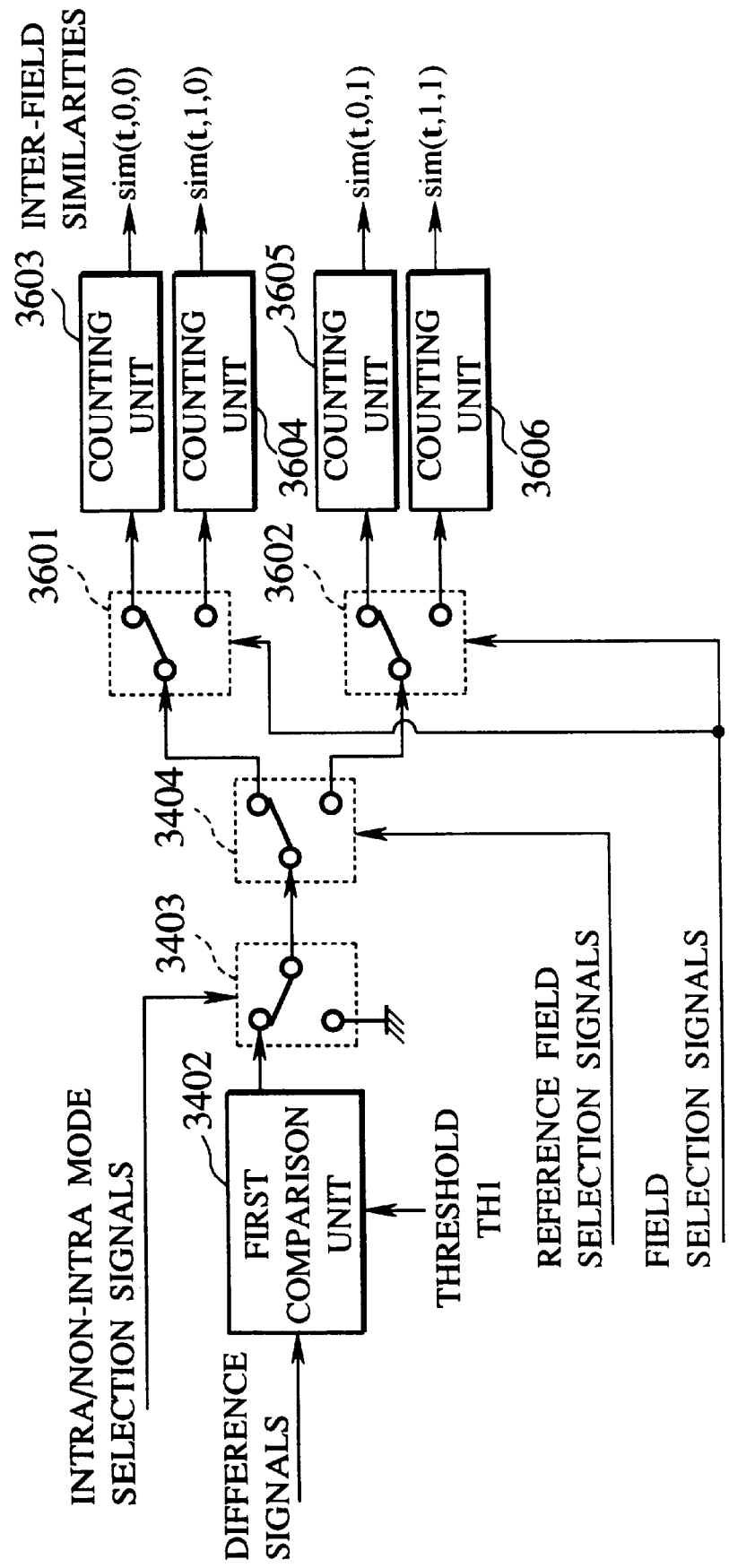
FIG. 36 is a block diagram showing another alternative configuration of an inter-field similarity calculation unit in the shot boundary detection apparatus of FIG. 34.

FIG. 36 shows another alternative configuration of the inter-field similarity calculation unit 3413, which corresponds to the frame structure of the MPEG2. Namely, the coded video data in the frame structure of the MPEG2 have coded data of an odd field and an even field appearing alternately within a frame, and this configuration of FIG. 36 is suitable for handling this type of coded video data.

In this configuration of FIG. 36, the signal separation unit 3401 of FIG. 34 also outputs a field selection signal which indicates whether the currently processed data are for decoding an odd field or an even field.

Two switches 3601 and 3602 connected to two outputs of the switch 3404 are switched according to this field selection signal.

Four counting units 3603, 3604, 3605 and 3606 count four outputs of the switches 3601 and 3602 respectively and output the count values as the inter-field similarities when the counting operation by the counting units 3603 to 3606 for one field part is finished.

By providing two new switches 3601 and 3602, it becomes possible in this configuration of FIG. 36 to obtain the above described four inter-field similarities sim(t, k, m) (k=0, 1; m=0, 1) simultaneously.

(g) Alternative apparatus configuration

Next, with reference to FIG. 37, an alternative configuration of a shot boundary detection apparatus according to this fourth embodiment will be described.

Figure 37:
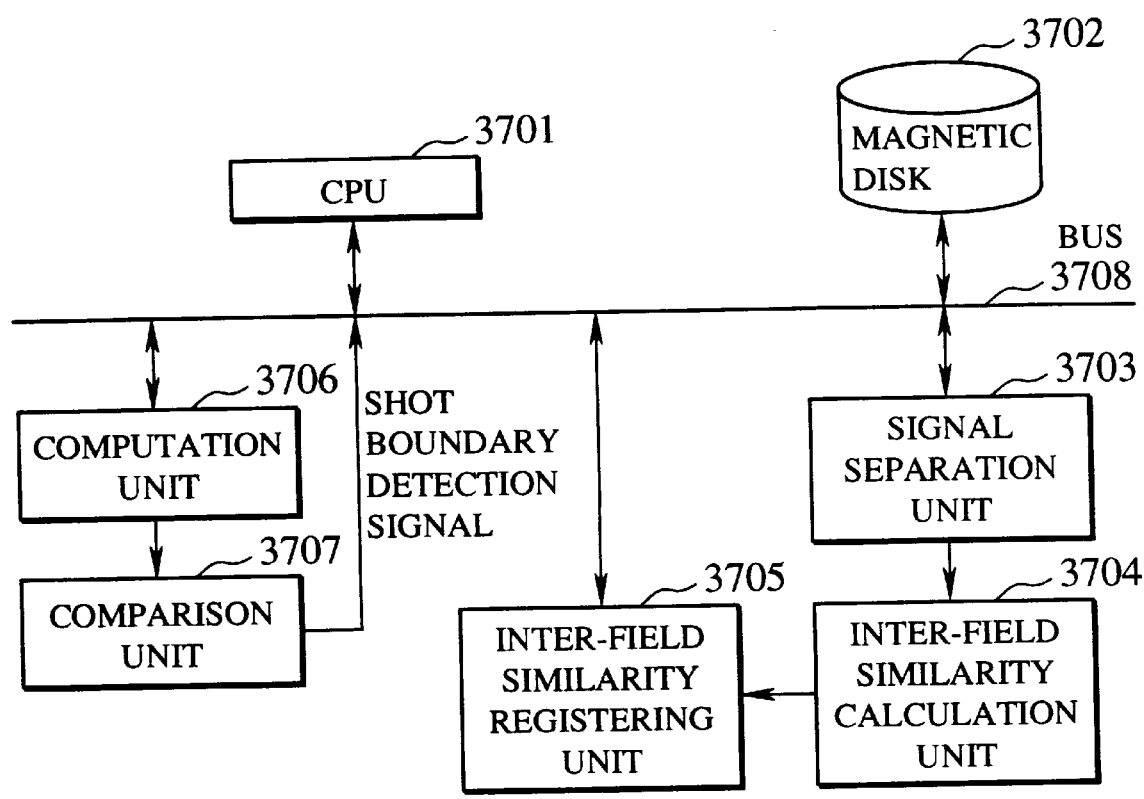
FIG. 37 is a block diagram showing another exemplary configuration of a shot boundary detection apparatus in the fourth embodiment of the present invention.

This alternative configuration of FIG. 37 realizes the shot boundary detection apparatus of the fourth embodiment in a form of a general purpose computer and a software.

In FIG. 37, a CPU 3701 carries out an overall control of the apparatus, and data transmission and reception are carried out through a bus 3708. A magnetic disk device 3702 stores the coded video data, and an inter-field similarity registering unit 3705 is implemented as a memory provided within a computer. A signal separation unit 3703, an inter-field similarity calculation unit 3704, a computation unit 3706, and a comparison unit 3707 are implemented as programs to be stored in a computer memory and executed by the CPU 3701. The signal separation unit 3703 realizes the function of the signal separation unit 3401 of FIG. 34 in a form of a computer program. The inter-field similarity calculation unit 3704 realizes the function of the inter-field similarity calculation unit 3413 of FIG. 34 in a form of a computer program. The computation unit 3706 realizes the functions of the first and second computation units 3408 and 3410 of FIG. 34 in a form of a computer program. The comparison unit 3707 realizes the functions of the second and third comparison units 3409 and 3411 and the OR circuit 3412 of FIG. 34 in a form of a computer program.

As described, according to this fourth embodiment, the inter-field similarities are calculated according to a reference field selection information that can be extracted from the video data coded by the coding scheme including the field prediction scheme without requiring the decoding processing, a prescribed computation is applied to the inter-field similarities calculated from a plurality of fields, and an existence of a shot boundary is judged when the computation result is greater than a prescribed value, so that the time consuming decoding processing becomes unnecessary and it becomes possible to realize a high speed shot boundary detection scheme.

In addition, the shot boundary is detected according to the inter-field similarities rather than the inter-frame similarities, so that it becomes possible to realize an accurate shot boundary detection scheme which can correctly detect a shot boundary located between an odd field and an even field while not detecting a flashlight erroneously as a shot boundary.

Moreover, according to this fourth embodiment, the inter-field similarity calculation process obtains the inter-field similarities by applying a prescribed computation to difference data obtained without the decoding processing, and accumulating the computation result for each reference field separately, so that it becomes possible to detect a shot boundary at high speed.

Furthermore, according to this fourth embodiment, the computation process carries out a prescribed computation which outputs a large value when the first condition that the inter-field similarity between a field of interest and a past field is small and the second condition that the inter-field similarity between a first of interest and a future field is large are both satisfied, so that the computation result takes a large value for a shot boundary and a small value for a noise such as a flashlight, and therefore it becomes possible to detect a shot boundary correctly even from the coded interlaced video data.

Note here that, in the fourth embodiment described above, it is assumed that the odd field is older in time than the even field within one frame, but it is also possible to another setting in which the even field is older in time than the odd field within one frame, and in such a case, the roles of the past field and the future field in the equations used in the fourth embodiment should be reversed.

Moreover, according to this fourth embodiment, the computation process carries out another computation which outputs a large value when the inter-field similarity between a field of interest and a past field and the inter-field similarity between a field of interest and a future field are both small, and the comparison process judges that there is a temporal image change when this computation result is greater than a prescribed value, so that it becomes possible to detect a temporal image change in a clear distinction from a shot boundary.

Referring now to FIG. 38 to FIG. 41, the fifth embodiment of a shot boundary detection scheme according to the present invention will be described in detail. This fifth embodiment is specifically directed to a detection of a dissolve which is a gradually changing shot boundary.

In this fifth embodiment, the changing tendency indicating how the image sequence is changing is calculated from the coded data contained in the image data sequence compressed according to the inter-frame/inter-field prediction coding scheme, and it is judged that the dissolve exists when a rate of a region which has the identical changing tendency over a plurality of frames with respect to an entire field becomes greater than a prescribed threshold. Consequently, it is possible in this fifth embodiment to detect the dissolve at high speed because the feature value is directly extracted from the coded data without decoding the coded data.

In one implementation of this fifth embodiment, the changing tendency is calculated according to signs of the difference data in a region at which the motion compensation prediction was correct among the coded data contained in the image data sequence.

In addition, at a time of calculating the changing tendency according to signs of the difference data in a region at which the motion compensation prediction was correct among the coded data contained in the image data sequence, the signs of the difference data can be changed depending on a direction (past, future, or both) from which the motion compensation prediction was made.

In another implementation of this fifth embodiment, the changing tendency is calculated according to values of the difference data in a region at which the motion compensation prediction was correct among the coded data contained in the image data sequence.

Thus, in this fifth embodiment, the changing tendency is calculated by referring to the difference data allocated to a region at which the motion compensation prediction contained in the inter-frame/inter-field prediction coded images was correct (non-intra-blocks in the MPEG). Here, the inter-frame/inter-field prediction coding scheme searches a region which resembles a region to be coded from images of different times, and obtains the motion vector information for indicating a position of the resembling region and the difference data between a region to be coded and a reference region. The motion vector is already calculated in advance by the motion compensation prediction, so that the difference data is equivalent to the image content change after a camera movement and an imaging target movement are removed. For this reason, it becomes possible in this fifth embodiment to handle the image content change, without decoding the coded image and then removing the camera or image target movement afterwards.

The changing tendency of the image is calculated from such difference data, and a region with a constant changing tendency is extracted as the gradually changing region. The dissolve has a characteristic of changing gradually over a plurality of frames, so that it is possible to detect the dissolve according to a rate of the gradually changing region with respect to an entire field.

Figure 38:
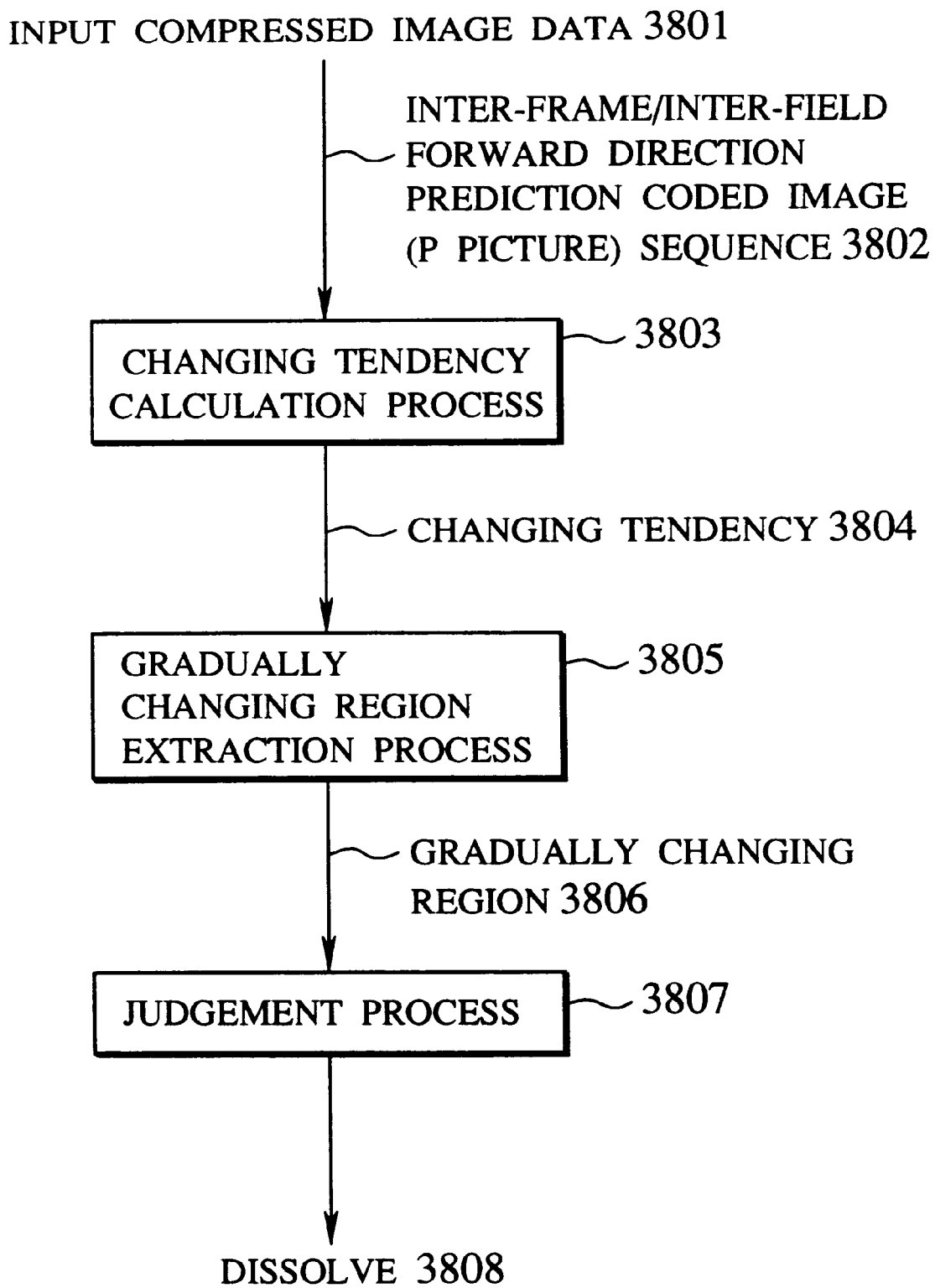
FIG. 38 is a flow chart for the processing of a shot boundary detection scheme according to the fifth embodiment of the present invention.

More specifically, FIG. 38 shows a flow of processing in the fifth embodiment of a shot boundary detection scheme according to the present invention.

As shown in FIG. 38, according to this fifth embodiment, an inter-frame/inter-field forward direction prediction coded image (P picture) sequence 3802 is extracted from an input compressed image data 3801, and entered into a changing tendency calculation process 3803. The changing tendency calculation process 3803 calculates a changing tendency 3804 of each image sequence, and gives the obtained changing tendency 3804 to a gradually changing region extraction process 3805. The gradually changing region extraction process 3805 extracts a feature value for measuring a change of an image content over an extended period of time in each image sequence as a gradually changing region 3806 of each image sequence, and gives the obtained gradually changing region 3806 to a judgement process 3807. These changing tendency calculation process 3803 and gradually changing region extraction process 3805 will be described in further detail below. The judgement process 3807 judges a dissolve 3808 according to a rate of the gradually changing region 3806 with respect to an entire field.

At the changing tendency calculation process 3803, the changing tendency of the feature values for characterizing the image such as brightness, coloring, texture, edges, etc., in terms of symbols.

For example, the changing tendency of the brightness can be quantitatively handled by the following simple method. The difference data allocated to a region (non-intra-blocks in the MPEG) for which the motion compensation prediction contained in the coded data was correct is referred, and a sign of its intensity difference DC component is taken as a symbol indicating the changing tendency. Here, a symbol "+" indicates that the brightness is increasing between frames/fields, a symbol "0" indicates that the brightness is stable between frames/fields, and a symbol "−" indicates that the brightness is decreasing between frames/fields. Of course, for the difference value d, it is also possible to choose a design in which a symbol "+" is allocated when d>n, a symbol "0" is allocated when m<d<n, and a symbol "−" is allocated when d≦m, where n and m are prescribed values.

For the coloring, the sign of the color difference DC component can be used similarly as in a case of the brightness described above.

At the gradually changing region extraction process 3805, a region in which the changing tendency 3804 continues to indicate a constant change over a prescribed number of frames is extracted as the gradually changing region 3806. This gradually changing region extraction process 3805 extracts a uniform change over a prescribed number of frames which is characteristic to the dissolve, such as a gradual increase of the brightness, for example.

Figure 39:
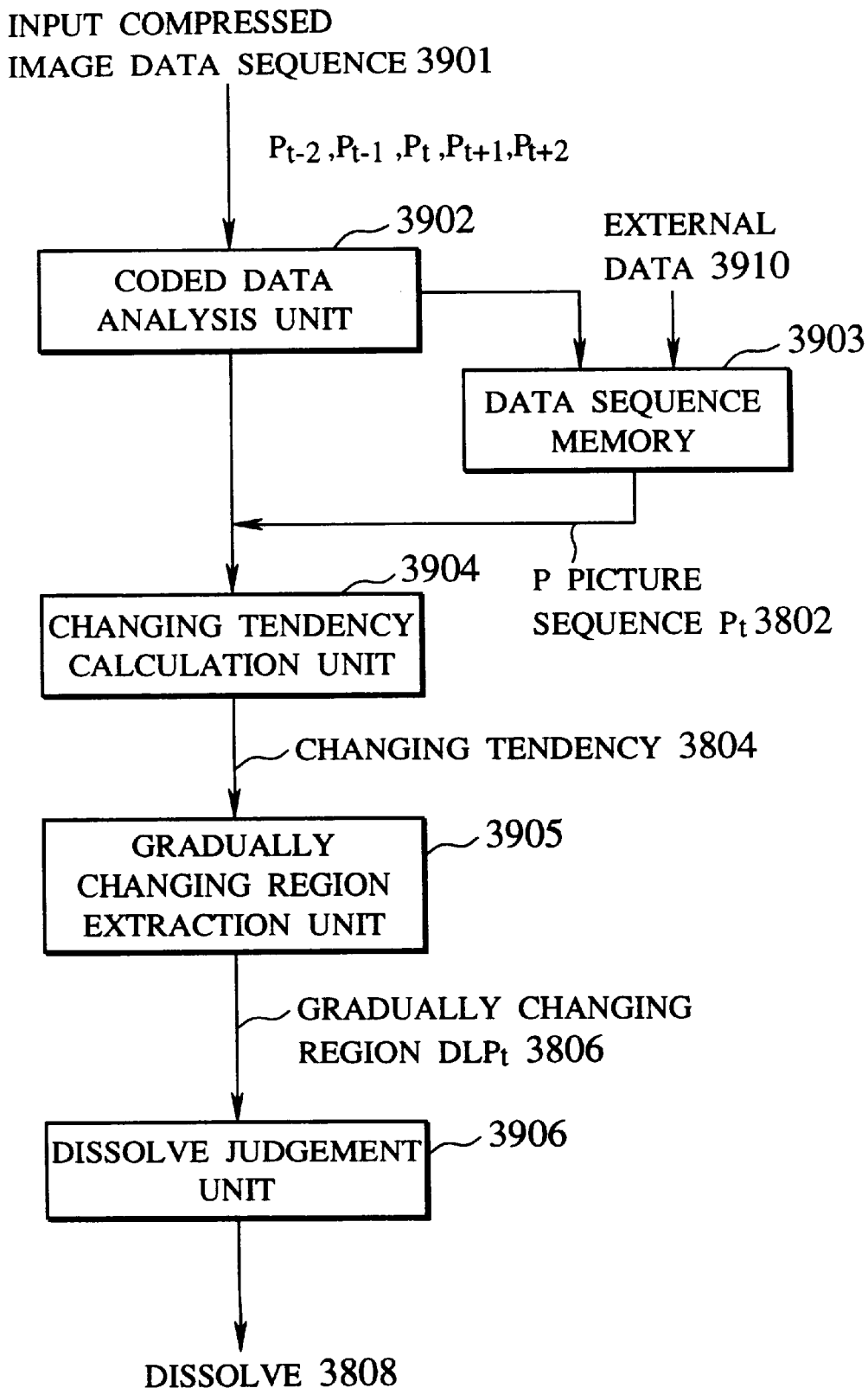
FIG. 39 is a schematic block diagram of a shot boundary detection apparatus in the fifth embodiment of the present invention.

FIG. 39 shows a schematic configuration of a shot boundary detection apparatus for realizing the shot boundary detection scheme of this fifth embodiment, which comprises a coded data analysis unit 3902 for analyzing the coded data of an input compressed image data sequence 3901; a data sequence memory 3903 for storing the input compressed image data sequence along with an information obtained by the coded data analysis unit 3902, and external data 3910; a changing tendency calculation unit 3904 for calculating the changing tendency 3804 from the P picture sequence according to the information obtained by the coded data analysis unit 3902; a gradually changing region extraction unit 3905 for extracting the gradually changing region 3806 according to the changing tendency 3804; and a dissolve judgement unit 3906 for judging the dissolve 3808 according to the gradually changing region 3806.

In this shot boundary detection apparatus of FIG. 39, the dissolve 3808 is detected from an input compressed image data sequence 3901. In the following description of this fifth embodiment, the input compressed image data sequence 3901 is assumed to be an image data sequence in a form of {$P_{t-2}$, $P_{t-1}$, $P_t$, $P_{t+1}$, $P_{t+2}$} which is formed by the P pictures compressed by the inter-frame/inter-field prediction coding scheme.

Note that the input compressed image data sequence 3901 can be image files stored in a storage device such as a hard disk or a CD-ROM, or image files transmitted through a network. A size and a sampling rate of the input compressed image data sequence 3901 are arbitrary, but it must be compressed by using the inter-frame/inter-field prediction coding scheme. For example, it can be the image data sequence according to H.261, MPEG1, or MPEG2 scheme.

The coded data analysis unit 3902 analyzes the input compressed image data sequence 3901 to obtain an information such as picture data, a serial number starting from the top picture, a picture type, etc., and stores the obtained information along with the input compressed image data sequence 3901 for a prescribed number of frames in the data sequence memory 3903.

The data sequence memory 3903 may also store a whole or a part of the coded data, a frame number starting from a top file of the image, a supplementary information such as a feature value obtained by the preliminary processing, as well as an external information such as an imaging time, imaging location, etc. which are obtained and attached to the image data by an external device, and the external data 3910 which are user data separately entered by a user, according to the need.

Among the image sequence read out from the data sequence memory 3903, the P picture sequence 3802 (Pt) is entered into the changing tendency calculation unit 3904, in order to calculate the changing tendency 3804. Then, the changing tendencies over a plurality of frames are compared with each other according to the obtained changing tendency 3804, in order to extract the gradually changing region 3806 (DLPt) which is a region gradually changing over a plurality of frames. The obtained gradually changing region 3806 (DLPt) is entered into the dissolve judgement unit 3906 which judges that the dissolve 3808 exists when a rate of the gradually changing region 3806 with respect to the entire field is greater than a prescribed threshold.

Now, the gradually changing region extraction process 3805 of FIG. 38 which is realized by the gradually changing region extraction unit 3905 of FIG. 39 will be described in further detail.

Figure 40:
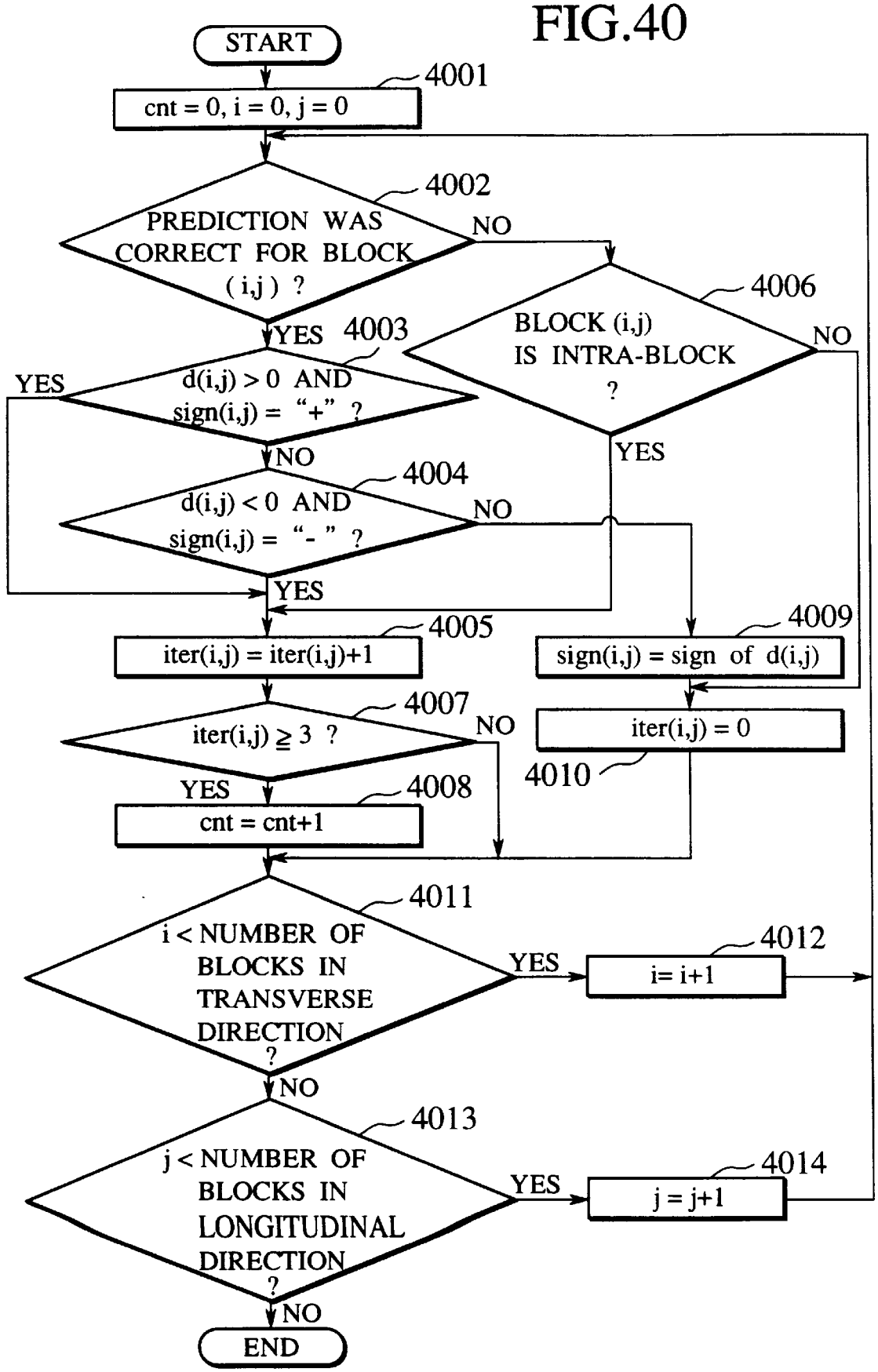
FIG. 40 is a flow chart for one exemplary implementation of a gradually changing region extraction process in the processing according to FIG. 38.

FIG. 40 shows the first exemplary implementation of the gradually changing region extraction process 3805 of FIG. 38, which utilizes the +/− symbols contained in the difference data.

In this first exemplary implementation of FIG. 40, the inter-frame/inter-field prediction coded frames are referred and a region in which differences in the intensity and the color difference have an identical sign for consecutive three frames is extracted as the gradually changing region.

Here, the following variables are used. A variable sign(i, j) indicates a sign (+, 0, −) of an intensity difference d(i, j) for a block (i, j) in the previous frame, where i and j are variables for indicating a position of the block. A variable iter(i, j) is a variable for counting a number of times for which the identical sign appeared consecutively in the block (i, j). A variable cnt is a variable for counting a number of blocks which has the identical sign over the consecutive three frames.

More specifically, the processing according to FIG. 40 proceeds as follows.

First, the variables cnt, i and j are all initialized to 0 at the step 4001. Then, whether the block (i, j) is a block for which the motion compensation with the intensity difference was correct or not is judged at the step 4002.

When it is judged that the block (i, j) is a block for which the motion compensation was correct so that the intensity difference for this block (i, j) exists at the step 4002, whether a condition that a sign of the current intensity difference d(i, j) and a sign of the past intensity difference indicated by the variable sign(i, j) are both "+" is satisfied or not is judged at the step 4003. If this condition is not satisfied, whether a condition that a sign of the current intensity difference d(i, j) and a sign of the past intensity difference indicated by the variable sign(i, j) are both "−" is satisfied or not is judged at the step 4004.

When either condition is satisfied at the step 4003 or the step 4004, it is judged that this block (i, j) is within the gradually changing region, and the variable iter(i, j) is incremented by one at the step 4005.

On the other hand, when both conditions are not satisfied at the step 4003 and the step 4004, it implies that the current sign and the past sign are different, so that the processing jumps to the step 4009 at which the variable sign(i, j) indicating a sign information to be used in the gradually changing region existence judgement processing for the subsequent frames is reset to a sign of the current intensity difference d(i, j). In addition, the variable iter(i, j) indicating a number of identical signs consecutively appeared in the block (i, j) is also reset to 0 at the step 4010 because the intensity difference sign has been changed, and then the processing jumps to the step 4011.

When it is judged that the block (i, j) is not a block for which the motion compensation was correct so that the intensity difference for this block (i, j) does not exist at the step 4002, whether this block (i, j) is an intrablock or not is judged at the step 4006. In this case, the block (i, j) is usually the intra-block. The intra-block appears when the image content is largely changed so that the motion compensation becomes incorrect. In coding the dissolve, it is assumed that there can be a block which became an intra-block in a course of the change, so that a case of the intra-block will be handled similarly as in a case of satisfying either condition at the step 4003 or the step 4004. Thus, when the block (i, j) is the intra-block at the step 4006, the processing proceeds to the step 4005.

In addition, in the coding processing, there can be an exceptional block which is neither a block for which the motion compensation was correct nor an intra-block. In such a case, it is difficult to estimate a value of that coded date so that such an exceptional block will be ignored. For the variable sign(i, j) indicating a sign information to be used in the gradually changing region existence judgement processing for the subsequent frames, the past sign information is maintained, while the variable iter(i, j) indicating a number of identical signs consecutively appeared in the block (i, j) is reset to 0 at the step 4010. Thus, when the block (i, j) is not the intra-block at the step 4006, the processing proceeds to the step 4010.

Note that such an exceptional block appears only very rarely, so that it is also possible to continue the processing by assuming that every block for which the motion compensation was incorrect is the intra-block. Namely, it is also possible to omit the steps 4006 in the processing of FIG. 40.

By the processing described so far, the variable iter(i, j) stores a number of times for which the identical sign appeared consecutively in the block (i, j). Then, whether this variable iter(i, j) is not less than three or not is judged at the step 4007, and when this variable iter(i, j) is not less than three, the variable cnt is incremented by one at the step 4008.

The above described steps 4002 to 4008 are then repeated for every block, that is, as long as the variable i is less than a total number of blocks in the transverse direction (step 4011 YES) and as long as the variable j is less than a total number of blocks in the longitudinal direction (step 4013 YES), by sequentially incrementing the variable i and the variable j (steps 4012 and 4014).

The variable cnt resulting from this processing of FIG. 40 indicates an area of a region in which the intensity differences have the identical sign over consecutive three frames.

When an area of the gradually changing region indicated by this variable cnt is greater than a prescribed threshold, the judgement process 3807 of FIG. 38 realized by the dissolve judgement unit 3908 of FIG. 39 judges that the dissolve 3808 exists.

Note that, in the first exemplary implementation described above, the condition as to whether the block (i, j) is a block for which the motion compensation was correct or not is used at the step 4002, but it is also possible to replace this condition by another condition as to whether |d(i, j)| is greater than a prescribed positive value or not. Also, the step 4006 for judging the intra-blocks can be omitted so that the value of the variable iter(i, j) is maintained whenever the block (i, j) is not a block for which the motion compensation was correct.

Figure 41:
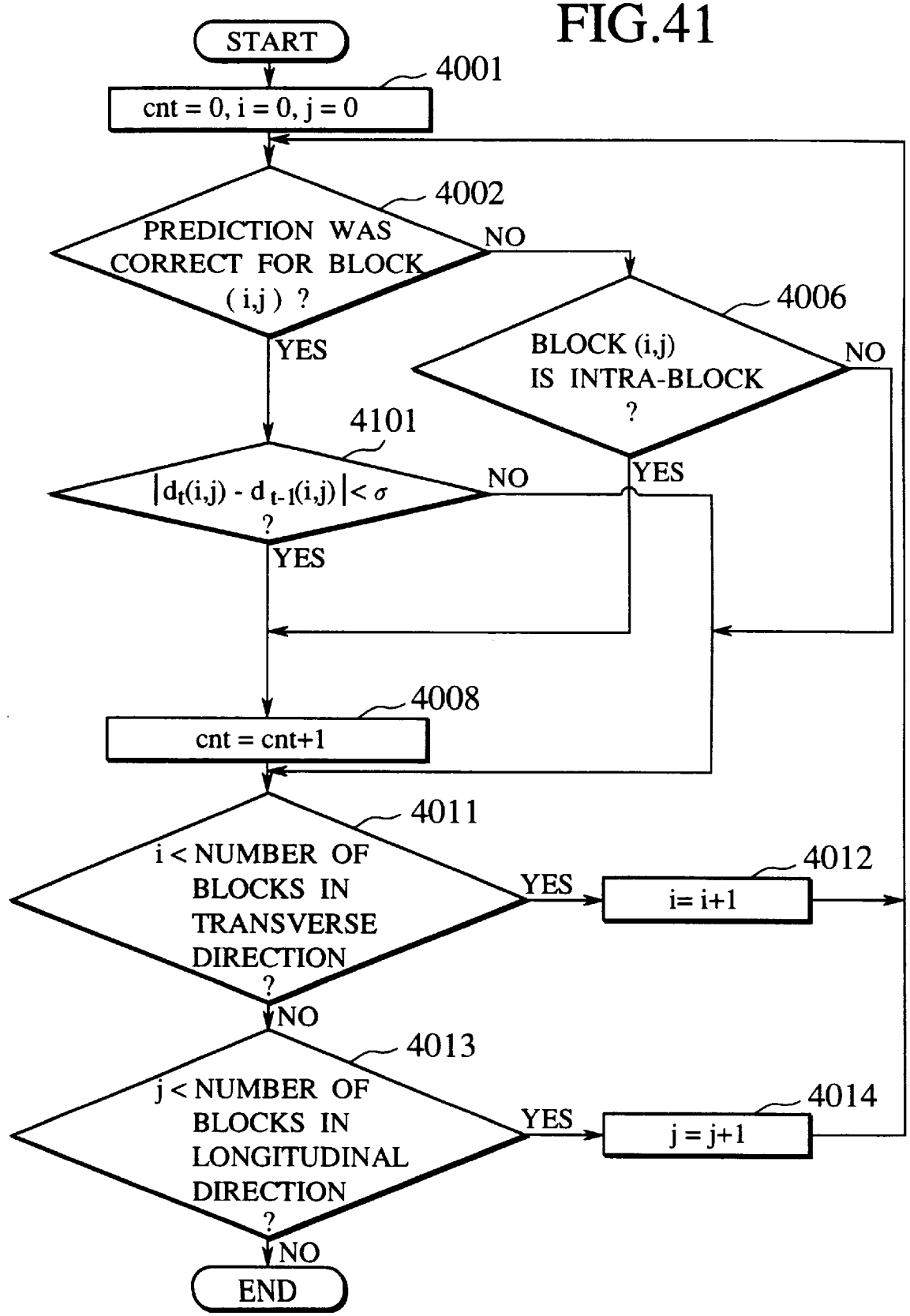
FIG. 41 is a flow chart for another exemplary implementation of a gradually changing region extraction process in the processing according to FIG. 38.

FIG. 41 shows the second exemplary implementation of the gradually changing region extraction process 3805 of FIG. 38, which utilizes a size of the difference data.

In this second exemplary implementation of FIG. 41, the inter-frame/inter-field prediction coded frames are referred and a region in which differences in the intensity have an identical difference value for consecutive two frames is extracted as the gradually changing region.

Here, in addition to the variables used in the first exemplary implementation of FIG. 40, the following variables are used. A variable $d_t$ (i, j) indicates a value of the intensity difference for the block (i, j) in the t-th frame.

In the processing of FIG. 41, the steps 4001, 4002, 4006, 4008 and 4011 to 4014 are the same as in FIG. 40, while the steps 4005, 4007, 4009 and 4010 of FIG. 40 are omitted. Instead of the steps 4003 and 4004 of FIG. 40, the processing of FIG. 41 includes the step 4101 for judging whether an absolute value of a difference between $d_t$ (i, j) and $d_{t-1}$ (i, j) is smaller than a prescribed threshold σ. When this absolute value is smaller than σ, it is judged that the difference values are identical in the t-th frame and the (t−1)-th frame, and the processing proceeds to the step 4008. When this absolute value is not smaller than a, the processing proceeds to the step 4011.

Note that the step 4101 of FIG. 41 uses the threshold σ which is a fixed value, but it is also possible to vary this threshold σ adaptively. In such a case, it is also possible to modify the processing of FIG. 41 to include the step for determining a value of the threshold σ according to the quantization step contained in the coded data.

The variable cnt resulting from this processing of FIG. 41 indicates an area of a region in which the intensity differences have the identical value over consecutive two frames. When an area of the gradually changing region indicated by this variable cnt is greater than a prescribed threshold, the judgement process 3807 of FIG. 38 realized by the dissolve judgement unit 3906 of FIG. 39 judges that the dissolve 3808 exists.

It is to be noted here that, in the fifth embodiment described above, the input video data is assumed to be the P picture sequence which is an image sequence according to the inter-frame/inter-field forward direction prediction coding scheme, but in the MPEG scheme, the other types of images such as those according to the inter-frame/inter-field bidirectional prediction coding scheme (B pictures) and those according to the intra-frame/intra-field coding scheme (I pictures) also appear. In this fifth embodiment, these I pictures and B pictures are ignored, but it is also possible to carry out the changing tendency calculation, the gradually changing region extraction, and the dissolve judgement with respect to the B pictures similarly as in a case of the P pictures, because the B pictures have the difference data similarly as the P pictures.

Note however that, in such a case, the B picture refers to both the past and future images so that there is a need to provide an additional processing such as that for inverting signs by accounting for the presence of the difference data with respect to the past image, the difference data with respect to the future image, and the difference data with respect to both.

As described, according to this fifth embodiment, the dissolve is detected from the compressed image data sequence, by utilizing various information contained in the inter-frame/inter-field prediction coded images, so that it becomes possible to detect a dissolve at high speed, without requiring the decoding processing.

Referring now to FIG. 42 to FIG. 48, the sixth embodiment of a shot boundary detection scheme according to the present invention will be described in detail. This sixth embodiment is specifically directed to a prevention of an erroneous detection of a noise such as a flash as a shot boundary.

In this sixth embodiment, a region at which the motion compensation prediction was incorrect is contracted as much as a width corresponding to a range to which the influence of the motion compensation prediction reaches from a boundary of a region at which the motion compensation prediction was correct, according to the coded data contained in the image data sequence compressed by the inter-frame/inter-field prediction coding scheme, and it is judged that a shot boundary exists when the calculated image sequence change is greater than a prescribed threshold. At a time of calculating the image sequence change, it is preferable to use a calculation method capable of cancelling a noise such as a flash and emphasizing a shot boundary.

In this manner, a region which is expected to have an adverse effect on a conventional spatial computation is removed in advance, so that an influence of a noise such as a flash can be eliminated.

In one implementation, the input compressed image data sequence is analyzed and a range to which the influence of the motion compensation prediction reaches is estimated from a value of the motion vector recorded in the difference data.

In another implementation, the image sequence change is calculated by comparing a type of block contained in a region contracted by the spatial computation with types of blocks contained in adjacent frames.

Figure 42:
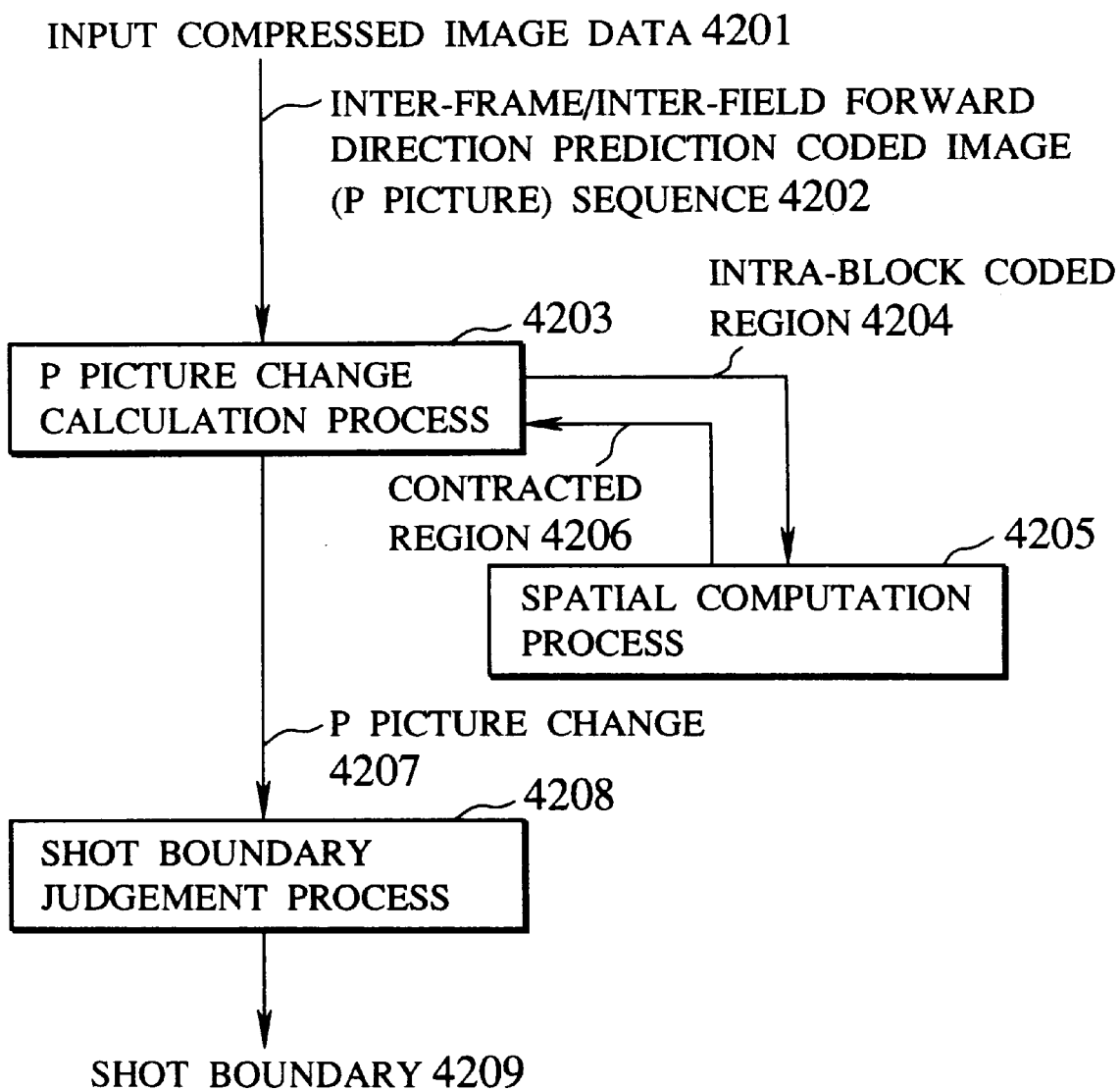
FIG. 42 is a flow chart for the processing of a shot boundary detection scheme according to the sixth embodiment of the present invention.

More specifically, FIG. 42 shows a flow of processing in the sixth embodiment of a shot boundary detection scheme according to the present invention.

As shown in FIG. 42, according to this sixth embodiment, an inter-frame/inter-field forward direction prediction coded image (P picture) sequence 4202 is extracted from an input compressed image data 4201, and entered into a P picture change calculation process 4203. At this stage, an intra-block coded region 4204 is specified to a spatial computation process 4205 so that the spatial computation process 4205 contracts a boundary portion of the intra-block coded region 4204 as much as a search range used in the motion compensation prediction and returns an obtained contracted region 4206 to the P picture change calculation process 4203. The P picture change calculation process 4203 then calculates a P picture change 4207 according to the contracted region 4206. At this point, the influence of a flash is removed so that only a shot boundary causes a high P picture change. A shot boundary judgement process 4208 then judges a shot boundary 4209 according to a size of the calculated P picture change 4207.

Thus, in this sixth embodiment, the image sequence change between frames is calculated by contracting a partial region of the inter-frame/inter-field forward direction prediction coded image sequence 4202 and removing an influence of a flash completely by carrying out the spatial computation, and a shot boundary is detected by evaluating the calculated image sequence change.

Figure 43:
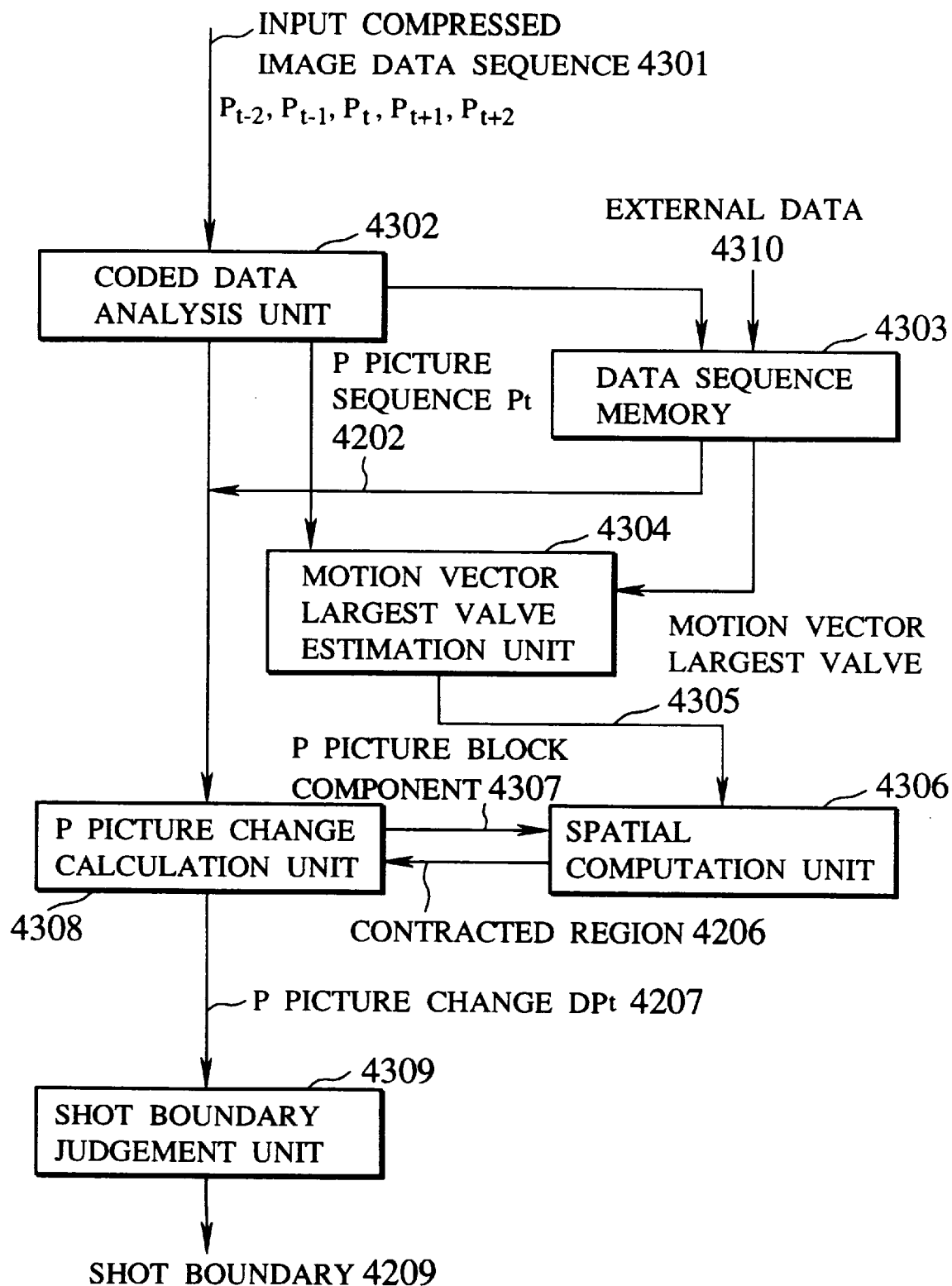
FIG. 43 is a schematic block diagram of a shot boundary detection apparatus in the sixth embodiment of the present invention.

FIG. 43 shows a schematic configuration of a shot boundary detection apparatus for realizing the shot boundary detection scheme of this sixth embodiment, which comprises a coded data analysis unit 4302 for analyzing the coded data of an input compressed image data sequence 4301; a data sequence memory 4303 for storing the input compressed image data sequence along with an information obtained by the coded data analysis unit 4302, and external data 4310; a motion vector largest value estimation unit 4304 for estimating a motion vector largest value 4305; a spatial computation unit 4306 for carrying out the spatial computation according to the motion vector largest value 4305 and a P picture block component 4307 and obtaining the contracted region 4206; a P picture change calculation unit 4308 for calculating the P picture change 4207 (DPt) from the P picture sequence 4202 (Pt) according to the contracted region 4206; and a shot boundary judgement unit 4309 for judging the shot boundary 4209 according to the P picture change 4207.

In this shot boundary detection apparatus of FIG. 43, the shot boundary 4209 is detected from an input compressed image data sequence 4301. In the following description of this sixth embodiment, the input compressed image data sequence 4301 is assumed to be an image data sequence in a form of {Pt-2, Pt-1, Pt, Pt+1, Pt+2} which is formed by the P pictures compressed by the inter-frame/inter-field prediction coding scheme. Here, a structure and a prediction unit for the P picture are assumed to be the frame structure and the frame prediction.

Note that the input compressed image data sequence 4301 can be image files stored in a storage device such as a hard disk or a CD-ROM, or image files transmitted through a network. A size and a sampling rate of the input compressed image data sequence 4301 are arbitrary, but it must be compressed by using the inter-frame/inter-field prediction coding scheme. For example, it can be the image data sequence according to H.261, MPEG1, or MPEG2 scheme. In such a compression scheme, the image data sequence contains intra-frame/intra-field coded images, inter-frame/inter-field forward direction prediction coded images, and inter-frame/inter-field bidirectional prediction coded images, but their frequencies of appearance can be arbitrary and their structure and prediction scheme can be any desired structure (frame structure, field structure) and prediction scheme (inter-frame prediction scheme, inter-field prediction scheme).

The coded data analysis unit 4302 analyzes the input compressed image data sequence 4301 to obtain an information such as picture data, a serial number starting from the top picture, a picture type, a block type, whether each block is a block (p block) for which the motion compensation prediction was correct or a block (i block) for which the motion compensation prediction was incorrect, etc., and stores the obtained information along with the input compressed image data sequence 4301 for a prescribed number of frames in the data sequence memory 4303.

The data sequence memory 3203 may also store a whole or a part of the coded data, a frame number starting from a top file of the image, a supplementary information such as a feature value obtained by the preliminary processing, as well as an external information such as an imaging time, imaging location, etc. which are obtained and attached to the image data by an external device, and the external data 4310 which are user data separately entered by a user, according to the need.

Among the image sequence read out from the data sequence memory 4303, the P picture sequence 4302 (Pt) is entered into the P picture change calculation unit 4308. At this point, a part of a boundary region between the intra-block coded region and the inter-frame/inter-field coded region is removed from the intra-block coded region at the spatial computation unit 4306.

To this end, it is necessary to ascertain in advance a size of an influencing range of the inter-frame/inter-field prediction coding, so that the motion vector largest value estimation unit 4304 estimates the motion vector largest value 4305 as a range to which the influence of the motion compensation prediction reaches according to the analyzed coded data, and enters this motion vector largest value 4305 into the spatial computation unit 4306, so that the spatial computation unit 4306 produces the contracted region 4206 according to the entered motion vector largest value 4305.

Then, the P picture change calculation unit 4308 calculates the P picture change 4207 according to the contracted region 4206, and the shot boundary judgement unit 4309 judges the shot boundary 4209 according to a size of the calculated P picture change 4207.

Now, the motion vector largest value estimation unit 4304, the spatial computation unit 4306, and the P picture change calculation unit 4308 of FIG. 43 will be described in further detail.

At the motion vector largest value estimation unit 4304, the motion vector largest value 4305 contained in the coded data is detected. Here, a range to which an influence of the motion compensation prediction reaches corresponds to the motion vector largest value 4305. For this reason, the largest one among the motion vectors contained in the coded data of the first several frames is detected.

In further detail, the processing by the motion vector largest value estimation unit 4304 proceeds according to a flow chart of FIG. 44 as follows.

When the P picture sequence 4202 is entered, the processing starts from the top frame. First, a variable t for specifying each P picture as well as variables MaxVx and MaxVy for indicating the motion vector largest value are initialized to 0 (step 4401), and variables i and j for specifying each block are initialized to 0 (step 4402).

Then, the block (i, j) is checked in each P picture.

Namely, whether the block (i, j) is a block (p block) for which the motion compensation prediction was correct or not is judged at the step 4403. When the block (i, j) is the p block, whether a size of the horizontal component Vx(i, j) of the motion vector contained in this block (i, j) is greater than a size of the horizontal component MaxVx of the motion vector largest value at this point or not is checked at the step 4404, and if so, the horizontal component MAXVx of the motion vector largest value is replaced by this horizontal component Vx(i, j) at the step 4405.

Similarly, whether a size of the vertical component component Vy(i, j) of the motion vector contained in this block (i, j) is greater than a size of the vertical component MaxVy of the motion vector largest value at this point or not is checked at the step 4406, and if so, the vertical component MAXVy of the motion vector largest value is replaced by this vertical component Vy(i, j) at the step 4407.

Then, unless all the blocks are checked at the step 4408, each of the variables i and j is incremented by one at the step 4409, and the steps 4403 to 4408 are repeated for a next block. When all the blocks are checked at the step 4408, unless the variable t reaches to a prescribed value T at the step 4410, the variable t is incremented by one at the step 4411 and the steps 4402 to 4410 are repeated for a next frame.

When the processing is finished for all the blocks of all the frames from the top frame to the T-th frame, the motion vector largest value indicated by MaxVx and MaxVy is obtained.

Figure 44:
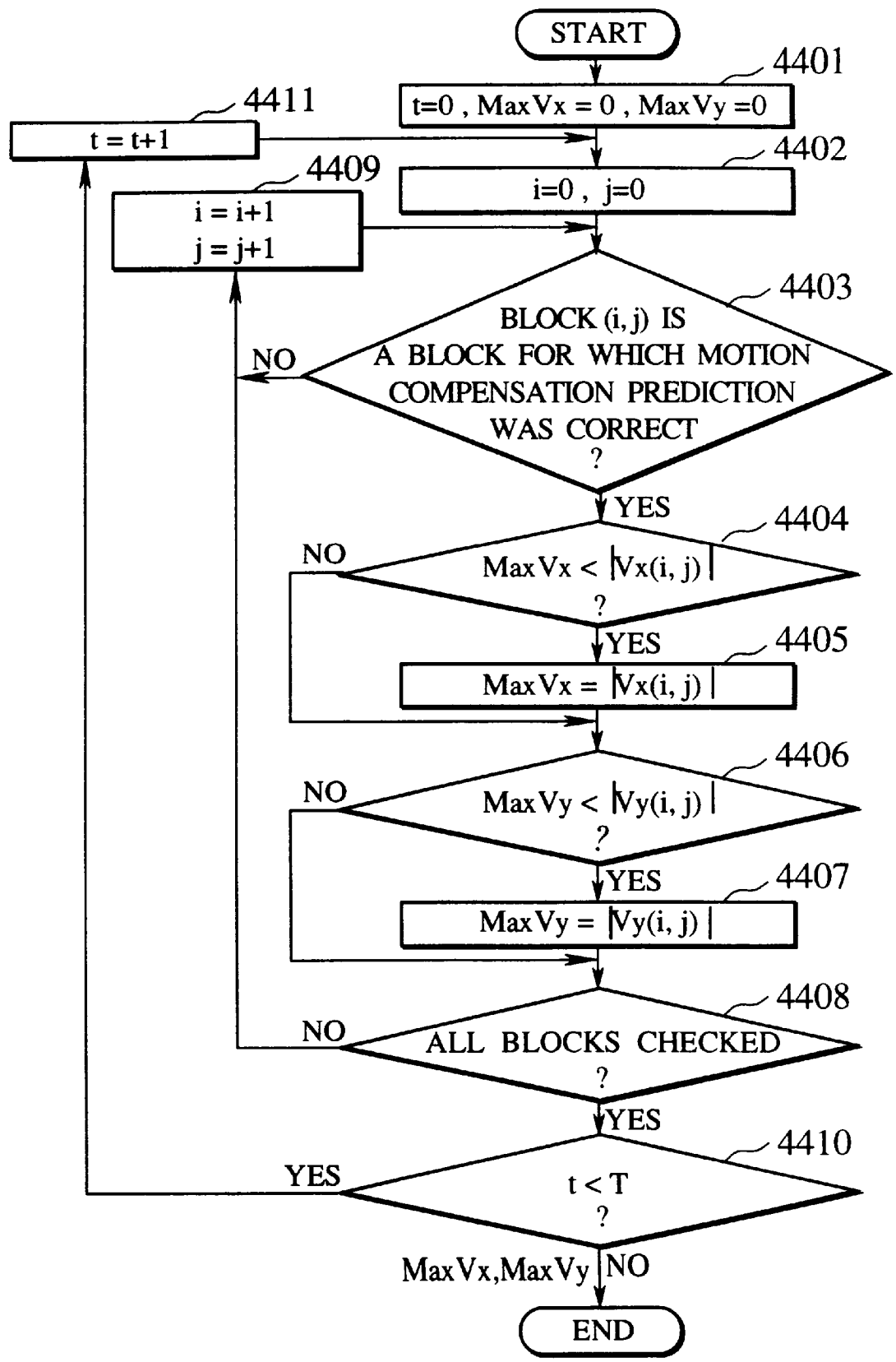
FIG. 44 is a flow chart for the processing by a motion vector largest value estimation unit in the shot boundary detection apparatus of FIG. 43.

In this sixth embodiment, the T frames for which the processing of FIG. 44 is to be carried out is assumed to be the first fifteen frames of the P pictures, but this setting may be longer or shorter depending on the video. MaxVx and MaxVy can be determined accurately by carrying out this processing of FIG. 44 for all the frames.

Note that, when the values of MaxVx and MaxVy are known in advance, the processing of the motion vector largest value estimation unit 4304 will be unnecessary. It is also possible to simply determine a size of the motion vector without decomposing the motion vector into the horizontal and vertical components.

At the spatial computation unit 4306, a region at which the inter-frame/inter-field prediction was incorrect in the P picture sequence 4202 is contracted at a peripheral portion of a boundary with respect to a region at which the motion compensation prediction was correct, as much as a range to which the influence of the motion compensation prediction reaches. This processing is illustrated in FIGS. 45A to 45D.

Figure 45A:
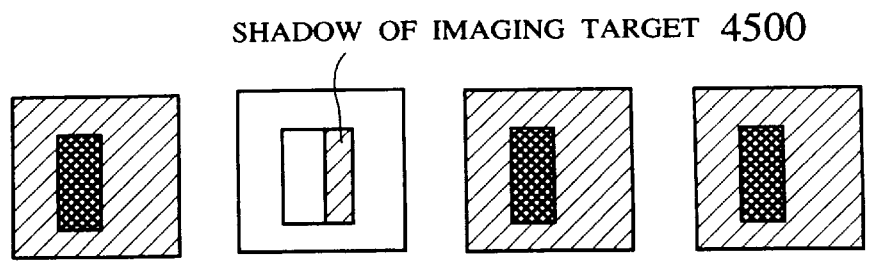
FIGS. 45A to 45D are diagrams for explaining the processing by a spatial computation unit in the shot boundary detection apparatus of FIG. 43.

FIG. 45A shows an original image sequence in which the flash is lit toward an imaging target at the second frame so that a brightness of the imaging target is increased abruptly while a shot portion 4500 of the imaging target also appears.

Figure 45B:
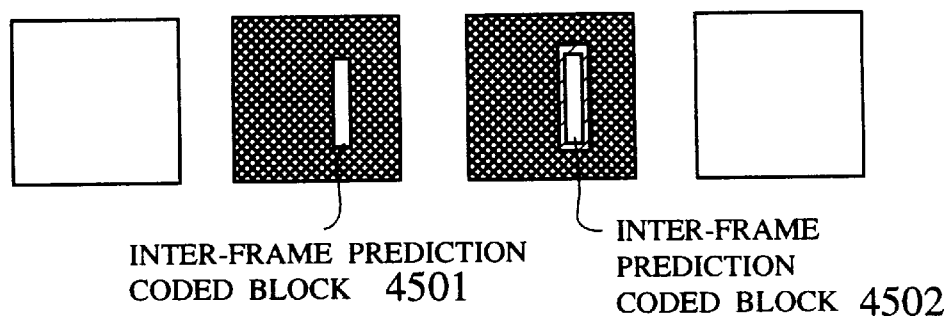

FIG. 45B shows the intra-blocks on the original image sequence of FIG. 45A. In the second frame at which the flash is lit toward the imaging target, the motion compensation prediction becomes incorrect for a region at which the brightness is abruptly increased, so that this region (a blackened region in FIG. 45B) becomes the intra-blocks, but the shadow portion 4500 remains unchanged from a previous frame before the flash is lit, so that this portion (a white portion in FIG. 45B) becomes inter-frame/inter-field prediction coded blocks 4501 for which the prediction was correct.

In the third frame next to the frame at which the flash is lit, the overall brightness is abruptly decreased and set back to the original level, so that the prediction becomes incorrect again for most of the region for which the prediction was incorrect at the second frame, and therefore this region is coded as the intra-blocks. However, a region surrounding the shadow portion 4500 of the imaging target has almost the same brightness as the shadow portion 4500, so that the prediction from the shadow portion becomes correct and this region (a shaded region in FIG. 45B) becomes inter-frame/inter-field prediction coded blocks 4502.

Figure 45C:
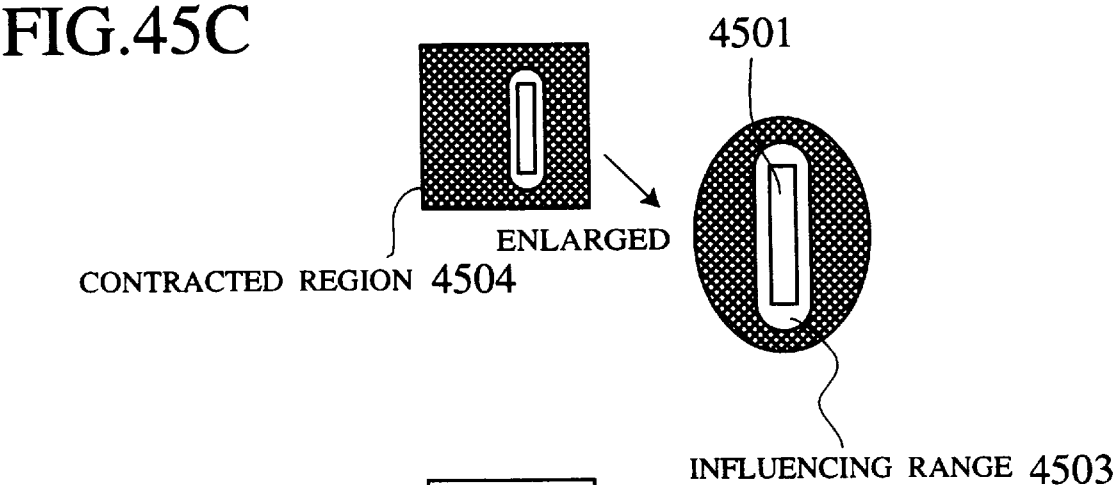

Then, as shown in FIG. 45C, the spatial computation unit 4306 contracts a region at which the motion compensation prediction was incorrect (intra-blocks) as much as an influencing range 4503 in which the influence of the prediction coding reaches around the shadow portion 4500 of the imaging target due to the flash, so as to obtain a contracted region 4504.

Figure 45D:
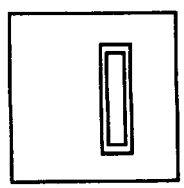

When the computation with respect to adjacent past and future frames is carried out by using this contracted region 4504, it is possible to remove a noise due to the flash and the error due to the flash can be cancelled out, as indicated in FIG. 45D.

In further detail, the processing by the spatial computation unit 4306 proceeds according to a flow chart of FIG. 46 as follows.

Here, the variables MaxVx and MaxVy are the horizontal and vertical components of the motion vector largest value obtained by the motion vector largest value estimation unit 4304. The variables i and j indicate a position of each block, where i indicates a block position in a transverse direction and j indicates a block position in a longitudinal direction. Also, $X_t$ denotes a contracted region obtained from the P picture with the frame number t while $X_t$ (i, j) denotes a block in the contracted region, where a region at which the motion compensation prediction was incorrect is contracted by the spatial computation unit 4306.

First, the variables i and j are initialized to 0 (step 4601), and whether the block (i, j) is a block (p block) for which the motion compensation prediction was correct or not is judged at the step 4602. When the block (i, j) is the p block (step 4602 YES), $X_t$ (i, j) is set as the p block at the step 4605, and the processing jumps to the step 4611.

On the other hand, when the block (i, j) is the i block for which the motion compensation prediction was incorrect (step 4602 NO), variables l and m are initialized to 0 at the step 4603, and whether the block (i+l, j+m) is the p block or not is judged at the step 4604, and if not, the variable l in incremented by one (step 4607) as long as the variable l is less than MaxVx (step 4606) or the variable m is incremented by one (step 4609) as long as the variable m is less than MaxVy (step 4608) and the step 4604 is repeated. In other words, whether any p block exists within a range to which the influence of the motion compensation prediction reaches around each i block (i, j) is checked.

When such a p block exists (step 4604 YES), the i block (i, j) is the i block which is located at a boundary portion within a range to which the influence of the motion compensation prediction reaches, which is to be processed by the contraction processing, so that $X_t$ (i, j) corresponding to this i block (i, j) is set as the p block at the step 4605. When such a p block does not exist (step 4608 NO), it is judged that this i block (i, j) is not located at a boundary portion, so that $X_t$ (i, j) corresponding to this i block (i, j) is set as the i block at the step 4610. These steps 4602 to 4610 are then repeated for all the blocks as the variable i is incremented by one (step 4612) as long as the variable i is less than a number of blocks in the transverse direction (step 4611) and the variable j is incremented by one (step 4614) as long as the variable j is less than a number of blocks in the longitudinal direction 8 step 4613).

Figure 46:
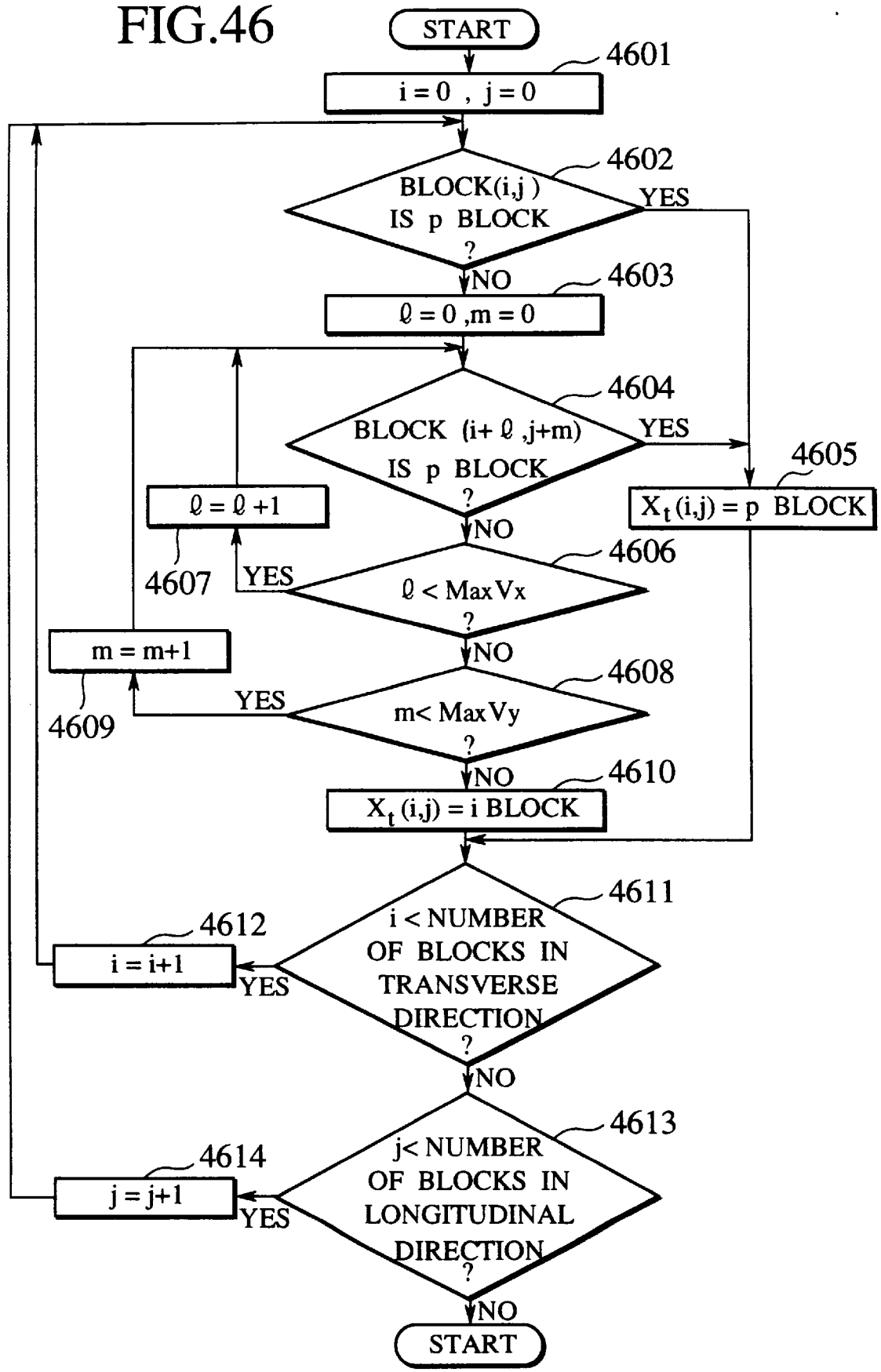
FIG. 46 is a flow chart for the processing by a spatial computation unit in the shot boundary detection apparatus of FIG. 43.

By this processing of FIG. 46, the spatial computation unit 4306 obtains the contracted region $X_t$ in which a region at which the motion compensation prediction was incorrect in the image sequence is contracted from the boundary portion as much as a range to which the influence of the motion compensation prediction reaches according to the motion vector largest value.

The P picture change calculation unit 4308 carries out the computation which calculates the P picture change by eliminating the influence of a noise such as a flash and emphasizing the shot boundary, among the contracted region 4206 obtained from the P picture sequence 4202 and its adjacent P picture frames. This processing is illustrated in FIG. 47.

Namely, among the contracted region 4704 obtained from the P picture 4701 and its adjacent P pictures 4700 and 4702, a processing for removing the noise is carried out by using flags 4705. Here, several implementations are possible for this processing.

Figure 47:
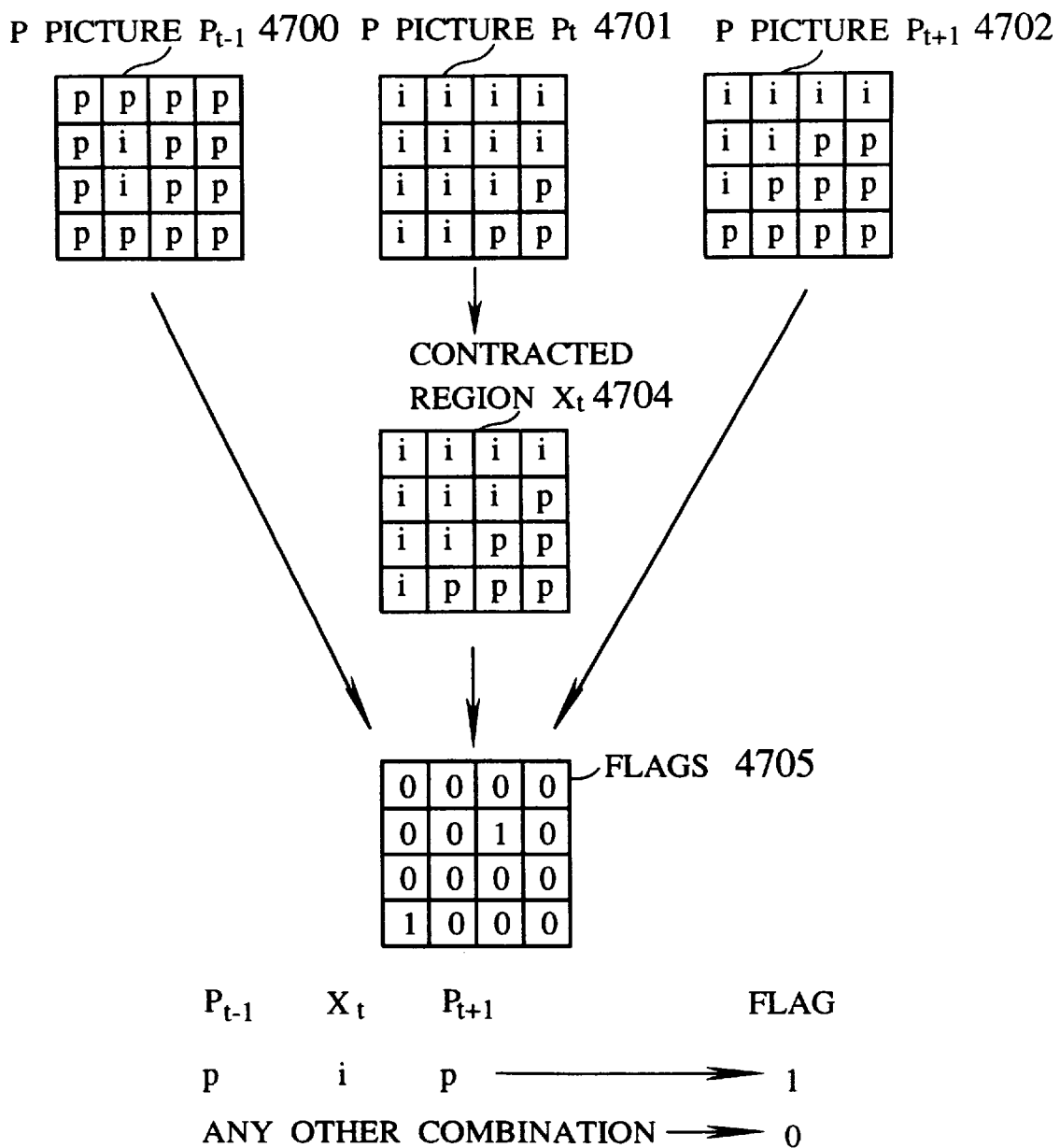
FIG. 47 is a diagram for explaining the processing by a P picture change calculation unit in the shot boundary detection apparatus of FIG. 43.

In the first exemplary implementation, each i block existing in the contracted region 4704 is judged as a valid block (a flag value "1") only when the corresponding blocks in the adjacent past and future P pictures are both p blocks, and any other combinations of blocks among the contracted region 4704 and the adjacent P pictures 4700 and 4702 are judged as an invalid block (a flag value "0"), as indicated in FIG. 47. By this processing, it is possible to achieve the effect as illustrated in FIG. 45D so that the error due to the flash can be removed.

On the other hand, as for the shot boundary, the frame containing the shot boundary is almost entirely i blocks, while the motion compensation prediction mostly becomes correct for the frames before and after the shot boundary so that these frames are almost entirely p blocks, and therefore the shot boundary will not be erroneously removed by the emphasizing processing of FIG. 47.

The P picture change calculation unit 4308 then calculates the P picture change according to a rate of the valid blocks within a frame with respect to the entire field.

Figure 48:
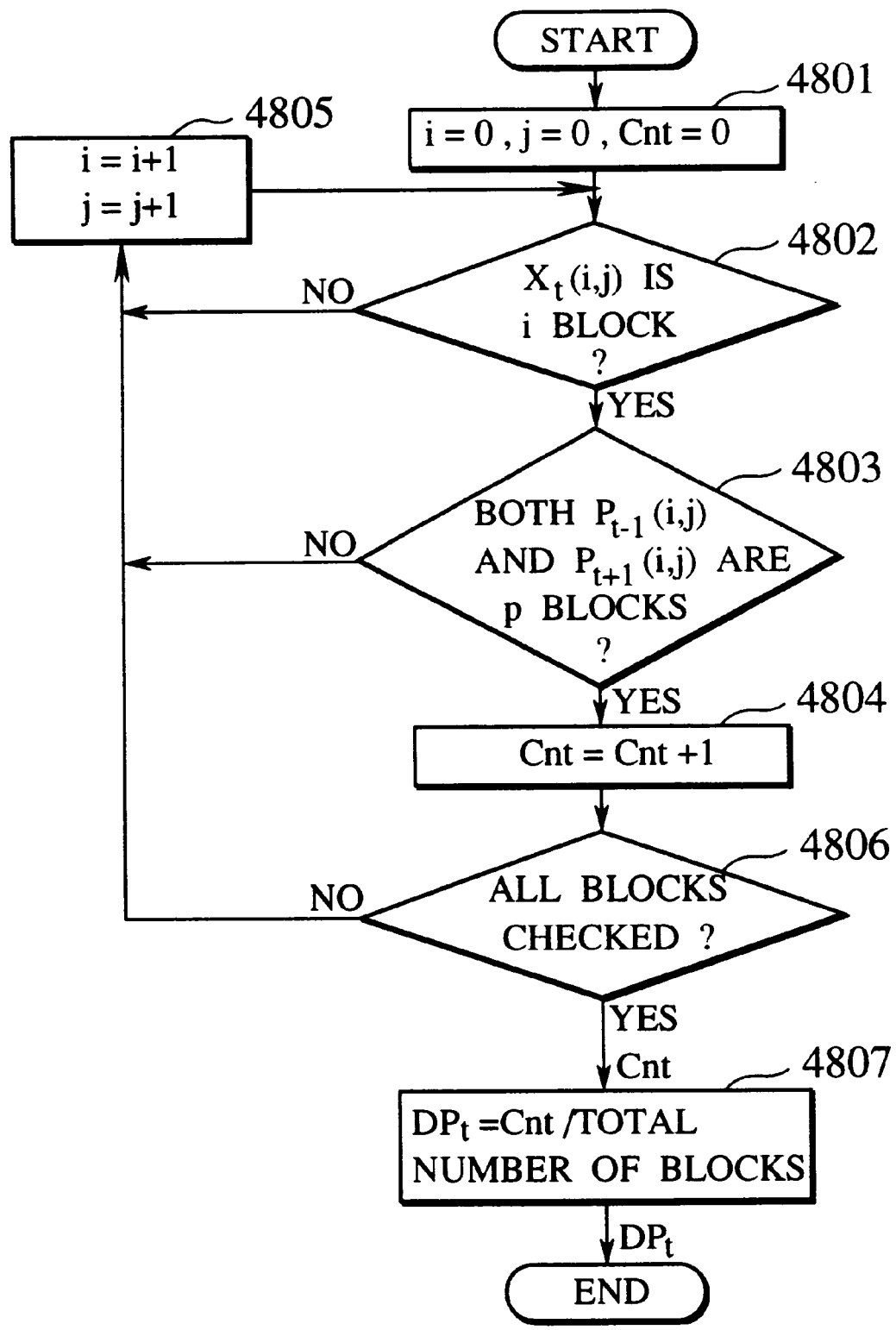
FIG. 48 is a flow chart for the processing by a P picture change calculation unit in the shot boundary detection apparatus of FIG. 43.

In further detail, the processing by the P picture change calculation unit 4308 proceeds according to a flow chart of FIG. 48 as follows.

Here, the contracted region $X_t$ and its adjacent past and future P pictures $P_{t-1}$ and $P_{t+1}$ are entered, and the following processing is carried out for each block of the contracted region $X_t$.

First, the variables i and j are initialized to 0 at the step 4801. Then, whether the block $X_t$ (i, j) on the contracted image is the i block or not is judged at the step 4802, and whether the corresponding blocks $P_{t-1}$ (i, j) and $P_{t+1}$ (i, j) on the adjacent past and future P pictures are both p blocks or not is judged at the step 4803. Then, only when $X_t$ (i, j) is the i block and both $P_{t-1}$ (i, j) and $P_{t+1}$ (i, j) are the p blocks, a variable Cnt is incremented by one at the step 4804. Otherwise, each of the variables i and j is incremented by one at the step 4805. These steps 4802 to 4805 are then repeated for all the blocks by the step 4806.

Then, after the steps 4802 to 4805 are finished for all the blocks, a rate of the variable Cnt with respect to a total number of blocks is calculated as the P picture change $DP_t$ at the step 4807.

In the second exemplary implementation, a number $NX_t$ of i blocks contained in the contracted region $X_t$ is counted while numbers $NP_{t-1}$ and $NP_{t+1}$ of i blocks contained in the adjacent past and future P pictures $P_{t-1}$ and $P_{t-1}$ are also counted. Then, a difference $DN_t$ between the number $NX_t$ and a larger one of the numbers $NP_{t-1}$ and $NP_{t+1}$ given by:

$$i\ DN_t = NX_t - \max\{NP_{t-1}, NP_{t+1}\}$$

is calculated. Then, a rate of the obtained difference value $DN_t$ with respect to a total number of blocks is calculated as the P picture change $DP_t$. In the first exemplary implementation described above, the P picture change is calculated by using the blocks at corresponding positions, but in contrast, in the second exemplary implementation, the P picture is calculated by comparing total numbers of i blocks regardless of their positions.

Note that, in the first exemplary implementation, the blocks in the contracted region are compared with the blocks within the adjacent past and future P pictures, and the P picture change is calculated from an information on blocks of the corresponding positions, while in the second exemplary implementation, the P picture change is calculated by selecting one of the adjacent past and future P pictures and carrying out the difference calculation. It is also possible to modify this sixth embodiment such that these comparison and calculation processings are carried out only with respect to the past P picture alone, or over a several frames cumulatively.

According to the P picture change $DP_t$ calculated by the P picture change calculation unit 4308, the shot boundary judgement unit 4309 judges that a shot boundary exists when the P picture change is greater than a prescribed threshold, and outputs this shot boundary. In this sixth embodiment, the threshold is assumed to be a constant value given in advance, but it is also possible to vary the threshold according to the image. It is also possible to use the threshold given by a user.

It is to be noted here that, in the sixth embodiment described above, the input video data is assumed to be the P picture sequence which is an image sequence according to the inter-frame/inter-field forward direction prediction coding scheme, but in the MPEG scheme, the other types of images such as those according to the inter-frame/inter-field bidirectional prediction coding scheme (B pictures) and those according to the intra-frame/intra-field coding scheme (I pictures) also appear. In this sixth embodiment, these I pictures and B pictures are ignored, but in a case where the I picture appears between the P picture sequences, it is also possible to detect the shot boundary by carrying out the processing which regards the P pictures before the I picture and the P pictures after the I picture have no relation to each other.

It is also to be noted that, in the sixth embodiment described above, it is assumed that the thresholds are automatically given by the shot boundary detection apparatus, but it is also possible to freely vary the thresholds by additionally providing a user interface unit. For example, it is possible to provide the user interface unit along with a function for displaying an image immediately after the shot boundary so that it becomes easier for a user to browse through the compressed video data content. Then, by allowing the user to set up the thresholds at any desired values, it is possible to adjust a number of images for showing the compressed video data content according to the user's preference so that it becomes easier for the user to make an access to the desired scene.

As described, according to this sixth embodiment, the shot boundary is detected from the compressed image data sequence, by utilizing various information contained in the inter-frame/inter-field prediction coded images, so that it becomes possible to detect the shot boundary at high speed, without requiring the decoding processing, and at high accuracy, without erroneously detecting a noise such as a flashlight as a shot boundary.

It is to be noted that a shot boundary detection system based on the shot boundary detection scheme of any of the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for detecting a shot boundary from an input video data compressed by a coding scheme using both an inter-frame/inter-field prediction coding scheme and an intra-frame/intra-field coding scheme, comprising the steps of:

(a) calculating a Predictive-picture (P picture) change from a P picture sequence in the input video data which is compressed by an inter-frame/inter-field forward direction prediction coding scheme, according to coded data contained in the P picture sequence;

(b) calculating an Intra-picture (I picture) change from an I picture sequence in the input video data which is compressed by an intra-frame/intra-field coding scheme, according to coded data contained in the I picture sequence; and (c) detecting a shot boundary by evaluating both the P picture change calculated at the step (a) and the I picture change calculated at the step (b).

2. The method of claim 1, wherein the step (a) calculates the P picture change as a rate of a region at which an inter-frame/inter-field prediction was incorrect with respect to an entire field.

3. The method of claim 1, wherein the step (a) includes the steps of:

obtaining a region at which a change occurred between adjacent images of a respective picture sequence as a changed region; and applying a prescribed spatial computation with respect to a time series of the changed region sequentially in time to obtain a respective picture change.

4. The method of claim 1, wherein the step (c) detects the shot boundary by judging that the shot boundary exists at a timing at which either the P picture change exceeds a first threshold or the I picture change exceeds a second threshold.

5. The method of claim 1, wherein the step (c) includes the step of:

switching a procedure for evaluating the P picture change and the I picture change, according to frequencies of appearances of the P picture sequence and the I picture sequence in the input video data.

6. The method of claim 1, wherein the step (c) includes the step of:

controlling values of a first threshold for evaluating the P picture change and a second threshold for evaluating the I picture change, according to frequencies of appearances of the P picture sequence and the I picture sequence in the input video data.

7. The method of claim 1, wherein the step (c) includes the step of:

correcting the P picture change by using an information obtained from the I picture sequence, in evaluating the P picture change.

8. The method of claim 1, wherein the step (c) includes the step of:

correcting the I picture change by using an information obtained from the P picture sequence, in evaluating the I picture change.

9. The method of claim 1, further comprising the steps of:

(d) estimating a section S in which the shot boundary may possibly be existing, according to coded data of intra-frame/intra-field coded frames constituting the I picture sequence;

wherein the step (c) detects the shot boundary according to feature values obtained from coded data of inter-frame/inter-field coded frames constituting the P picture sequence which are contained within the section S.

10. The method of claim 9, wherein the step (d) includes the steps of:

calculating a difference in corresponding blocks between each intra-frame/intra-field coded frame and an immediately previous intra-frame/intra-field coded frame in the I picture sequence;

counting a number of blocks for which the difference calculated by the calculating step is greater than a first prescribed threshold; and estimating frames between said each intra-frame/intra-field coded frame and the immediately previous intra-frame/intra-field coded frame as a part of the section S when the number of blocks counted by the counting step is greater than a second prescribed threshold.

11. The method of claim 9, further comprising the steps of:

(e) estimating a section S' at which the shot boundary may possibly be existing within the section S, by comparing an amount of coded data in each inter-frame/inter-field coded frame contained in the section S with at least one of an amount of coded data in an immediately previous inter-frame/inter-field coded frame of said each inter-frame/inter-field coded frame and an amount of coded data in an immediately following inter-frame/inter-field coded frame of said each inter-frame/inter-field coded frame;

wherein the step (c) detects the shot boundary according to feature values obtained from coded data of the inter-frame/inter-field coded frames contained within the section S'.

12. The method of claim 11, wherein the step (e) includes the steps of:

calculating a difference of the amount of coded data in said each inter-frame/inter-field coded frame with respect to a larger one of the amount of coded data in the immediately previous inter-frame/inter-field coded frame and the amount of coded data in the immediately following inter-frame/inter-field coded frame; and estimating said each inter-frame/inter-field coded frame as a part of the section S' when the difference calculated by the calculating step is greater than a prescribed threshold.

13. The method of claim 11, wherein the step (c) includes the steps of:

decoding variable length codes of said each inter-frame/inter-field coded frame and counting a number of intra-frame/intra-field coded blocks in said each inter-frame/inter-field coded frame; and judging that the shot boundary exists in said each inter-frame/inter-field coded frame when the number of intra-frame/intra-field coded blocks counted by the decoding step is greater than another prescribed threshold.

14. The method of claim 11, wherein when the section S' contains an intra-frame/intra-field coded frame, the step (c) detects the shot boundary according to the feature values obtained by decoding said intra-frame/intra-field coded frame and an immediately previous inter-frame/inter-field coded frame of said intra-frame/intra-field coded frame.

15. The method of claim 14, wherein the step (c) includes the steps of: calculating a difference between said intra-frame/intra-field coded frame and the immediately previous inter-frame/inter-field coded frame;

counting a number of blocks/pixels for which the difference calculated by the calculating step is greater than a first prescribed threshold; and judging that the shot boundary exists between said intra-frame/intra-field coded frame and the immediately previous inter-frame/inter-field coded frame when the number of blocks/pixels counted by the counting step is greater than a second prescribed threshold.

16. The method of claim 1, wherein the input video data is coded interlaced video data in which each frame has an odd field and an even field and the P picture sequence is compressed by an inter-field prediction coding scheme, and the step (a) includes the steps of:

calculating inter-field similarities of each field of each frame according to a reference field selection information indicating a reference field to be used for a motion compensation at a time of decoding as either the odd field or the even field; and applying a prescribed computation to the inter-field similarities calculated from a plurality of fields, and setting a computation result as the P picture change; and wherein the step (c) judges that the shot boundary exists when the P picture change is greater than a prescribed threshold.

17. The method of claim 16, wherein the calculating step calculates the inter-field similarities by applying another prescribed computation to difference data contained in blocks constituting each frame, and accumulating computation results of said another prescribed computation for each reference field separately.

18. The method of claim 16, wherein the applying step applies the prescribed computation which has a large computation result value when a first condition that the inter-field similarity between a field of interest and a past field is small and a second condition that the inter-field similarity between a field of interest and a future field is large are both satisfied.

19. The method of claim 16, wherein when the odd (or the even) field is older in time than the even (or the odd) field, the applying step applies the prescribed computation which has a large computation result value when a first condition that the inter-field similarity between one odd (or even) field of one frame and a past field is large but the inter-field similarity between said one odd (or even) field and a future field is small and a second condition that the inter-field similarity between one even (or odd) field of said one frame and a future field is large but the inter-field similarity between said one even (or odd) field and a past field is small are both satisfied.

20. The method of claim 16, further comprising the steps of:

applying a further prescribed computation which has a large computation result value when both of the inter-field similarity between a field of interest and a past field and the inter-field similarity between a field of interest and a future field have small values; and judging that a temporal image change exists when a computation result of the further prescribed computation is greater than a prescribed threshold.

21. The method of claim 1, wherein the step (a) includes the steps of:

calculating a changing tendency of each frame from the P picture sequence, according to coded data contained in the P picture sequence; and extracting a region at which the changing tendency calculated by the calculating step is uniform over a plurality of consecutive frames, as a gradually changing region; and wherein the step (c) detects the shot boundary as a dissolve when a rate of the gradually changing region with respect to an entire field is greater than a prescribed threshold.

22. The method of claim 21, wherein the calculating step calculates the changing tendency according to a sign of difference data in a region at which a motion compensation prediction was correct among the coded data contained in the P picture sequence.

23. The method of claim 22, wherein the calculating step changes the sign of the difference data depending on whether the motion compensation prediction was made from a past direction or a future direction, in calculating the changing tendency.

24. The method of claim 21, wherein the calculating step calculates the changing tendency according to a value of difference data in a region at which a motion compensation prediction was correct among the coded data contained in the P picture sequence.

25. The method of claim 1, wherein the step (a) includes the steps of:

applying a spatial computation for contracting a region at which a motion compensation prediction was incorrect from a boundary with respect to a region at which the motion compensation prediction was correct, as much as a width corresponding to a range to which an influence of the motion compensation prediction reaches, according to the P picture sequence, so as to obtain a contracted region for each frame; and calculating the P picture change according to the contracted region obtained by the applying step.

26. The method of claim 25, wherein the step (a) further includes the step of:

estimating the range to which an influence of the motion compensation prediction reaches, according to values of motion vectors recorded in difference data obtained by analyzing the P picture sequence.

27. The method of claim 25, wherein the calculating step calculates the P picture change by comparing a type of each block contained in the contracted region for each frame with types of corresponding blocks contained in adjacent frames of said each frame, and using only those blocks contained in the contracted region whose type is different from types of corresponding blocks contained in adjacent frames of said each frame.

28. The method of claim 27, wherein the calculating step includes the steps of:

counting a number of valid blocks in the contracted region for each frame, a valid block being an i block for which the motion compensation prediction was incorrect and corresponding blocks in the adjacent frames are p blocks for which the motion compensation prediction was correct; and obtaining the P picture change as a rate of the number of valid blocks with respect to a total number of blocks in said each frame.

29. The method of claim 25, wherein the calculating step calculates the P picture change by comparing a number of i blocks in the contracted region for each frame with at least one of a number of i blocks in an immediately previous frame of said each frame and a number of i blocks in an immediately following frame of said each frame, the i block being a block for which the motion compensation prediction was incorrect.

30. The method of claim 29, wherein the calculating step further includes the steps of:

calculating a difference of the number of i blocks for said each frame with respect to a larger one of the number of i blocks for the immediately previous frame and the number i blocks for the immediately following frame; and obtaining the P picture change as a rate of the difference with respect to a total number of blocks in said each frame.

31. The method of claim 1, wherein the step (c) checks whether the shot boundary exists between an I picture and a P picture by the steps of:

determining a largely changed region in the P picture sequence;

correcting the I picture change calculated at the step (b) by removing I picture change values obtained from the largely changed region determined by the determining step; and evaluating the I picture change as corrected by the correcting step.

32. An apparatus for detecting a shot boundary from an input video data compressed by a coding scheme using both an inter-frame/inter-field prediction coding scheme and an intra-frame/intra-field coding scheme, comprising:

a picture judgement unit for judging types of coding schemes used in the input video data and separating a Predictive-picture (P picture) sequence in the input video data which is compressed by an inter-frame/inter-field forward direction prediction coding scheme and an Intra-picture (I picture) sequence in the input video data which is compressed by an intra-frame/intra-field coding scheme;

a P picture change calculation unit for calculating a P picture change from the P picture sequence, according to coded data contained in the P picture sequence;

an I picture change calculation unit for calculating an I picture change from the I picture sequence, according to coded data contained in the I picture sequence; and a shot boundary detection unit for detecting a shot boundary by evaluating both the P picture change calculated by the P picture change calculation unit and the I picture change calculated by the I picture change calculation unit.

33. The apparatus of claim 32, wherein the shot boundary detection unit estimates a section S in which the shot boundary may possibly be existing, according to coded data of intra-frame/intra-field coded frames constituting the I picture sequence, and detects the shot boundary according to feature values obtained from coded data of inter-frame/inter-field coded frames constituting the P picture sequence which are contained within the section S.

34. The apparatus of claim 32, wherein the input video data is coded interlaced video data in which each frame has an odd field and an even field and the P picture sequence is compressed by an inter-field prediction coding scheme, and the P picture change calculation unit includes:

an inter-field similarity calculation unit for calculating inter-field similarities of each field of each frame according to a reference field selection information indicating a reference field to be used for a motion compensation at a time of decoding as either the odd field or the even field; and a computation unit for applying a prescribed computation to the inter-field similarities calculated from a plurality of fields, and setting a computation result as the P picture change; and wherein the shot boundary detection unit judges that the shot boundary exists when the P picture change is greater than a prescribed threshold.

35. The apparatus of claim 32, wherein the P picture change calculation unit includes:

a changing tendency calculation unit for calculating a changing tendency of each frame from the P picture sequence, according to coded data contained in the P picture sequence; and a gradually changing region extraction unit for extracting a region at which the changing tendency calculated by the changing tendency calculation unit is uniform over a plurality of consecutive frames, as a gradually changing region; and wherein the shot boundary detection unit detects the shot boundary as a dissolve when a rate of the gradually changing region with respect to an entire field is greater than a prescribed threshold.

36. The apparatus of claim 32, wherein the P picture change calculation unit includes:

a spatial computation unit for applying a spatial computation for contracting a region at which a motion compensation prediction was incorrect from a boundary with respect to a region at which the motion compensation prediction was correct, as much as a width corresponding to a range to which an influence of the motion compensation prediction reaches, according to the P picture sequence, so as to obtain a contracted region for each frame; and a calculation unit for calculating the P picture change according to the contracted region obtained by the spatial computation unit.

37. An article of manufacture, comprising:

a computer usable medium having computer readable program code means embodied therein for causing a computer to function as a system for detecting a shot boundary from an input video data compressed by a coding scheme using both an inter-frame/inter-field prediction coding scheme and an intra-frame/intra-field coding scheme, the computer readable program means including:

first computer readable program code means for causing the computer to function as a picture judgement unit for judging types of coding schemes used in the input video data and separating a Predictive-picture (P picture) sequence in the input video data which is compressed by an inter-frame/inter-field forward direction prediction coding scheme and an Intra-picture (I picture) sequence in the input video data which is compressed by an intra-frame/intra-field coding scheme;

second computer readable program code means for causing the computer to function as a P picture change calculation unit for calculating a P picture change from the P picture sequence, according to coded data contained in the P picture sequence;

third computer readable program code means for causing the computer to function as an I picture change calculation unit for calculating an I picture change from the I picture sequence, according to coded data contained in the I picture sequence; and fourth computer readable program code means for causing the computer to function as a shot boundary detection unit for detecting a shot boundary by evaluating both the P picture change calculated by the second computer readable program code means and the I picture change calculated by the third computer readable program code means.

38. The article of manufacture of claim 37, wherein the fourth computer readable program code means estimates a section S in which the shot boundary may possibly be existing, according to coded data of intra-frame/intra-field coded frames constituting the I picture sequence, and detects the shot boundary according to feature values obtained from coded data of inter-frame/inter-field coded frames constituting the P picture sequence which are contained within the section S.

39. The article of manufacture of claim 37, wherein the input video data is coded interlaced video data in which each frame has an odd field and an even field, and the second computer readable program code means includes:

fifth computer readable program code means for causing the computer to function as an inter-field similarity calculation unit for calculating inter-field similarities of each field of each frame according to a reference field selection information indicating a reference field to be used for a motion compensation at a time of decoding as either the odd field or the even field; and sixth computer readable program code means for causing the computer to function as a computation unit for applying a prescribed computation to the inter-field similarities calculated from a plurality of fields, and setting a computation result as the P picture change; and wherein the fourth computer readable program code means judges that the shot boundary exists when the P picture change is greater than a prescribed threshold.

40. The article of manufacture of claim 37, wherein the second computer readable program code means includes:

seventh computer readable program code means for causing the computer to function as a changing tendency calculation unit for calculating a changing tendency of each frame from the P picture sequence, according to coded data contained in the P picture sequence; and eighth computer readable program code means for causing the computer to function as a gradually changing region extraction unit for extracting a region at which the changing tendency calculated by the changing tendency calculation unit is uniform over a plurality of consecutive frames, as a gradually changing region; and wherein the fourth computer readable program code means detects the shot boundary as a dissolve when a rate of the gradually changing region with respect to an entire field is greater than a prescribed threshold.

41. The article of manufacture of claim 37, wherein the second computer readable program code means includes:

ninth computer readable program code means for causing the computer to function as a spatial computation unit for applying a spatial computation for contracting a region at which a motion compensation prediction was incorrect from a boundary with respect to a region at which the motion compensation prediction was correct, as much as a width corresponding to a range to which an influence of the motion compensation prediction reaches, according to the P picture sequence, so as to obtain a contracted region for each frame; and tenth computer readable program code means for causing the computer to function as a calculation unit for calculating the P picture change according to the contracted region obtained by the ninth computer readable program code means.

* * * * *